US009809457B2

(12) United States Patent
Hata et al.

(10) Patent No.: US 9,809,457 B2
(45) Date of Patent: Nov. 7, 2017

(54) CARBON NANOTUBE AGGREGATE, CARBON NANOTUBE AGGREGATE HAVING A THREE-DIMENSIONAL SHAPE, CARBON NANOTUBE MOLDED PRODUCT USING THE CARBON NANOTUBE AGGREGATE, COMPOSITION, AND CARBON NANOTUBE DISPERSION LIQUID

(71) Applicant: National Institute of Advanced Industrial Science and Technology, Chiyoda-ku, Tokyo (JP)

(72) Inventors: Kenji Hata, Tsukuba (JP); Don N. Futaba, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 1027 days.

(21) Appl. No.: 13/916,957

(22) Filed: Jun. 13, 2013

(65) Prior Publication Data

US 2013/0337707 A1    Dec. 19, 2013

Related U.S. Application Data

(63) Continuation of application No. PCT/JP2011/078869, filed on Dec. 14, 2011.

(30) Foreign Application Priority Data

Dec. 15, 2010    (JP) ................................. 2010-279147

(51) Int. Cl.
  *C01B 31/00*    (2006.01)
  *C01B 31/02*    (2006.01)
  (Continued)

(52) U.S. Cl.
  CPC .............. *C01B 31/00* (2013.01); *B82Y 30/00* (2013.01); *B82Y 40/00* (2013.01);
  (Continued)

(58) Field of Classification Search
  CPC ... B82Y 30/00; B82Y 40/00; Y10T 428/2982; Y10T 442/10
  (Continued)

(56) References Cited

U.S. PATENT DOCUMENTS

2008/0318049 A1    12/2008  Hata
2009/0121613 A1     5/2009  Taki
  (Continued)

FOREIGN PATENT DOCUMENTS

CN        101010260 B      8/2007
CN        101365649 A      2/2009
  (Continued)

OTHER PUBLICATIONS

Chinese Office Action for application No. 201180060369.6 dated Sep. 2, 2014.
  (Continued)

*Primary Examiner* — Vincent A Tatesure
(74) *Attorney, Agent, or Firm* — Hauptman Ham, LLP

(57) ABSTRACT

The present invention is a carbon nanotube aggregate having a three-dimensional shape. The carbon nanotube aggregate having a three-dimensional shape includes a first surface, a second surface and a side surface, wherein a carbon nanotube of the first surface has a Herman orientation coefficient greater than −0.1 and smaller than 0.2, a carbon nanotube of the second surface has a Herman orientation coefficient greater than −0.1 and smaller than 0.2, and a carbon nanotube of the side surface has degree of orientation in which a Herman orientation coefficient is 0.2 or more and 0.99 or less, and the first surface and second surface are mutually
  (Continued)

arranged in parallel and the side surface is perpendicular with respect to the first surface and second surface.

18 Claims, 78 Drawing Sheets

(51) Int. Cl.
  *B82Y 30/00* (2011.01)
  *B82Y 40/00* (2011.01)
(52) U.S. Cl.
  CPC ...... *C01B 31/0253* (2013.01); *C01B 31/0273* (2013.01); *Y10T 428/2982* (2015.01); *Y10T 442/10* (2015.04)
(58) Field of Classification Search
  USPC .............................................. 442/1; 428/402
  See application file for complete search history.

(56) References Cited

U.S. PATENT DOCUMENTS

| | | | |
|---|---|---|---|
| 2009/0272935 A1 | 11/2009 | Hata et al. | |
| 2010/0062229 A1* | 3/2010 | Hata | B82Y 30/00 428/195.1 |
| 2010/0196249 A1* | 8/2010 | Hata | B82Y 30/00 423/447.2 |
| 2010/0196600 A1 | 8/2010 | Shibuya et al. | |
| 2011/0127472 A1 | 6/2011 | Sato et al. | |
| 2011/0133135 A1 | 6/2011 | Maeno | |
| 2011/0158892 A1 | 6/2011 | Yamaki | |

FOREIGN PATENT DOCUMENTS

| | | | |
|---|---|---|---|
| EP | 2383225 A | | 11/2011 |
| JP | 2005-97029 A | | 4/2005 |
| JP | 2007-012325 A | | 1/2007 |
| JP | 2007-035472 A | | 2/2007 |
| JP | 2007-169120 A | | 7/2007 |
| JP | 2009-149832 A | | 7/2009 |
| JP | 2010-030887 A | | 2/2010 |
| JP | 2010-248073 A | | 11/2010 |
| WO | 2006/011655 A | | 2/2006 |
| WO | 2007-078005 A | | 7/2007 |
| WO | WO-2007-078005 | * | 12/2007 |
| WO | 2010032525 A1 | | 3/2010 |
| WO | 2010/076885 A | | 7/2010 |

OTHER PUBLICATIONS

International Preliminary Report on Patentability for application No. PCT/JP2011/078869 dated Jun. 18, 2013.
Office Action dated on Feb. 3, 2015 regarding Japanese patent application No. 2014-080452.
International Search Report of PCT/JP2011/078869 mailed on Jan. 31, 2012.

* cited by examiner

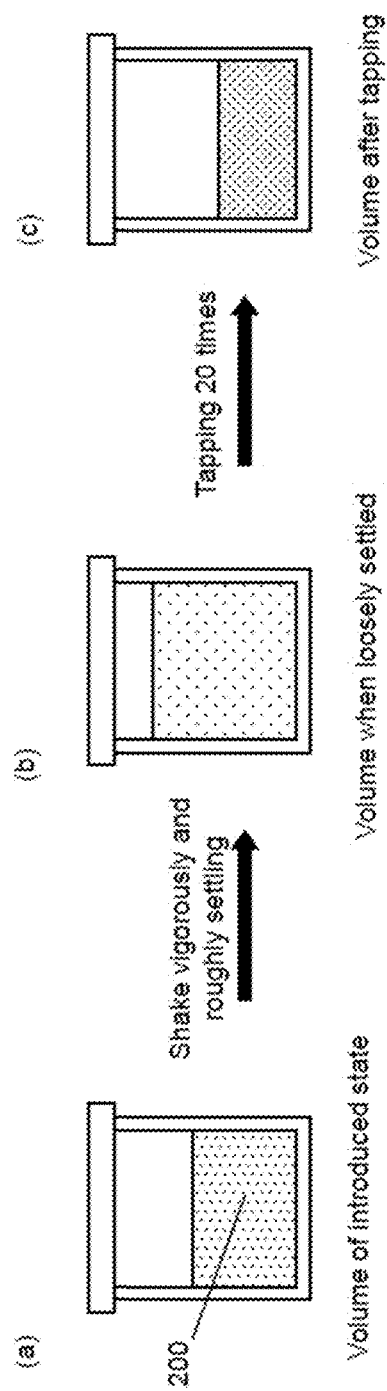

|  | Loose bulk density (g/cm³) | Tapped bulk density(g/cm³) |
|---|---|---|
| Example | 0.019±0.002 | 0.024±0.002 |
| Comparative Example | 0.237 | 0.295 |

FIG.36

| | Example | Comparative Example |
|---|---|---|
| Particle density(g/cm$^3$) | ~0.03 | 1 |
| Loose bulk density (g/cm$^3$) | 0.019 | 0.1-0.23 |
| Tapped bulk density(g/cm$^3$) | 0.024 | 0.14-0.29 |
| angle of repose | ~65±10° | 35±4° |

CARBON NANOTUBE AGGREGATE, CARBON NANOTUBE AGGREGATE HAVING A THREE-DIMENSIONAL SHAPE, CARBON NANOTUBE MOLDED PRODUCT USING THE CARBON NANOTUBE AGGREGATE, COMPOSITION, AND CARBON NANOTUBE DISPERSION LIQUID

CROSS REFERENCE TO RELATED APPLICATIONS

This application is based upon and claims the benefit of priority from the prior Japanese Patent Application No. 2010-279147, filed on Dec. 15, 2010 and PCT Application No. PCT/JP2011/078869, filed on Dec. 14, 2011, the entire contents of which are incorporated herein by reference.

FIELD

The present invention relates to a carbon nanotube aggregate of carbon nanotubes. In particular, the present invention relates to a carbon nanotube aggregate having a three-dimensional shape. In addition, the present invention relates to a carbon nanotube molded product, a composition and carbon nanotube dispersion liquid using the carbon nanotube aggregate having a three-dimensional shape.

BACKGROUND

Carbon nanotubes composed of only carbon atoms (hereinafter referred to as CNT) are a material having excellent thermal conductivity, electrical properties and mechanical properties. The CNT is lightweight and very strong and is a material having excellent elasticity and recovery properties. The CNT having these excellent properties as described above is an attractive material, and very important as an industrial material.

Since the CNT is synthesized as an aggregate in general, in order to use the CNT in various applications it is necessary to loosen the carbon nanotube aggregate (hereinafter called CNT aggregate) after synthesis, and process mold into a desired shape. However, because CNT pairs have a strong van der Waals force, mutual CNTs are easily adsorbed to each other and cannot be easily loosened once adsorbed.

A CNT aggregate having such strong van der Waals forces is conventionally loosened using ultrasonic waves. In Japanese Laid-Open Patent Publication No. 2005-97029, after immersing a composition containing carbon nanotubes in a liquid and before separately collecting a solution containing a large amount of carbon nanotubes and a solution containing a large amount of components other than carbon nanotubes contained in a composition which contains carbon nanotubes, a stirring process, ultrasonic process, and centrifugation process are performed, and it is possible to improve the purification efficiency of the carbon nanotubes.

However, when the CNT aggregate is loosened by as ultrasonic waves, there is a problem in that the CNT breaks or is damaged and thus the CNT inherent characteristics cannot be sufficiently maintained. Conversely, when the CNT aggregate is loosened so as not to damage the CNTs, there is a problem in that the CNTs aggregate and a stable dispersion liquid cannot be obtained.

Many techniques for loosening the CNT have been reported. For example, in order to separate the CNTs more uniformly, in Japanese Laid-Open Patent Publication No. 2009-149832, after processing a mixed product of 10 mg of a double-walled CNT aggregate, 30 mg of Sodium polystyrene sulfonate and 10 mL of water using an ultrasonic homogenizer and performing centrifugation at 20000 G, when 9 mL of the supernatant was sampled, a CNT aggregate with a contained amount of CNTs in the supernatant of 0.6 mg/mL or more is used as the material of a transparent conductive film.

In addition, by using an aprotic organic dispersion medium and a wholly aromatic polyamide as aggregation inhibitors, in Japanese Laid-Open Patent Publication No. 2007-169120, a CNT dispersion liquid is disclosed in which bundles where no single-walled CNTs are formed or a bundle with very few single-walled CNTs exists stably.

However, even when these methods are used, it is difficult to obtained a CNT dispersion liquid or molded product in which there is very small damage to the CNT, while maintaining thermal conductivity and electrical properties, excellent mechanical properties of the CNT, high dispersibility and CNT dispersion stability, and is a factor that prevents the practical use for a variety of applications of the CNT.

SUMMARY

One reason for the difficulty in obtaining a stable CNT dispersion liquid and a molded product with very little damage to the CNT, CNTs that make up the CNT aggregate after synthesis bundle or aggregate before loosening so the CNTs are not easily loosened.

The present invention has been made in view of the background art described above, and as in the conventional technology, rather than developing a dispersion technology for loosening the CNTs, the present invention aims to provide a CNT aggregate that consists of CNTs which can be easily loosened.

A further problem is that when loosening the CNT aggregate, by providing a CNT aggregate having a mesh body consisting of a plurality of CNTs it is easy to manufacture a stable CNT dispersion liquid and CNT molded product while maintaining excellent thermal conductivity, electrical properties and mechanical properties of the CNT and high dispersibility.

A carbon nanotube aggregate having a three-dimensional shape related to one embodiment of the present invention is provided including a first surface, a second surface and a side surface, wherein a carbon nanotube of the first surface has a Herman orientation coefficient greater than −0.1 and smaller than 0.2, a carbon nanotube of the second surface has a Herman orientation coefficient greater than −0.1 and smaller than 0.2, and a carbon nanotube of the side surface has degree of orientation in which a Herman orientation coefficient is 0.2 or more and 0.99 or less, and the first surface and second surface are mutually arranged in parallel and the side surface is perpendicular with respect to the first surface and second surface.

In the carbon nanotube aggregate having a three-dimensional shape, when a carbon nanotube aggregate comprising the carbon nanotube aggregate having a three-dimensional shape is measured by a mercury intrusion porosimeter a pore diameter making a differential pore volume maximum in a range of 0.1 μm or more and 100 μm or less of a pore diameter is 1 μm or more and less 50 μm or less.

In the carbon nanotube aggregate having a three-dimensional shape, the length of the side surface is 10 μm or more and 1 cm or less.

In the carbon nanotube aggregate having a three-dimensional shape, a pore volume at a pore size where the differential pore volume of the carbon nanotube aggregate including the carbon nanotube aggregate having a three-dimensional shape is a maximum is 5 mL/g or more.

In the carbon nanotube aggregate having a three-dimensional shape, the first surface and/or second surface comprises a network of carbon nanotubes.

The first surface and said second surface of the carbon nanotube aggregate having a three-dimensional shape are each arranged with at least three sides respectively.

A plurality of bundles of carbon nanotubes extends from the outermost surface of the side surface of the carbon nanotube aggregate having a three-dimensional shape.

An angle of repose of a carbon nanotube aggregate including the carbon nanotube aggregate having a three-dimensional shape is 40 degrees or more and 85 degrees or less.

A bulk density of a carbon nanotube aggregate including the carbon nanotube aggregate having a three-dimensional shape is 0.001 g/cm$^3$ or more and 0.19 g/cm$^3$ or less.

A maximum pore size distribution of a carbon nanotube aggregate including the carbon nanotube aggregate having a three-dimensional shape calculated using a BJH method from an adsorption isotherm using liquid nitrogen is 100 nm or less.

The carbon nanotube aggregate having a three-dimensional shape includes a fissure.

In the carbon nanotube aggregate having a three-dimensional shape, the outermost third surface is arranged with carbon nanotube separable part pieces consisting of a carbon nanotube aggregate.

In the carbon nanotube aggregate having a three-dimensional shape, the outermost third surface is formed by arranging a plurality of carbon nanotube separable part pieces arranged with a bundle of carbon nanotubes.

In the carbon nanotube aggregate having a three-dimensional shape, the bundle is peeled off from the carbon nanotube piece forming the side surface.

A carbon nanotube aggregate including the carbon nanotube aggregate having a three-dimensional shape possesses a carbon purity of 98% o more measured by a fluorescent X-ray.

A carbon nanotube aggregate including the carbon nanotube aggregate having a three-dimensional shape includes carbon nanotubes with a specific surface area of or 800 m$^2$/g or more and 2500 m$^2$/g or less.

Weight loss in thermogravimetry when the carbon nanotube aggregate including the carbon nanotube aggregate having a three-dimensional shape is increased in temperature from 200° C. to 400° C. in increments of 1° C. per minute is 10% or less.

Carbon nanotubes forming carbon nanotube aggregate having a three-dimensional shape is a single-walled carbon nanotube.

In the carbon nanotube aggregate having a three-dimensional shape, the carbon nanotube bundles extend to an adjacent carbon nanotube aggregate having a three-dimensional shape.

In the carbon nanotube aggregate having a three-dimensional shape, the length of the bundles of carbon nanotubes is more than 1 μm or more and 1 mm or less.

A carbon nanotube aggregate related to an embodiment of the present invention includes a plurality of the carbon nanotube aggregates having a three-dimensional shape.

A carbon nanotube aggregate related to an embodiment of the present invention includes a mesh body formed from a plurality of carbon nanotubes obtained by dispersing carbon nanotube assemblies including the carbon nanotube aggregate having a three-dimensional shape.

A carbon nanotube molded product related to an embodiment of the present invention includes carbon nanotubes arranged with the mesh body formed from a plurality the CNTs.

A composition related to an embodiment of the present invention includes a carbon nanotube aggregate arranged with a mesh body formed from the plurality of carbon nanotubes.

A carbon nanotube dispersion liquid related to an embodiment of the present invention dispersing a carbon nanotube aggregate arranged with a mesh body formed from a plurality of the carbon nanotubes in a dispersion liquid, the plurality of the carbon nanotubes are obtained by dispersing carbon nanotubes including the carbon nanotube aggregate having a three-dimensional shape.

BRIEF EXPLANATION OF THE DRAWINGS

FIG. 5 is a diagram showing a measurement method of loose bulk density and tapped bulk density of a CNT aggregate including the CNT aggregate 100 having a three-dimensional shape according to an embodiment of the present invention;

FIG. 34 is a table showing the measurement results of bulk density of the CNT aggregate 200 including a CNT aggregate having a three-dimensional shape according to an embodiment of the present invention;

FIG. 36 is a table showing the measurement results of bulk density and angle of repose of the CNT aggregate 200 including a comprising CNT aggregate having a three-dimensional shape according to an embodiment of the present invention;

DESCRIPTION OF EMBODIMENTS

Figure 1:
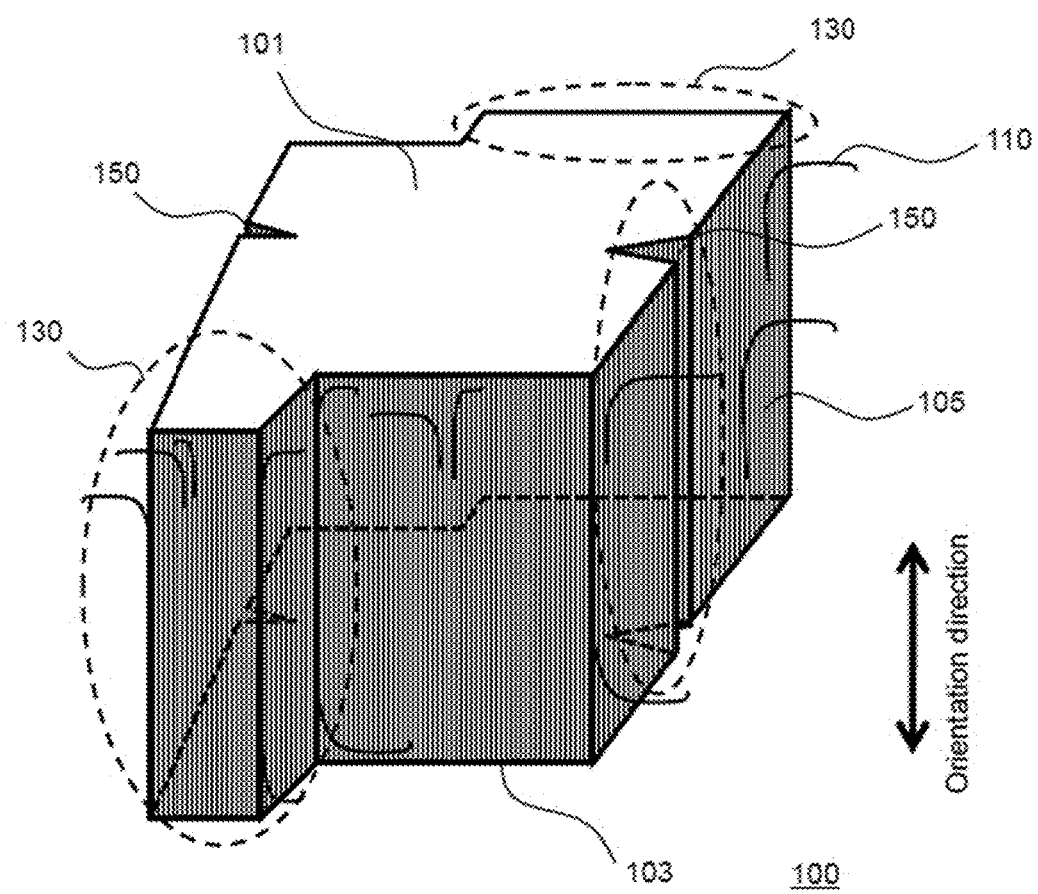
FIG. 1 is a schematic diagram of a CNT aggregate 100 having three-dimensional shape according to an embodiment of the present invention.

A carbon nanotube aggregate having a three-dimensional shape of the present invention, a carbon nanotube molded product, composition and carbon nanotube dispersion liquid using the aggregate will be described below in detail with reference to the accompanying drawings. The carbon nanotube aggregate having a three-dimensional shape of the present invention, a carbon nanotube molded product, composition and carbon nanotube dispersion liquid using the aggregate should not be construed as being limited to the description of the embodiments and examples shown below. Furthermore, in the drawings referenced in the examples and the embodiment described below, portions having the same parts or similar functions are denoted by the same reference numerals, and their repeated descriptions will be omitted.

Figure 2:
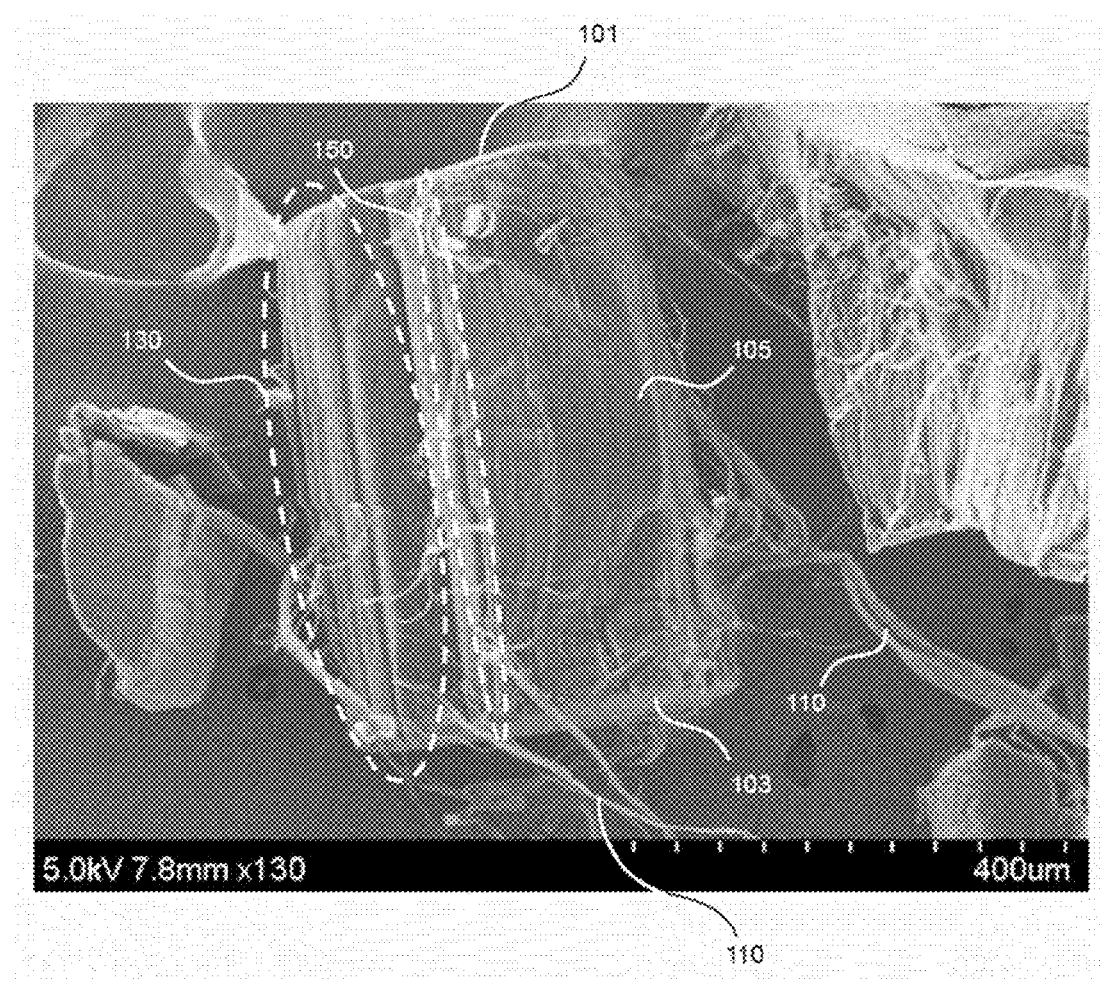
FIG. 2 is a scanning electron microscope image (hereinafter, SEM) of the CNT aggregate 100 having a three-dimensional shape according to an embodiment of the present invention.
Figure 3:
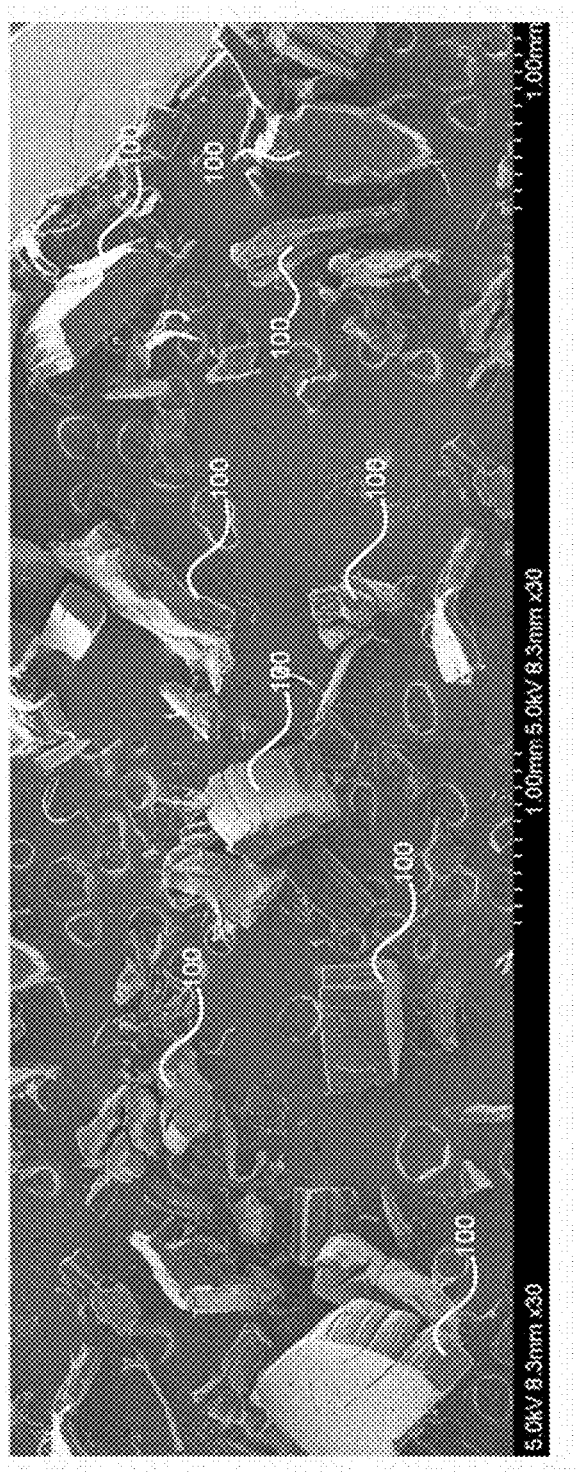
FIG. 3 is a SEM image of a CNT aggregate including the CNT aggregate 100 having a three-dimensional shape according to an embodiment of the present invention.

The carbon nanotube aggregate having a three-dimensional shape of the embodiments of the present invention (hereinafter, referred to as three-dimensional shape CNT aggregate) is preferred to not have a CNT aggregate having a large bulk shape but a flake shape, powder shape, granule shape, thin leaf shape or block shape as shown in FIGS. 1 and 2. FIG. 1 is a schematic diagram of a three-dimensional shape CNT aggregate 100 according to an embodiment of the present invention. In addition, FIG. 2 is a SEM image of the three-dimensional shape CNT aggregate 100 according to an embodiment of the present invention. Furthermore, in the present invention, an aggregate which includes a plurality of three-dimensional shape CNT aggregates at least one part is referred to as a CNT aggregate (FIG. 3). The three-dimensional shape CNT aggregate 100 is an aggregate formed by a plurality of CNTs, and is arranged with a first surface 101, second surface 103 and a third side surface 105. The first surface 101 and second surface 103 are preferred to have a planar shape comprising at least three sides and each preferably is disposed in parallel to each other. In addition, the side surface 105 is preferred to be arranged perpendicular to the top surface 101 and bottom surface 103.

The three-dimensional shape CNT aggregate 100 is preferred to have CNT bundles 110 extending from the outermost surface of the side 105. In addition, the three-dimensional shape CNT aggregate 100 may also be arranged with a carbon nanotube separable part piece 130 (hereinafter, CNT separable part pieces) or a fissure 150 at the outermost surface of the side 105.

The side surface 105 of the three-dimensional shape CNT aggregate 100 is preferred to have a length with respect to the direction of the top surface 101 and bottom surface 103 of 10 μm or more and 1 cm or less.

The three-dimensional shape CNT aggregate 100 related to the embodiments of the present invention can easily undergo a loosening process by providing a size as described above, that is by having a flaky, powdery, granular, thin leaf shape or block-like form. On the other hand, three-dimensional shape CNT aggregates larger than the size described above are difficult to loosen since there is an increase in viscosity of a dispersion medium etc when performing a loosening process. In addition, three-dimensional shape CNT aggregates smaller than the size described tend to aggregate and therefore are not easily loosened. In the present invention, good characteristics as a whole can be shown by including a three-dimensional shape CNT aggregate 100 in a loosened CNT aggregate.

(Characteristic of the Top Surface)

In the present specification, the first surface "top surface" and the second surface "bottom surface" are arranged mainly on the end portion of the CNT and the top surface 101 and bottom surface 103 of the three-dimensional shape CNT aggregate 100 according to an embodiment of the present invention are preferred to be arranged of at least three sides. The top surface 101 and bottom surface 103 are preferred to be opposed to each other and arranged in parallel. In the present specification, "side" is a part where the top surface 101 and side surface 105 intersect. Furthermore, in the present specification, "circle" is considered to be a shape having an infinite "side". In addition, the top surface and bottom surface are preferred to be arranged approximately parallel. In this case, approximately parallel means a normal vector of the top and bottom surfaces is 0 degrees or more and 30 degrees or less.

Moreover, the CNT which forms the top surface 101 and bottom surface 103 of the three-dimensional shape CNT aggregate 100 according to an embodiment of the present invention is preferred not to have orientation, that is, the top surface 101 and bottom surface 103 is preferably non-oriented. In the present specification, non-oriented, i.e., there is no degree of orientation, means the degree of orientation of the Hermann orientation coefficient (hereinafter, HOF) is larger than −0.1 and less than 0.2, more preferably larger than −0.75 and less than 0.15.

In order to determine the direction of orientation quantitatively, the Herman orientation coefficient (HOF) (0: Non oriented state, 1: orientated state) may be calculated using an intensity profile obtained from a FFT image obtained by a fast Fourier conversion of an SEM image of a CNT aggregate. The direction of orientation is the average of the individual direction vectors of the CNTs forming the CNT aggregate. Therefore, the direction of orientation may be different due to the size of the area for evaluating the location and orientation of the CNT aggregate Here, a method of calculating the HOF uses a SEM image observed from the direction perpendicular to the top surface 101 or the bottom surface 103 at a magnification of 10000 times, 50,000 times and 100,000 times of the CNT aggregate 100. A 2-D Fast Fourier calculation (FFT) is performed on a SEM to obtain a FFT image.

Next, reference direction (ϕ=0) for calculating the HOF is determined. A reference (standard) direction is defined so that the HOF becomes the largest value. The FFT image of the CNT aggregate having orientation has a flat oval shape, and the orientation becomes higher as the oval shape becomes more flat. The length axial direction of the oval shape is the direction in which the periodicity of CNT due to orientation is maximized, and the short axial direction of the oval shape is the direction of orientation in the field of view of the image of the original FFT image. The reference direction for calculating the HOF is defined as the length axial direction of the oval shape (or the direction in which the HOF becomes largest). In the case where orientation is low as is the top surface 101, or essentially there is no orientation, the FFT image is a perfect circle shape, and the determination of a reference direction (ϕ=0) is not easy. Therefore, the Hermann coefficient is calculated using an arbitrary direction and X+15 degrees, X+30 degrees, X+45 degrees, X+60 degrees, and X+75 degrees and it possible to define the direction in which the Herman coefficient is largest as the reference direction.

A conversion strength from reference direction (ϕ=0) in a radial direction keeping the same distance from the origin of the FFT image, up to ϕ=π/2 is calculated and this defines a diffraction intensity function I(ϕ). The distance from the origin for calculating the diffraction intensity function is defined as between a distance ($10 \times 10^6$ ($m^{-1}$) corresponding to 100 nm distance in real space and the frequency Hz which corresponds to 50 nm. The diffraction intensity function I(ϕ) is calculated from at least 10 different distances in this range and the following formula is calculated from at least 10 different distances using this diffraction intensity function as a variable, the two largest values and the two smallest values are subtracted and the average value of the values calculated from at least 6 distances is defined as the HOF of the SEM image.

$$F \equiv \frac{1}{2}(3\langle\cos^2\phi\rangle - 1) \qquad \text{[formula 1]}$$

$$\langle\cos^2\phi\rangle = \frac{\int_0^{\pi/2} I(\phi)\cos^2\phi\sin\phi\,d\phi}{\int_0^{\pi/2} I(\phi)\sin\phi\,d\phi}$$

The average value is defined as the HOF of as CNT aggregate by performing this calculation on at least different observation locations in 5 SEM images. However, F is the HOF, ϕ is the azimuthal angle when ϕ=0 is defined as the reference (standard) direction, and I(ϕ) is the diffraction intensity function. In the HOF, F=1 if no orientation if there is complete orientation with respect to ϕ=0 direction and F=0 if there is no orientation. In the case where the HOF is a negative value, it is preferred that the HOF is recalculated with a direction perpendicular to the φ=0 direction of defined as the reference (standard) direction so that the HOF becomes a positive value.

Because the top surface 101 and bottom surface 103 of the three-dimensional shape CNT aggregate 100 according to an embodiment of the present invention has a degree of orientation in a range greater than −0.1 and less than 0.2 which is substantially no degree of orientation, CNT separable part pieces 130 are easily peeled from three-dimensional shape CNT aggregate 100 and the CNT aggregate is easily loosened. In addition, if a crack occurs in three-dimensional shape CNT aggregate 100 with the fissure 150 as a starting point, the CNT aggregate 100 is easily peeled off and easily loosened.

Furthermore, the top surface 101 and bottom surface 103 of the three-dimensional shape CNT aggregate 100 related to an embodiment of the present invention is arranged with a network of the CNTs. In the present specification, a "network of CNTs" indicates a form like a nonwoven fabric of CNT (or CNT bundle) and CNT (or bundle of CNT) having fine pores (gap). The network of CNTs is preferred to have a structure having a state in which the tip of one part of the CNT has been locally "disaggregated" in a CNT aggregate in which a plurality of CNTs "assemble". In order to provide a network of CNTs, the top surface 101 and/or the bottom surface 102 is non-orientated as a whole.

Furthermore, the CNT network defined in the present specification can be confirmed when the top surface 101 of the three-dimensional shape CNT aggregate 100 is SEM observed at a magnification of 50 000 times. There may be a difference in number density and length of the CNT network on the first and second surfaces which oppose each other. A surface of a CNT of the network having a high density and/or long length is defined as the first surface (top surface) and a surface of a CNT of the network having a low density and/or short length is defined as the second surface (bottom surface). In the case where a network of CNTs is not observed on the first surface and second surface, and/or in the case where no clear difference is seen in density and/or in length of the CNT network, either the first or second surface may be defined as top surface or bottom surface.

By providing the three-dimensional shape CNT aggregate 100 related to an embodiment of the present invention with a network of CNTs on the top surface 101 and/or bottom surface 103, the CNTs do not become completely dispersed when loosening the aggregate and the CNT can be present as a flake shaped aggregate. Furthermore, by providing a network of CNTs on the top surface 101 and/or bottom surface 103, it is possible to provide developed mesh body described later when the three-dimensional shape CNT aggregate 100 is dispersed in a solvent.

The top surface 101 and bottom surface 103 are preferably arranged parallel to one another. In the present specification, the term "parallel" means the top surface 101 and bottom surface 103 are in an approximately parallel state. In this case, approximately parallel means a normal vector of the upper and bottom surfaces are 0 degrees or more and 30 degrees or less.

By arranging the top surface 101 and bottom surface 103 of the three-dimensional shape CNT aggregate 100 related to an embodiment of the present invention parallel to each other, the length of CNTs within the three-dimensional shape CNT aggregate 100 related to an embodiment of the present invention are uniform. Therefore it is possible to provide a mesh body with a uniform structure when dispersing the three-dimensional shape CNT aggregate 100 in a solvent.

(Characteristic of the Side Surface)

In the present specification, "side surface", is arranged perpendicular to the top surface 101 and bottom surface 103 and is preferred to be arranged parallel to the orientation direction of the CNT aggregate. In the present specification, "perpendicular" and "approximately perpendicular" means the normal vector of the top and/or bottom surface and angle of the normal vector of the surface constituting the side surface is 60 degrees or more and 60 degrees and less.

As mentioned above, because it is preferred that the top surface 101 and bottom surface 103 have a planar shape arranged with at least 3 sides, in the three-dimensional shape CNT aggregate 100, the side surface 105 exists in a number equivalent to the number of side of the top surface 101 and bottom surface 103 of a polygon. However, since it is preferred that the three-dimensional shape CNT aggregate 100 is arranged with a CNT separable part piece 130 or fissure 150 on the side surface 105, the side surface 105 does not have to have a planar shape such as the top surface 101 or bottom surface 103.

In addition, CNTs which form the side surface 105 of the three-dimensional shape CNT aggregate 100 related to an embodiment of the present invention are oriented. That is, the side surface 105 is oriented. In the present specification, orientation is defined or having orientation is defined when the HOF is larger than 0.2, more preferably larger than 0.25, and still more preferably larger than 0.3 and 0.99 or less. The side surface 105 of the three-dimensional shape CNT aggregate 100 related to an embodiment of the present invention has a HOF of 0.2 or more.

Here, the method for calculating the HOF uses an SEM image of the CNT aggregate observed from the direction (thickness direction) of the side surface 105 at a magnification of 10000 times, 50,000 times, 100,000 times. Because the orientation of the top surface 101 and bottom surface 103 is different to the orientation of the whole, observation by SEM is preferred to be carried out in the center of the side surface 105 of the CNT aggregate. Specifically, observation is performed in an area within ±30% from the center of the side surface 105 of the CNT aggregate. A 2-D Fast Fourier calculation is performed on a SEM image and a FFT image is obtained. Because subsequent calculation methods are described above, an explanation is omitted.

In the present invention, the interactions of CNTs that form the three-dimensional shape CNT aggregate 100 are preferred to be weak, the CNTs are preferred not to aggregate and the side surface 105 of the three-dimensional shape CNT aggregate 100 related to an embodiment of the present invention is orientated with a degree of orientation of 0.2 or more, and CNT separable part pieces 130 are easily peeled from the three-dimensional shape CNT aggregate 100 making it easier to loosen. In addition, if a crack occurs in three-dimensional shape CNT aggregate 100 with the fissure 150 as a starting point, the CNT aggregate 100 is easily peeled off and easily loosened.

By providing a three-dimensional shape CNT aggregate 100 related to an embodiment of the present invention with this type of top surface 101, bottom surface 103 and side surface 105, it is possible to provide a mesh body having a uniform structure when a synthesized CNT aggregate is loosened. The mesh body has a function of transmitting electrons or phonons a far distance without attenuation and providing efficient mechanical stress.

(Bundle of CNTs)

As described above, the three-dimensional shape CNT aggregate 100 related to an embodiment of the present invention is preferred to have a plurality of CNT bundles 110 extending from the outermost surface of the side surface 105. In the present specification, a "bundle" means a structure in which a part of one CNT or more contained in the three-dimensional shape CNT aggregate 100, in particular one part of a bundle of CNTs is peeled from and extends from the side surface 105. In addition, "extending" means a state in which a part of the CNT bundles 110 having orientation are included in the three-dimensional shape CNT aggregate 100, and another part of the CNT bundle 110 jumps out from the three-dimensional shape CNT aggregate 100 in a non-oriented manner. The "outermost surface" means a surface formed by a CNT arranged on the outermost side of the side surface 105.

Figure 4A:
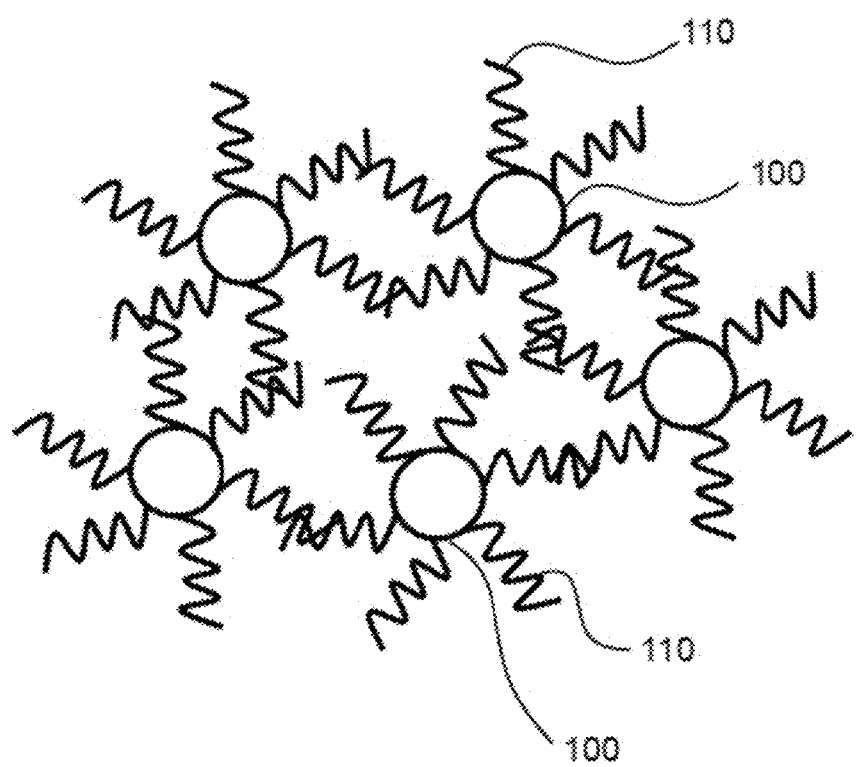
FIG. 4A is a schematic diagram of the CNT aggregate 100 having three-dimensional shape according to an embodiment of the present invention.
Figure 4B:
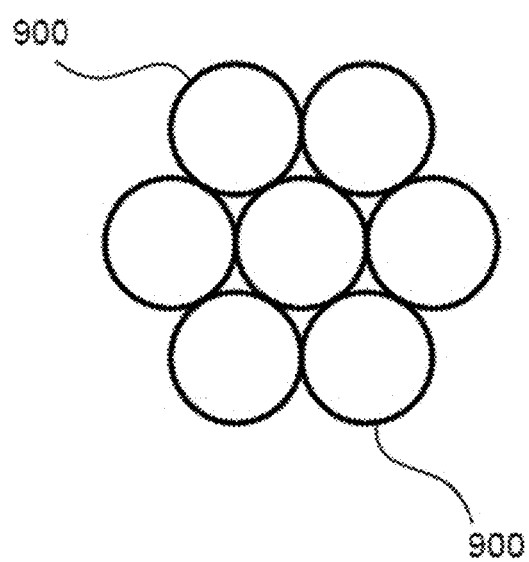
FIG. 4B is a schematic diagram of a conventional CNT aggregate.

The three-dimensional shape CNT aggregate 100 related to an embodiment of the present invention includes a CNT bundle 110 extending from the surface of the outermost side surface 105 and when a bundle 110 extends up to an adjacent three-dimensional shape CNT aggregate, adjacent three-dimensional shape CNT aggregate become difficult to aggregate. When three-dimensional shape CNT aggregates aggregate, it is difficult to loosen pairs of three-dimensional shape CNT aggregates. FIG. 4A is a schematic diagram of the three-dimensional shape CNT aggregate 100 related to an embodiment of the present invention, FIG. 4B is a schematic diagram of a conventional CNT aggregate. In the three-dimensional shape CNT aggregate 100 related to an embodiment of the present invention, since the bundle 110 extends to an adjacent three-dimensional shape CNT aggregate, it is difficult for three-dimensional shape CNT aggregates to aggregate without contacting directly. Meanwhile a conventional CNT aggregate 900 are not arranged with a bundle that extends to a side surface, CNT aggregates directly contact with each other and aggregate.

In the three-dimensional shape CNT aggregate 100 related to an embodiment of the present invention a plurality of bundles 110 are arranged on the outermost side surface of the side surface 105, and preferably 3 or more bundles per three-dimensional shape CNT aggregate, more preferably 5 or more, and still more preferably 10 or more. Although there is no preferred upper limit of the number of bundles, it is difficult to manufacture a three-dimensional shape CNT aggregate 100 having 1000 bundles or more. In addition, a length of a bundle 110 having a guaranteed distance so that adjacent three-dimensional shape CNT aggregates do not aggregate is preferred to be 1 µm or more, more preferably 5 µm or yet more preferably 100 µm or more so that a bundle 110 extends. Although, there is no upper limit to the preferred length, 1 mm or less s preferred so that bulk density of CNT aggregates is not too low.

Among CNTs, single-walled CNT (also displayed as SWNT), double-walled CNT (also displayed as DWNT) and multi-walled CNT (also displayed as MWNT) are known according to the number of graphene sheets that make up the CNT. A single-walled CNT or a CNT including a mix of single-walled CNTs and double-walled CNT and triple-walled CNT are preferred in the three-dimensional shape CNT aggregate 100 related to an embodiment of the present invention. If the range does not impair functionality, a CNT having three or more walls may be included. Here, in the case of mainly single-walled CNTs, the ratio of single-walled CNTs is preferred to be 50% or more with respect to double-walled, triple-walled and other CNTs. In the case of mainly double-walled CNTs, the ratio of double-walled CNTs is preferred to be 50% or more with respect to single-walled, triple-walled and other CNTs. Since the specific surface area of a single-walled CNT is large and is easy to increase its length (or height), it is possible to create a developed mesh body when dispersing a three-dimensional shape CNT aggregate 100 in a solvent and easy to express the inherent characteristics of the CNT.

(Fissure)

In the present specification, "fissure" is a crack which occurs in the side surface 105 of the three-dimensional shape CNT aggregate 100. It is preferred that the three-dimensional shape CNT aggregate 100 include fissures. The interactions of opposing CNTs via a fissure 150 are weak, the fissure 150 spreads by an external force, becomes a CNT separable part piece 130 and the CNT aggregate is easily peeled off. Therefore, the three-dimensional shape CNT aggregate 100 related to an embodiment of the present invention is easy to loosen.

(CNT Separable Part Piece)

In the present specification, a "separable part" is a projecting side surface 105 of the three-dimensional shape CNT aggregate 100 and a projecting part comprised from a CNT aggregate. A "separable part" is a form of a CNT aggregate before being broken from the three-dimensional shape CNT aggregate 100. A "CNT separable part piece" is a CNT aggregate which forms a separable part. The three-dimensional shape CNT aggregate 100 is preferred to have a separable part and/or a CNT separable part piece.

Bundle 110 is peeled and extends from CNT separable part piece 130 which is formed the side surface 105. Many bundles which extend from the CNT separable part piece are observed in a separable part. When the CNT aggregate is peeled from the side surface 105, a part of a CNT included in the CNT separable part piece 130 of the side surface 105 is peeled off and extends to the outermost side surface. Therefore, it is preferred that the three-dimensional shape CNT aggregate 100 related to an embodiment of the present invention has a CNT separable part piece 130 on the outermost side surface of the side surface 105 and a plurality of CNT separable part pieces 130 arranged with the bundle 110 is preferred to be arranged.

Because a CNT separable part piece 130 is arranged on the outermost surface of the side surface 105 of the three-dimensional shape CNT aggregate 100 related to an embodiment of the present invention, the CNT separable part piece 130 is peeled off easily from the three-dimensional shape CNT aggregate 100. Therefore, the three-dimensional shape CNT aggregate 100 is easy to loosen. In addition, since a plurality of CNT separable part pieces 130 arranged with a bundle 110 is arranged on the outermost side surface of the side surface 105, three-dimensional shape CNT aggregates 100 are less likely to aggregate. Meanwhile because a conventional CNT aggregate 900 does not have a CNT separable part piece arranged on a side surface they are not easily loosened, and because they do not have a structure in which a plurality of CNT separable part pieces arranged with an extending bundle is arranged, CNT aggregates tend to directly contact each other and aggregate.

(CNT Aggregate Pore Diameter and Pore Volume Measurement by a Mercury Intrusion Porosimeter)

A CNT aggregate 200 including the three-dimensional shape CNT aggregate related to an embodiment of the present invention (hereinafter, CNT aggregate 200) is preferred to have a pore diameter of 1 µm or more and 50 µm or less, and more preferably 2 µm or more and 40 µm or less where a differential pore volume is maximum in the range of 0.1 µm or more and 100 µm or less in the pore distribution measured by the mercury intrusion porosimeter. In addition, in the CNT aggregate 200 related to an embodiment of the present invention, the pore volume at a pore size when a differential pore volume is maximum is preferred to be 5 mL/g or more and preferably 7 mL/g or more.

When pore diameter in the CNT aggregate 200 is measured using a mercury intrusion porosimeter, it is possible to evaluate pores between CNT aggregates. When pore diameter is within the numerical range described above, there are adequate gaps between the CNT aggregates and it becomes easier to loosen the CNT aggregates without the CNT aggregates aggregating. On the other hand, when the pore diameter is smaller than the numerical range described above, CNT aggregates closely aggregate and it becomes difficult to loosen. In addition, when the pore diameter is greater than the above mentioned numerical range, it becomes too bulky to manage the CNT aggregate.

(Angle of Repose)

In the CNT aggregate 200 related to an embodiment of the present invention, an angle of repose is preferred to be 40 degrees or more and 85 degrees or less, more preferably 45 degrees or more and 85 degrees or less, and still more preferably 50 degrees or more and 85 degrees or less. In this specification, it is assumed that the angle of repose is measured by an injection method. The injection method is measured by depositing powder on a platform having a disc shaped top surface, and it is possible to easily measure an angle between powder deposited in a conical shape and a horizontal plane without receiving influence from the material of the platform by using a protractor for example. Also, it is possible to measure an angle of repose using a commercially available measuring instrument.

When the angle of repose is within the numerical range described above, a moderate amount of friction exists between the CNT aggregates and when the CNT aggregate 200 is subjected to a dispersion treatment, CNT aggregates are less likely to aggregate.

(Bulk Density)

In the CNT aggregate 200 related to an embodiment of the present invention, bulk density is preferred to be 0.001 g/cm$^3$ or more and 0.19 g/cm$^3$ or less, more preferably 0.002 g/cm$^3$ or more and 0.1 g/cm$^3$ or less, and still more preferably 0.005 g/cm$^3$ or more and 0.08 g/cm$^3$ or less. Measurement of CNT aggregate bulk density can be performed using one of two methods, i.e., evaluated by loose bulk density and tapped bulk density. FIG. 5 is a diagram illustrating a method of measuring loose bulk density and tapped bulk density. Loose bulk density is the bulk density after the CNT aggregate is placed in a container and shaken vigorously. Tapped bulk density is the bulk density after CNT aggregate is placed in a container and dropped repeatedly 20 times on a hard surface from a height of 25 mm. In the present specification, bulk density of the CNT aggregate was determined using the tapped bulk density.

Although it is preferred that the interactions of CNTs which form CNT aggregate 200 are weak and do not aggregate, when bulk density of the CNT aggregate 200 is within the numerical range described above, the interactions of CNTs which form CNT aggregate 200 are weak and the CNT aggregate is easily loosened. On the other hand, when bulk density of the CNT aggregate 200 is larger than the numerical range described above, the interactions of CNTS which form CNT aggregate 200 are too strong and the CNT aggregate is not easily loosened.

(Carbon Purity)

The CNT aggregate 200 related to an embodiment of the present invention is preferred to have a carbon purity of 98 mass % or more and/or metal impurities of 1 mass % or less. The impurities obstruct CNT dispersion and preventing formation of a developed mesh body when a CNT aggregate including the three-dimensional shape CNT aggregate 100 is dispersed in a solvent. A CNT having a carbon purity of 98 mass % or more and/or metal impurities of 1 mass % or less is preferred in order to create a stable CNT dispersion liquid. The purity of the CNT aggregate of the present invention is obtained from elemental analysis using X-ray fluorescence. Although there is no upper limit to the purity of the carbon, from manufacturing convenience, obtaining a carbon purity of 99.9999% or more is difficult. Although there is no lower limit to the metal impurities, from the manufacturing convenience, the metal impurities of 0.0001% or less is difficult.

If impurities such as metal are present in the CNT aggregate 200, because the impurities adhere CNTs together, the CNT aggregate is difficult to loosen. When carbon purity is 98 mass % or less and/or metal impurities are 1 mass % or more, formation of a good network is prevented. If purity is within the numerical range described above, impurities are low and the CNT aggregate can be easily loosened.

(Specific Surface Area)

In the CNT aggregate 200 related to an embodiment of the present invention, the specific surface area is preferred to be 800 m$^2$/g or more and 2500 m$^2$/g or less. The specific surface area is measured using the adsorption and desorption isotherms of liquid nitrogen at 77K, measured by the method of Brunauer, Emmett, the Teller from this adsorption-desorption isotherm.

If the specific surface area of the CNT aggregate 200 is within the numerical range mentioned above, nitrogen molecules diffuse between the CNTs constituting the CNT aggregate and because adsorbing gaps are present, the interaction between CNTs becomes excessively weak and the CNT aggregate is easy to loosen.

(Measurement of Pore Size Using BJH Method)

In the CNT aggregate 200 related to an embodiment of the present invention, maximum pore size distribution calculated using the BJH method (refer to J. Amer. Chem. Soc Magazine, Volume 73 (1951) page 373) from the adsorption isotherm at 77K using nitrogen liquid, is preferably 1 nm or more and 100 nm or less, 50 nm or less, and more preferably 30 nm or less, and still more preferably 25 nm or less. The BJH method is a theoretical equation for determining the pore size distribution assuming the pore has a cylindrical shape.

If the pore diameter of the CNT aggregate 200 is within the numerical range mentioned above, appropriate gaps between the CNTs constituting the CNT aggregate are present and therefore the interactions between CNTs becomes excessively weak and the CNT aggregate is easy to loosen.

(Thermogravimetry)

Weight loss from 200° C. to 400° C. at a thermogravimetry when the CNT aggregate 200 related to an embodiment of the present invention is heated at an increasing temperature of 1° C. per minute is preferred to be 10% or less and 5% or less more preferable. This weight loss can be measured by a thermal analysis of the CNT aggregate under an atmosphere. About 1 mg of a sample is placed in a differential thermal analyzer in air, and the temperature was raised from room temperature to 900° C. at a rate of temperature rise of 1° C. per minute. Weight loss from 200° C. to 400° C. is the ratio of the amount of weight loss from 200° C. to 400° C. to the amount of weight loss between room temperature and 900° C.

In general, in order to break down carbon impurities such as amorphous carbon other than a CNT at 400° C. or less, when thermogravimetry of a CNT aggregate containing carbon impurities is performed, weight loss from 200° C. to 400° C. is observed. The higher the amount of carbon impurities, the higher the rate of weight loss from 200° C. to 400° C.

When the CNT aggregate 200 includes carbon impurities, because the carbon impurities stick CNTs together, the CNT aggregate is difficult to loosen and dispersibility of the CNT aggregate is reduced. Therefore, in order to obtain a stable CNT dispersion liquid, a CNT aggregate with few carbon impurities is preferred.

(Manufacturing Method)

A method of manufacturing the CNT aggregate 200 related to an embodiment of the present invention is explained below. Although the method of manufacturing the CNT aggregate 200 is not limited as long as a CNT aggregate meeting the criteria set forth can be obtained, the manufacturing method is exemplified by the following example.

Figure 6:
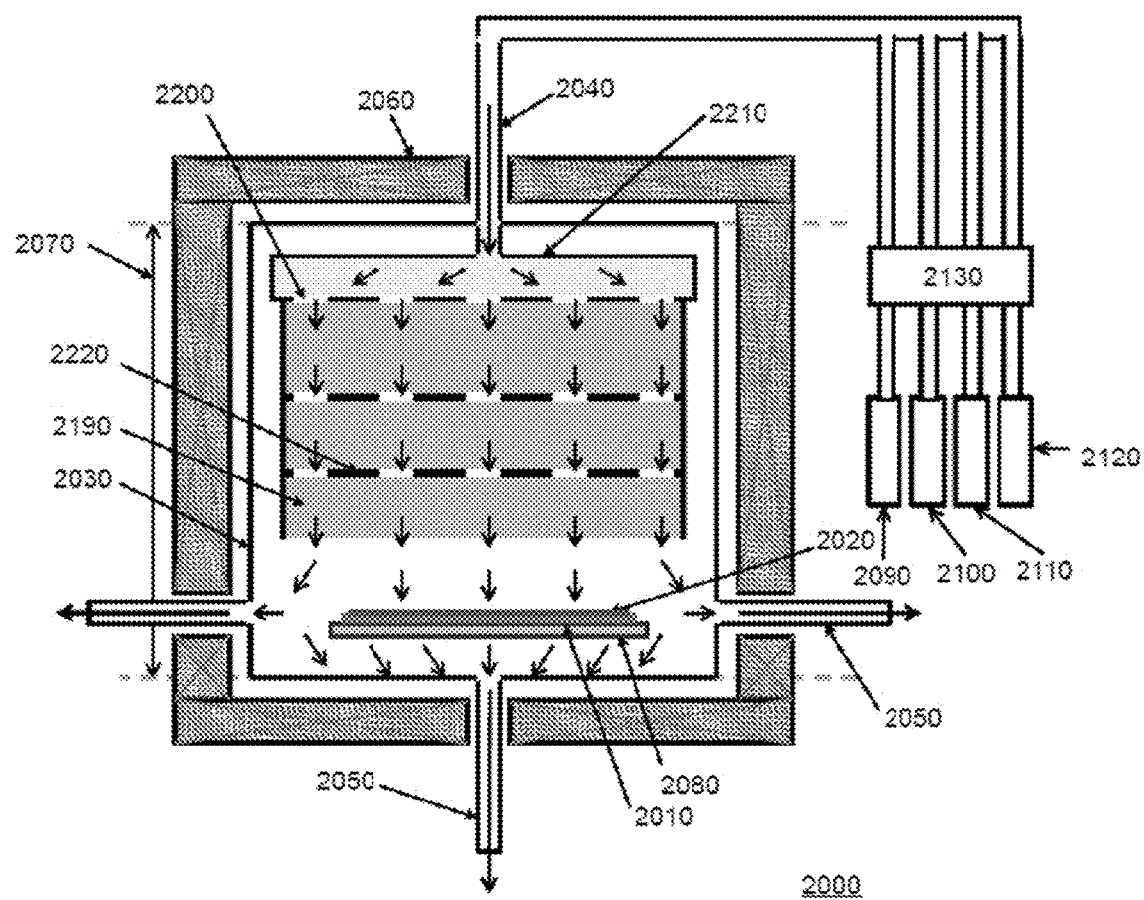
FIG. 6 is a schematic diagram showing an example of a synthesis device 2000 according to an embodiment of the present invention.

The loosened CNT aggregate 200 including the three-dimensional shape CNT aggregate 100 related to the present invention is obtained by processing a CNT bulk aggregate 10. FIG. 6 shows an example of synthesis device of the CNT bulk aggregate 10. The synthesis device 2000 is arranged with a synthesis furnace 2030 comprised from silica glass for example which receives a substrate 2010 arranged with a catalyst layer 2020, a gas supply pipe 2040 arranged on an upper wall of the synthesis furnace 2030 and connected to the synthesis furnace 2030, a gas discharge pipe 2050 arranged on a lower wall or side wall on the down flow side and connected to the synthesis furnace 2030, a heating means 2060 arranged on the exterior periphery of the synthesis furnace 2030 and comprised from a resistance heat generating coil for example, a heating temperature adjustment means for adjusting the temperature within the furnace to a certain temperature, and a heating region 2070 within the synthesis furnace 2030 heated to a certain temperature by the heating means 2060 and heating temperature adjustment means. In addition, a substrate holder 2080 is arranged for holding the substrate 2010 arranged with the catalyst layer 2020 in the heating region 2070 within the synthesis furnace 2030 so that a heated volume becomes larger than a discharge volume.

A gas flow formation means 2210 for distributing and dispersing a source gas supplied from the gas supply pipe 2040 and forming a source gas flow which flows in a plurality of directions is arranged within the heating region 2070 above the substrate holder 2080 and/or the catalyst layer 2020. The gas flow formation means 2210 forms a source gas flow in a plurality of directions roughly parallel to the surface of the substrate 2010. In addition, a plurality of gas ejection means 2220 for forming a source gas flow in a roughly perpendicular direction to the plane of the substrate 2010 is arranged on the gas flow formation means 2210. The gas ejection means 2220 is arranged in plane roughly parallel to the surface of the substrate 2010.

By using this gas flow formation means 2210 it is possible to contact with a catalyst from a roughly perpendicular direction to the plane of the substrate 2010 after a source gas supplied from the gas supply pipe 2040 is developed and dispersed to a plane roughly parallel to the plane of the substrate 2010. As a result, because it is possible to uniform the supply amount of the source gas per unit volume to a region arranged with a catalyst on the substrate 2010 and contact with the catalyst, it is possible to obtain a CNT bulk aggregate 10 including a uniform structure and properties which is suitable in manufacturing an easy to loosen CNT bulk aggregate 200.

A staying time period adjustment means 2140 for increasing and/or adjusting a staying time period formed from a turbulence flow control means 2220 comprised from a plate shaped rectifier plate arranged with a plurality of holes which is connected to and linked to the gas flow formation means 2210 with a heated volume intentionally increased and/or adjusted is arranged between the gad injection means 2200 and the catalyst layer 2020.

By adopting this structure, a heated volume of a source gas heated within the heating region 2070 is increased and lengthening a staying time period which had not conventionally been examined can be lengthened. As a result, breakup of the source gas is encouraged and a more suitable source gas to grow a CNT is contacted with a catalyst and by more efficiently transforming a source gas into a CNT than conventionally, it is possible to control the attachment of carbon impurities to the CNT and thus obtain a suitable CNT aggregate 200 related to the present invention which is easy to loosen.

The turbulence flow control means 2220 controls any turbulence of the source gas within the staying time period adjustment means 2140, makes the staying time period of the source flowing through the staying time period adjustment means 2140 roughly equal and as a result demonstrates a dramatic effect of making the staying time period of the source gas when in contact with the catalyst on the substrate 2010 roughly equal. It is easy for turbulence to occur within the heating region 2070 including the heated volume which is intentionally increased and although the staying time period of a source gas which flows through the staying time period adjustment means 2140 is lengthened when turbulence is present it does not become equal. Making the staying time period equal is suitable for controlling the generation of carbon impurities and thus it is preferable in obtaining the CNT aggregate 200.

The synthesis device is arranged with a source gas cylinder 2090 for receiving carbon compounds which become the source material of a CNT, a catalyst activator material cylinder 2100 for receiving catalyst activator materials, an atmosphere gas cylinder 2110 for receiving carrier gas of the source gas or the catalyst activator material, and a reduction gas cylinder 2120 for reducing a catalyst, and a carbon weight flux adjustment means 2130 which can control the supply amount of gas from each of the cylinders in the gas flow device is also arranged.

Manufacture of the CNT bulk aggregate 10 related to the present invention is for manufacturing a catalyst layer on the substrate 2010 and for chemical vapor deposition (synthesis) of a plurality of CNTs from the catalyst.

Figure 7:
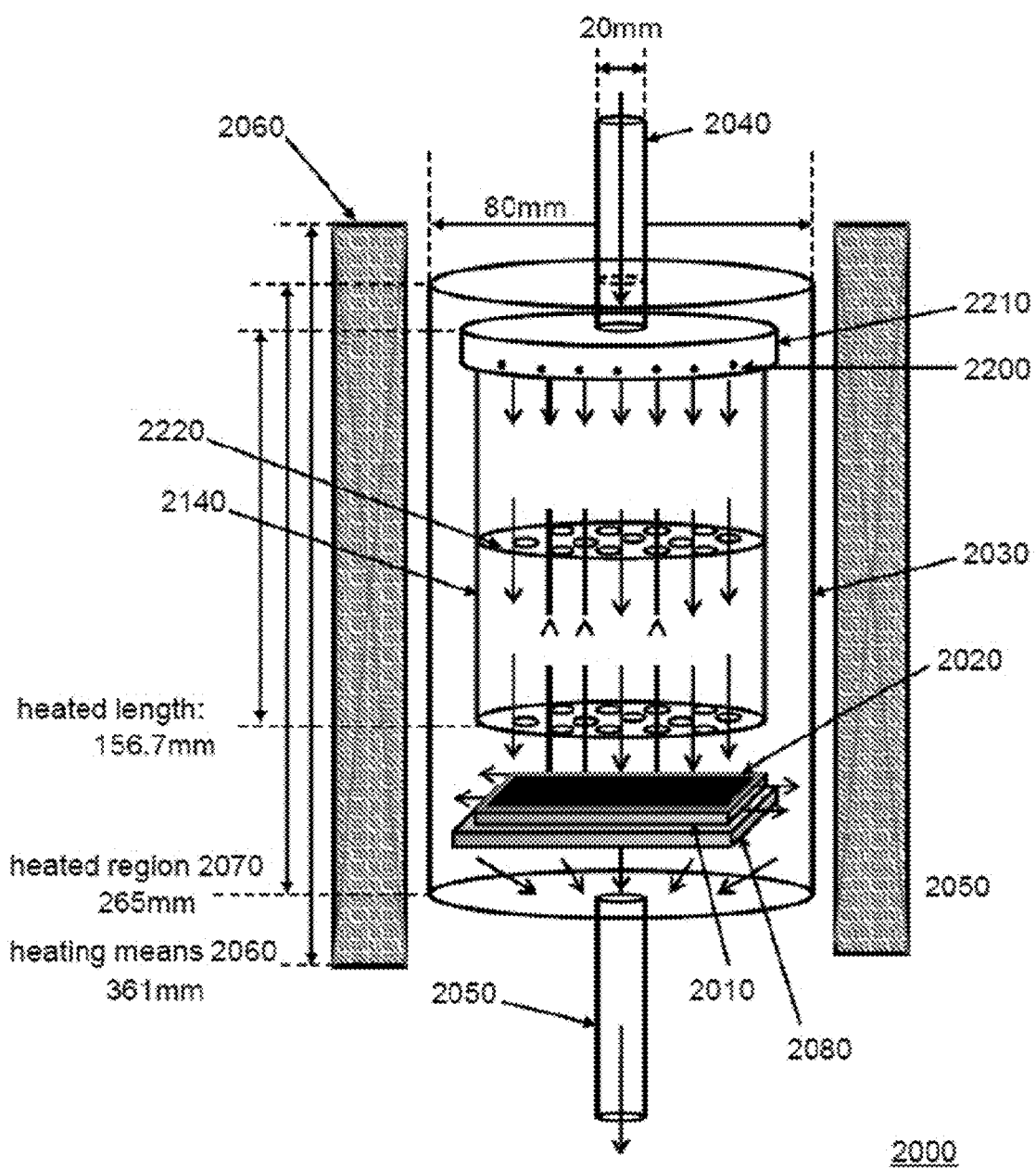
FIG. 7 is a schematic diagram showing an example of a synthesis device 2000 according to an embodiment of the present invention.

Referring to FIG. 6 and FIG. 7, first the substrate 2010 (silicon wafer for example) grown with a catalyst layer 2020 (alumina iron thin film for example) in advance in a separate process is transferred to the interior of the synthesis furnace 2030 which is filled with an atmosphere gas (helium for example) supplied from the gas supply pipe 2040, and placed into the substrate holder 2080. At this time, the substrate 2010 is arranged so that the surface of the catalyst layer 2020 and the flow path of the source gas intersect in a roughly perpendicular direction and the source gas is efficiently supplied to the catalyst.

In addition, by arranging the substrate 2010 within the heating region 2070 so that the discharge volume 2160 becomes smaller than the heated volume 2150, the source gas which contacts with the catalyst layer 2020 is rapidly discharged. Furthermore, the staying time period of the source gas within the synthesis surface 2030 is adjusted in advance by the staying time period adjustment means 2140 to be optimal for growing a CNT.

Next, the interior of the synthesis furnace 2030 is heated to a certain temperature (750° C. for example) while supplying a reduction gas (hydrogen for example) to the interior of the synthesis furnace 2030 from the gas supply pipe 2040 and a formation process is performed for maintaining this state for a desired time period. The catalyst layer 2020 is transformed into microparticles by this reduction gas and is adjusted to a suitable state as a CNT catalyst. A catalyst activator material may be added if necessary in the formation process.

Next, the supply of the reduction gas and atmosphere gas from the gas supply pipe 2040 is stopped or reduced according to a desired reaction condition using the carbon weight flux adjustment means 2130 and a source gas (ethylene for example), an atmosphere gas and catalyst activator material (water for example) are supplied from the gas supply pipe 2040. These gases which are supplied from the gas supply pipe 2040 are blow to the surface of the catalyst layer 2020 on the substrate 2010 in a roughly uniform amount from a roughly perpendicular direction to the plane of the substrate 2010 from an injection hole after forming a gas flow directed in a plurality of directions in a roughly parallel direction to the plane of the substrate 2010.

In addition, these gases are contacted with surface of the catalyst layer 2020 in an optimized amount using the carbon weight flux adjustment means 2130 after flowing the increased and adjusted heated volume 2150 and after optimizing the staying period of time by the staying time period adjustment means, and a CNT is efficiently grown (growth process) at a high speed and high yield from the catalyst microparticles attached to the substrate 2010. Furthermore, these gases are contacted with the catalyst microparticles on the substrate 2010 at a roughly equal staying time period using the turbulence control means 2200. In addition, after contacting with catalyst layer 2020 the gases are rapidly discharged from the gas discharge pipe 2050 and the generation of carbon impurities is controlled to a minimum. Because carbon impurities stick CNTs together, when there is a large amount of carbon impurities, it is difficult to unravel the three-dimensional shape CNT aggregate 100.

After production of a CNT is completed, in order to control the source gas, catalyst activate material and any resolvent, remaining within the synthesis furnace 2030 or any carbon impurities existing within the synthesis furnace 2030 from being attached to the CNT bulk aggregate 10, only the atmosphere gas is flown and contact of impurities with the CNT bulk aggregate 10 is controlled (carbon impurities attachment control process).

In this way, a plurality of CNTs simultaneously grown from the catalyst layer 2020 on the substrate 2010 are grown in a direction intersecting the catalyst layer 2020, are orientated and a CNT bulk aggregate 10 with a largely even height and high specific surface area and high purity is formed. In the orientated CNT bulk aggregate 10 synthesized by the method described above, CNT pairs appropriately wind together and can be easily peeled from the substrate in an aggregate shape with an appropriate size without the CNTs becoming separated. Furthermore, the generation and attachment of carbon impurities to the CNT bulk aggregate 10 are controlled and because appropriate gaps exist between CNTs, it is easy for CNTs to unwind and the level of dispersion is high. Furthermore, the CNTs have a high specific surface area. This type of CNT bulk aggregate 10 is suitable for obtaining a CNT aggregate 200

Next, the CNT bulk aggregate 10 is peeled from the substrate using a physical, chemical or mechanical method. A peeling method using an electrical field, magnetic field, centrifugal force and surface tension force, a direct peeling method for mechanically peeling from the substrate or a peeling method using pressure or heat may be used as the peeling method. A method of peeling from the substrate by sucking the CNT bulk aggregate 10 using a vacuum pump is suitable for obtaining a CNT aggregate the flake-shaped CNT aggregate 200.

The CNT aggregate 200 is obtained by classifying the CNT bulk aggregate 10 related to an embodiment of the present invention using a classification process. The classification process related to the present embodiment obtains a uniform sized CNT aggregate 200 by setting the size of the CNT aggregate 200 within a certain range. The CNT bulk aggregate 10 which is peeled from a synthesis substrate also includes synthesized components with a large clump shaped size. Since the dispersion properties of the CNT aggregate including these large sized clumps is low, the formation of a stable dispersion liquid is obstructed. Thus, only a CNT aggregate 200 from which the large sized clumps are removed by passing the aggregate through a net, filter or mesh for etc is suitable for obtaining a manufactured product with excellent dispersion properties.

The loosened CNT aggregate 200 including the three-dimensional shape CNT aggregate 100 manufactured in this way can provide a CNT aggregate having a mesh body consisting of a plurality of CNTs which are easy to loosen. In addition, it is possible to provide a stable CNT dispersion liquid and CNT molded product while maintaining excellent thermal conductivity, electrical properties and mechanical properties of the CNT and high dispersibility.

(Manufactured Product Using a Three-Dimensional Shape CNT Aggregate)

By using a CNT aggregate including the three-dimensional shape CNT aggregate 100 related to an embodiment of the present invention, it is possible to manufacture various products having excellent CNT characteristics. An example of the product is explained below. In addition, a CNT aggregate including the three-dimensional shape CNT aggregate 100 related to an embodiment of the present invention can also be used in the manufacture of products other than the product described below.

(CNT Aggregate Arranged with a Mesh Body)

It is possible to manufacture a CNT aggregate 300 arranged with a mesh body 360 using a CNT aggregate including the three-dimensional shape CNT aggregate 100 related to an embodiment of the present invention. A "CNT aggregate arranged with a mesh body" is a collective of CNTs obtained by a performing a dispersion process in the CNT aggregate 200. The CNT 300 arranged with the mesh body 360 makes it easy to manufacture a stable CNT dispersion liquid and CNT molded product while maintaining excellent thermal conductivity, electrical properties and mechanical properties of the CNT and high dispersibility.

Figure 8:
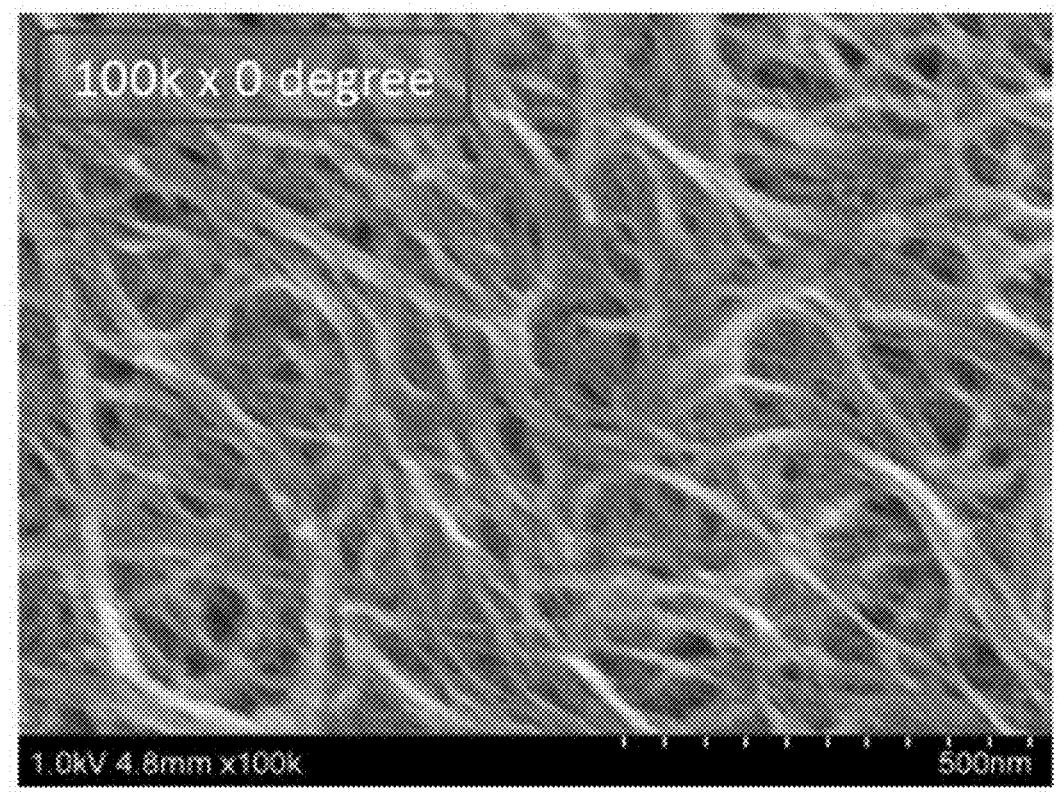
FIG. 8 is an SEM image of mesh body 360 arranged with a CNT aggregate 300 according to an embodiment of the present invention.
Figure 9:
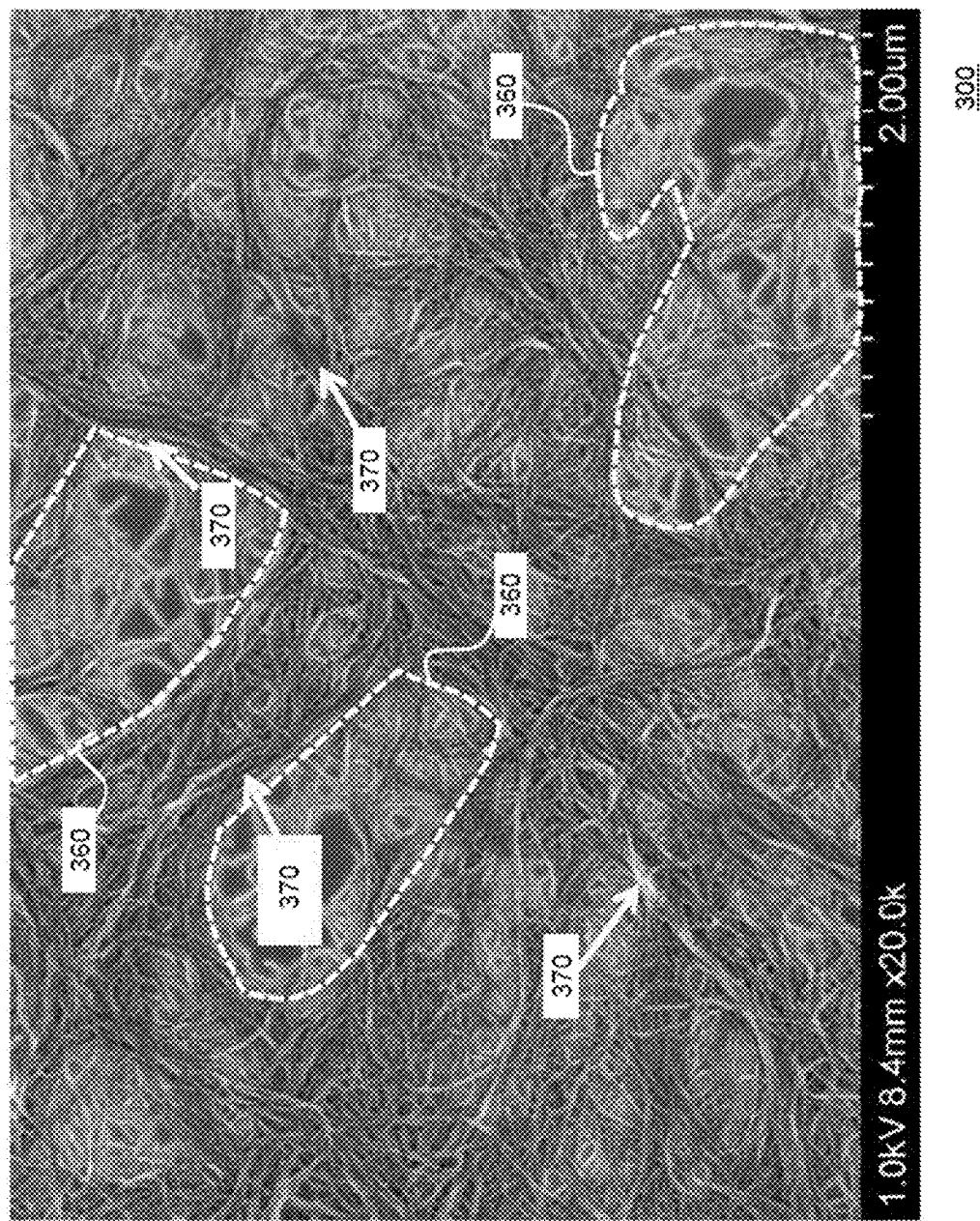
FIG. 9 is an SEM image of mesh body 360 arranged with a CNT aggregate 300 according to an embodiment of the present invention.
Figure 10A:
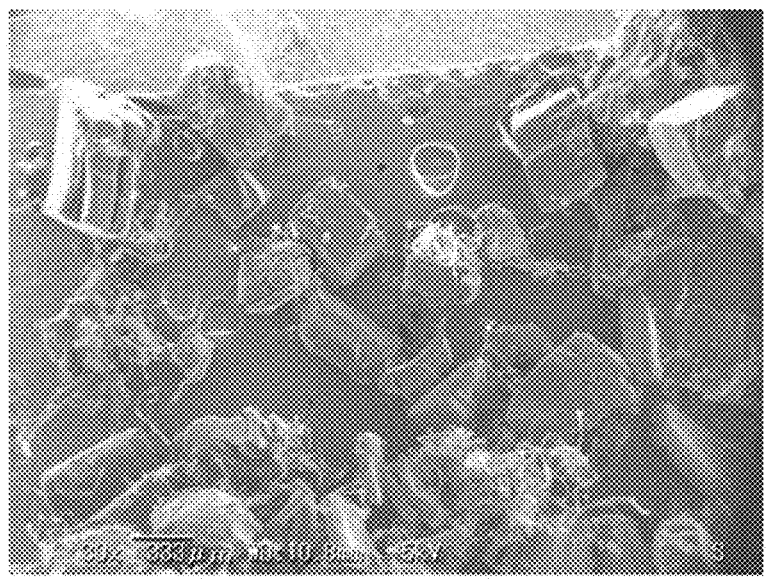
FIG. 10A is an SEM image of a CNT aggregate 200 including the CNT aggregate 100 having a three-dimensional shape according to an embodiment of the present invention.
Figure 10B:
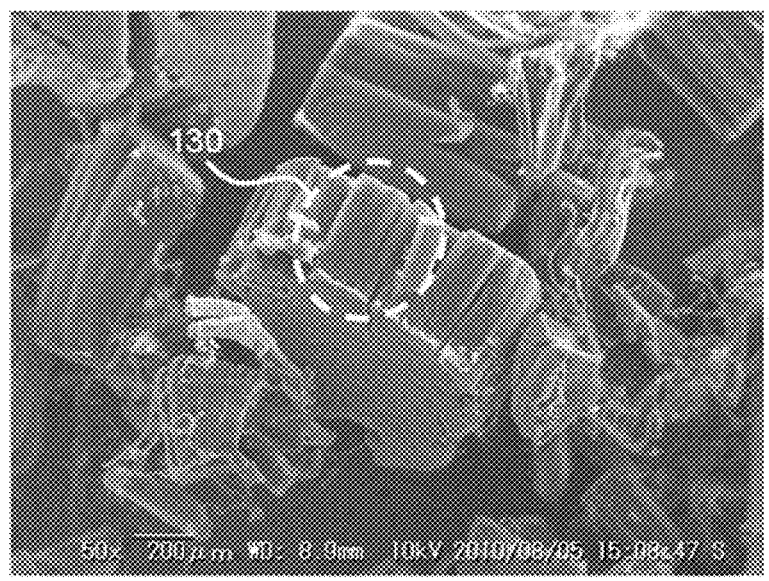
FIG. 10B is an SEM image of a CNT aggregate 200 including the CNT aggregate 100 having a three-dimensional shape according to an embodiment of the present invention.
Figure 10C:
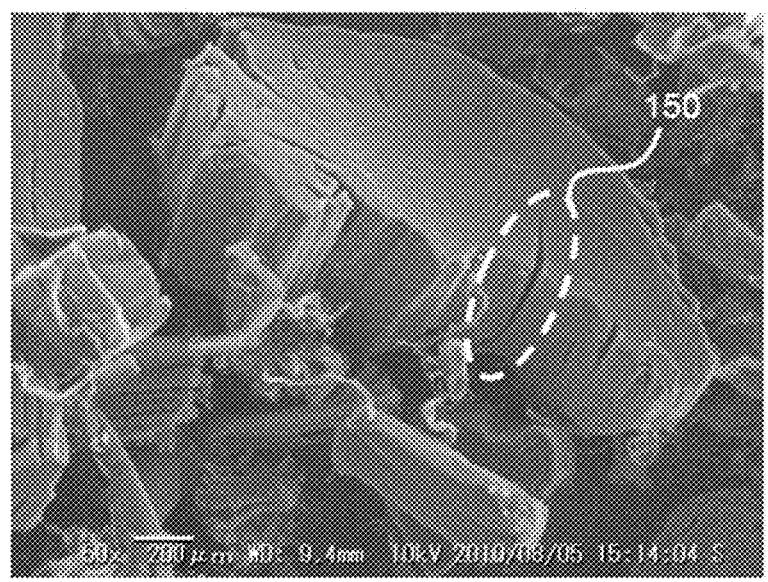
FIG. 10C is an SEM image of a CNT aggregate 200 including the CNT aggregate 100 having a three-dimensional shape according to an embodiment of the present invention.
Figure 10D:
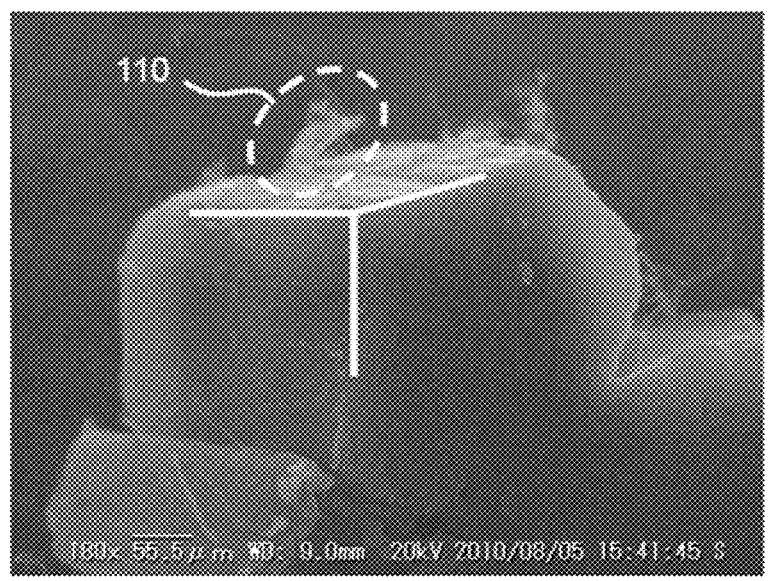
FIG. 10D is an SEM image of a CNT aggregate 200 including the CNT aggregate 100 having a three-dimensional shape according to an embodiment of the present invention.

In the present specification, as shown in the image SEM image in FIG. 8 and FIG. 9, a "mesh body" indicates a network form like a nonwoven fabric of CNT (or CNT bundle) and CNT and (or bundle of CNT) having fine pores (gap). The CNT aggregate having the mesh body 360 includes a gap which can easily impregnate a dispersion medium between CNTs, and because a gap is present between the CNTs, the aggregate has excellent dispersing ability. In addition, the CNT aggregate 300 is preferred to include a trunk part comprised from a plurality of orientated CNTs.

The CNT aggregate 300 can be extracted from a CNT dispersion liquid using the following procedure. A CNT dispersion liquid including the CNT aggregate containing 100 mg of CNTs is prepared. A Millipore filter (Filter Membrane: DURAPORE (Registered Trademark) (0.22 μm GV, diameter 45 mm) manufactured by MILLIPORE) is set into a container which can be vacuumed, and the CNT dispersion liquid is filtered using the Millipore filter. The CNT aggregate 300 is deposited on the Millipore filter and a thin film CNT molded product is formed with a thickness of around 70 μm. The CNTs deposited on the Millipore filter ware sandwiched between two pieces of filter paper and vacuum dried at 70° C. for 12 hours. After drying, the thin film CNT molded product is easily peeled from the Millipore filter and the CNT aggregate 300 can be obtained.

The mesh body 360 is a so called network of highly developed CNTs that run to the smallest parts of a wide region and provides a location for efficient interactions between a material different from a CNT such as a dispersion medium and the CNT aggregate 300. By arranging the CNT aggregate 300 with the mesh body 360, the CNT aggregate 300 has a function transmitting electrons, phonons or efficient mechanical stress provided a far distance without attenuation. That is, when manufacturing a molded product and/or composition from a CNT dispersion liquid in which the CNT aggregate 200 is a dispersion medium, because electrons, phonons or mechanical stress are transmitted efficiently between CNTs, the aggregate has the advantage of being able to exhibit sufficiently the inherent characteristics of the CNT.

(CNT Dispersion Liquid)

In the present specification, "CNT dispersion liquid" means a solvent which the CNT aggregate 200 dispersed in a dispersion medium. "dispersion" means a state in which the CNT aggregate 200 is visually scattered in the dispersion medium. In addition, "separation" means a state in which the CNT aggregate 200 is visually scattered in the dispersion medium. The CNTs are expressed as being dispersed even if the CNTs are in a state in which CNTs are unraveled one by one or a state in which the CNTs are entwined in a bundle or where bundles having various thicknesses are mixed together but scattered within the material. In addition, this also refers to a state in which the CNT aggregate and dispersion medium are visually divided and separated. The CNT aggregate 200 and dispersion medium do not separate even if the CNT dispersion liquid related to the present embodiment is left for 10 days and more preferably 20 days.

In the dispersion liquid related to the present embodiment, the interactions of a CNT and dispersion medium are increased and a CNT aggregate is stably dispersed in the dispersion medium. The CNT aggregate 300 related to the present embodiment includes excellent properties such as stable dispersion within a dispersion medium in order to obtain the properties and structure described above. As described below, a CNT dispersion liquid 400 manufactured by the method of the first example maintains dispersion without the CNT aggregate 300 and the dispersion medium separating even when kept standing for six months. However, the CNT dispersion liquid 4000 of comparative example 1 could only maintain dispersion for about one to two days and the CNT aggregate and dispersion medium are separated.

(Method for Producing a Dispersion Liquid)

The CNT dispersion liquid 400 related to the present embodiment can be prepared by dispersing the CNT aggregate 200 in a dispersion medium. The CNT aggregate 200 explained in the present embodiment can be manufactured using the following dispersion process. It is preferred that a drying process is performed on the CNT aggregate 200 before a dispersion process. In particular, performing a drying process is suitable for increasing dispersion properties when a hydrophobic solvent is used. Because the CNTs which form the CNT aggregate 200 related to the present embodiment has a large specific surface area and appropriate pore diameter, the water component within air is easily adsorbed when storing in air and transporting. Because pairs of CNTs stick together due to water surface tension in a state where the water component is adsorbed, it is very difficult for the CNT aggregate 200 to loosen and formation of a CNT aggregate 300 including a mesh body 360 having excellent dispersion properties is prevented. Thus, by performing a drying process of the CNT aggregate 200 before a dispersion process, the water component included in the CNT aggregate 200 is removed and it is possible to increase the dispersion properties to a dispersion medium. It is possible to use a heat drying or vacuum drying for example in the drying process related to the present embodiment and heat vacuum drying is preferably used.

In a dispersion of the CNT aggregate 200 it is possible to use a dispersion device such as a mixer, a homogenizer, a colloid mill, a flowjet mixer, a dissolver, a paint conditioner, a Menton emulsifier, a jet mill, and an ultrasonic device to disperse the CNTs. In addition, it is also possible to use a known porphyrization means, for example dispersers such as ball milling (ball mill, vibration ball mill, planetary ball mill, beads mill etc), sand milling, colloid milling, jet milling, roller milling, and furthermore, a vertical or horizontal type agitator mill, attritor, colloid mill, 3 roll mill, pearl mill, super mill, impeller, disperser, KD mill, dynatron or a pressure kneader can also be used. In particular, a method for dispersing CNTs using shear stress is preferred. A jet mill is preferred for the dispersion process of a dispersion liquid of the CNT aggregate 300 related to the embodiment of the present invention. In particular, it is possible to favorably use a wet type jet mill. A wet type jet mill squeezes mixed products in a solvent from a nozzle arranged in a sealed state within a pressure resistant container as a high speed flow. The CNT aggregate 200 is dispersed by collision of opposing flows, collision against container walls, turbulence produced by high speed flows and by a shear flow within the pressure resistant container. In the case where nano-jet mill (JN10, JN100, JN1000) manufactured by JOKOH ltd as the wet type jet mill, a processing pressure in the dispersion process of the CNT dispersion liquid 400 related to an embodiment of the present invention is preferred to be a value within a range of 10 MPa or more and 150 MPa or less.

The CNT dispersion liquid 400 related to an embodiment of the present invention manufactured as described above maintains excellent electrical properties, thermal conduction and mechanical properties of a CNT, has a high level of dispersion properties and a dispersion liquid of a CNT aggregate 300 arranged with a stable mesh body 360 can be provided.

It is possible to use any hydrophilic solvent or hydrophobic solvent as the solvent used in the dispersion medium of a CNT related to the present embodiment of the present invention. A carbonate group (ethylene carbonate, propylene carbonate, dimethyl carbonate, diethyl carbonate, methyl-ethyl carbonate, butylene carbonate etc), an ether group (tetrahydrofuran etc), a ketone group (acetone etc), a lower alcohol group (methanol, ethanol etc), and acetonitrile etc are available as the hydrophilic solvent. A hydrocarbon group (toluene, benzene, xylene, hexane, cyclohexane etc), a hydrocarbon group containing chlorine (methylene chloride, chloroform, chlorobenzene etc), an ether group (dioxane, tetrahydrofuran, methyl cellosolve etc), an ether alcohol group (ethoxy ethanol, methoxyethoxy ethanol etc), an ester group (methyl acetate, ethyl acetate etc), a ketone group (cyclohexanone, methyl ethyl ketone, 4-methylpentane-2-on, methyl isobutyl ketone etc), an alcohol group (isopropanol, phenol etc), a lower carboxylic acid (acetic acid etc), an amine group (triethylamine, trimethanolamine etc), a polar solvent containing nitrogen (N,N-dimethylformamide, nitromethane, N-methylpyrrolidone etc), and a sulfur compound (dimethylsulfoxide etc) are available as the hydrophobic solvent. Methyl isobutyl ketone (referred to below as MIBK) which is a good CNT solvent is preferred as the solvent used for the CNT dispersion liquid 400 related to the present embodiment.

A surface acting agent or various high polymer materials etc as a dispersant may be added to the CNT dispersion liquid 400. The dispersant is useful for improving the dispersion capability and dispersion stabilizing capability of the CNT aggregate 200. The surface acting agent is divided into an ionic surface acting agent and non-ionic surface acting agent. However, either surface acting agent can be used in the embodiment of the present embodiment. The following surface acting agents are available. The surface acting agent can be used alone or two or more can be mixed and used.

An ionized surface acting agent is divided into a cationic surface acting agent, an amphoteric surface acting agent and an anionic surface acting agent. Alkylamine salt, quaternary ammonium salt etc. are available as the cationic surface acting agent. Alkylbetaine group surface acting agent, amine oxide group surface acting agent are available as the amphoteric surface acting agent. An alkyl benzene sulfonate such as dodecylbenzenesulfonic acid, an aromatic sulphonic acid surface acting agent such as dodecyl phenyl ether sulfonate, monosoup anion surface acting agent, ethyl sulfate surface acting agent, a phosphate surface acting agent and a carbonic surface acting agent are available as an anionic surface acting agent. Among these, because of dispersion capability, dispersion stability capability and ability to be dispersed in high concentrations, a product including an aromatic ring, that is, an aromatic ionic surface acting agent is preferred, in particular, an aromatic ionic surface acting agent such as alkyl benzene sulfonate, dodecyl phenyl ether sulfonate is preferred.

Sugar ester surface acting agents such as sorbitan fatty acid ester, polyoxyethylene fatty acid ester, fatty acid ester surface acting agents such as polyoxyethylene resin acid ether, polyoxyethylene fatty acid diethyl, ether surface acting agents such as polyoxyethylene alkyl ether, polyoxyethylene alkyl phenyl ether, polyoxyethylene polypropylene glycol, and aromatic nonionic surface acting agents such as polyoxyalkylene octylphenyl ether, polyoxyalkylene nonylphenyl ether, polyoxyalkyl dibutylphenyl ether, polyoxyalkyl styrylphenyl ether, polyoxyalkyl benzylphenyl ether, polyoxyalkyl bisphenyl ether, and polyoxyalkyl cumylphenyl ether are available as the nonionic surface acting agent. Among these, because of dispersion capability, dispersion stability capability and ability to be dispersed in high concentrations, an aromatic nonionic surface acting agent is preferred, and among these, polyoxyethylene phenyl ether is preferred.

(CNT Molded Product)

In the present specification, a "CNT molded product" refers to extracting a CNT aggregate including a mesh body from a CNT dispersion liquid and everything that is in a structured state by molding or processing. "Molding or processing" indicates all operations that have passed an operation or process where the shape of the CNT aggregate 300 changes. Examples of a CNT molded product 500 are threads, chips, pellets, sheets, blocks which include the CNT aggregate 300. A product obtained as a result of combining these and further performing molding or processing is also referred to as CNT molded product 500. By extracting the CNT aggregate 300 from the stable and high dispersion CNT dispersion liquid 400 related to the present embodiment, it is possible to manufacture a CNT molded product 500 having excellent electrical, thermal conduction and mechanical properties.

(Molding Method)

A method of filtering a liquid including the CNT aggregate 300, draining using an evaporation method and molding into a film shape or sheet shape and a method of inserting a liquid including the CNT aggregate 300 into a mold and evaporating the dispersion medium can be exemplified as molding methods. In addition, it is also possible to use a method for compressing the CNT aggregate 300 using a press or a method of shaving or cutting using a knife.

In addition, it is also possible to obtain the CNT molded product 500 as a sheet such as what is called a bucky paper by depositing on filter paper by filtering the CNT dispersion liquid 400. This type of thin film shaped CNT molded product 500 includes excellent conductivity and can be favorably used as a capacitor electrode for example. In addition, the CNT molded product 500 related to the present embodiment can be used as a thin film CNT molded product 500 by spin coating, dip coating, spray up, coating, printing, extruding, casting or injecting the CNT dispersion liquid 400 on a substrate such as a silicon wafer for example.

A substrate is coated with the CNT dispersion liquid 400 and/or is attached with the CNT aggregate 300 and/or the CNT composition and is unaffected by shape, material or attachment method. The substrate may have curved or flexible shape in addition to a planar shape and may be of any thickness. The material may be various types of metal, ceramic, silicon substrate or resin. In addition, it is not necessary for the entire surface of the substrate to be covered by the CNT dispersion liquid 400 and/or the CNT aggregate 300 and/or the CNT molded product 500. For example, the substrate may be patterned using the CNT dispersion liquid 400 and/or the CNT aggregate 300 and/or the CNT molded product 500, and the substrate surface may be partially exposed or formed into an electronic circuit. In addition, the CNT dispersion liquid 400 and/or the CNT aggregate 300 and/or the CNT molded product 500 do not need to be attached by directly contact with the substrate but an intermediate layer may be arranged in order to improve thermal conductivity and adhesion etc with the substrate.

(CNT Composition)

In the present specification, a "CNT composition" refers to a state in which a CNT dispersion liquid and a CNT aggregate extracted from the CNT dispersion liquid and/or CNT molded product are dispersed with another material and used as a composition. A composition which includes the CNT aggregate 300 and/or the CNT composition 500 or CNT dispersion liquid 400 of the present embodiment can be used as a composition having excellent conduction or excellent strength or excellent thermal conduction or excellent conduction and strength. Here, another material is a resin, metal, glass, ion liquid or rubber for example. In addition, another material may also be an adhesive, cement, plaster or ceramic. These materials can be used alone or two or more can be used in combination.

In the CNT composition related to the present embodiment, a state in which CNTs are unraveled one by one or a state in which the CNTs are entwined in a bundle or where bundles having various thicknesses are mixed together but scattered within the material are also expressed as dispersed CNTs.

The contained amount of CNTs in a composition depends on the type of material other than the CNTs. However, it is possible to favorably contain 0.01% by weight or more and 20% by weight or less within the composition and more preferably 0.01% by weight or more and 10% by weight or less and still more preferably 0.01% by weight or more and 5% by weight or less and among these 0.05% by weight or more and 1% by weight or less is more preferable. Although depending on purpose, if too many CNTs are contained in the composition, the strength of the composition sometimes decreases.

Although there is no particular limitation to the resin which can be used as long as it can be mixed or dispersed with CNTs, it is possible to use a natural resin or synthetic resin. In addition, a thermosetting resin and a thermoplastic resin can be favorably used as the synthetic resin. The mold of a thermoplastic resin has excellent impact strength and high molding press or injection molding efficiency and is therefore is preferred.

Although there is no particular limitation to the thermosetting resin, for example an unsaturated polyester resin, vinylester resin, epoxy resin, cyanate ester resin, benzoxazine resin, phenol (resol type) resin, urea melamine resin, thermosetting polyamide, a copolymer of these, a modified product, and two or more blended resins may also be used as the thermosetting resin.

Although there is no particular limitation to the thermoplastic resin, for example polyester, polyolefin, styrene group resin, polyoxymethylene, polyamide, polycarbonate, polymethylene methacrylate, polyvinyl chloride, polyphenylene sulfide, polyphenylene ether, polyimide, polyamideimide, polyetherimide, polysulfone, polyether sulfone, polyketone, polyether ketone, polyether ether ketone, polyether ketone ketone, polyarylate, polyether nitrile, phenol (novolac type etc) resin, phenoxy resin, a fluorine group resin such as polytetrafluoroethylene, a thermoplastic such as a polystyrene series, polyolefin series, polyurethane series, polyester series, polyamide series, polybutadiene series, polyisoprene series, fluorine series etc, a copolymer or modified product of these and two or more blended resins may also be used as the thermoplastic resin.

Although there is no particular limitation to the metal which can be used as long as it can be mixed or dispersed with CNTs, it is possible to use aluminum, copper, silver, gold, iron, nickel, zinc, lead, tin, cobalt, chrome, titanium, tungsten in isolation or as a composite. Although there is no particular limitation to the glass which can be used as long as it can be mixed or dispersed with CNTs, it is possible to use soda-lime glass, lead glass or borosilicate glass etc.

There is no particular limitation to the rubber which is used in the CNT composition of the present invention and a natural rubber or synthetic rubber can be used. A versatile synthetic rubber such as emulsion polymerized styrene-butadiene rubber, solution polymerized styrene-butadiene rubber, high cys-1,4-polybutadiene rubber, low cys-1,4-polybutadiene rubber, high cys-1,4-polyisoprene, a diene series special rubber such as nitrile rubber, hydrogenated nitrile rubber, chloroprene rubber etc, an olefin series special rubber such as ethylene-propylene rubber, butyl rubber, halogenated butyl rubber, acrylic rubber, chlorosulfonated polyethylene etc, and other special rubbers such as hydrin rubber, fluorine rubber, polysulfide rubber or urethane rubber can also be used as the synthetic rubber. Among these rubber components, a natural rubber and versatile synthetic rubber are preferred from the viewpoint of balance between cost and characteristics. In addition, these rubber components can be used in isolation or two or more can be blended together.

Example 1

Examples of the CNT dispersion liquid 400 and CNT molded product 500 related to the present invention described above are explained in detail below. Furthermore, the examples are merely examples and the CNT dispersion liquid 400 and CNT molded product 500 of the present invention are not limited to these examples.

(Manufacture of a Bulk CNT Aggregate 10)

The CNT bulk aggregate 10 was manufactured using the manufacturing device described above and the same method using the CNT manufacturing device shown 2000 in FIG. 6 and FIG. 7. Referring to FIG. 6 and FIG. 7, a cylinder type silica tube (80 mm interior diameter) was used as the vertical type synthesis furnace 2030. The length of the heating means 2060 and the heated region 2070 was 265 mm. The substrate holder 2080 comprised from silica was arranged on the downflow 20 mm from a horizontal position of the center section. The substrate holder 2080 was arranged in a horizontal direction and a planar shaped substrate 2010 can be placed on the holder.

A 22 mm in diameter (20 mm interior diameter) gas supply pipe 2040 comprised from a heat resistant alloy was inserted in a vertical direction into an aperture arranged in the center of the upper wall of the synthesis furnace 2030, and a gas discharge pipe 2050 was inserted in a vertical direction in an aperture arranged in the center of the lower wall of the synthesis furnace 2030. A heating means 2060 comprised from a heating resistance coil arranged on the exterior periphery of the synthesis furnace 2030 and a heat temperature adjustment means was arranged, and a heated region 2070 heated to a certain temperature was set within the synthesis furnace 2030 (the total length of the heating means 2060 was 265 mm and the length of the heated region 2070 was 265 mm).

A gas flow formation means 2210 comprised from a heat resistant Inconel alloy which forms a 60 mm diameter cylinder shaped flat hollow structure was arranged to connect and link with an end of the gas supply pipe 2040 within the synthesis furnace 2030. The gas supply pipe 2040 was linked and connected to the center of the gas flow formation means 2210.

The gas flow formation means 2210 was placed in plane roughly parallel to the surface of the substrate 2010 and the center of the substrate 2010 was arranged to match the center of the gas flow formation means 2210. In addition, a gas injection means 2220 comprised of a plurality of 0.5 mm diameter injection holes was arranged on the gas flow formation means 2210. The gas flow formation means 2210 has a cylinder shape with a hollow structure and a surface size of 60.0 mm×16.7 mm and the diameter of the gas injection means 2200 was 0.5 mm and the number of gas injection means 2200 was 82.

The injection holes of the gas injection means 2200 were arranged in a position approaching the catalyst layer 2020 and a source gas was discharged at the catalyst from a roughly perpendicular direction to the plane of the substrate 2010. An approaching position refers to arrangement wherein the angle of the injection axis of the injection hole with respect to the normal line of the substrate was 0° or more and less than 90°. The distance between the gas injection means 2200 and the surface of the catalyst facing the gas injection means 2200 was 140 mm.

In this way, the punctate source gas supplied to the synthesis furnace 2030 from the gas supply pipe 2040 is diffused and distributed within the synthesis furnace 2030 and after forming a source gas flow in a 360° direction roughly parallel to the plane of the substrate 2010, the source gas contacts with the surface of the catalyst layer 2020 on the substrate 2010 from a roughly perpendicular direction to the plane of the substrate 2010.

Here, a distance of 140 mm was intentionally arranged between the gas flow formation means 2210, the gas injection means 2200 and the catalyst surface, the heated volume was increased and a staying time period adjustment means 2140 was arranged in the space of the heated volume 2150. The staying time period adjustment means 2140 is arranged with two flow correcting plates comprised from a heat resistant Inconel alloy 600 which forms a turbulence prevention means 2200 connected to the gas flow formation means 2210 arranged with 8 φ4 mm holes on the first layer and 101 φ0.5 mm holes on the second layer. The distance 140 mm between the gas flow formation means 2210, the gas injection means 2200 and the catalyst surface is defined as the length of the staying time period adjustment means 2140. In this device, the length of the staying time period adjustment means 2140 matches the distance with the gas injection means 2200 arranged on the gas flow formation means 2210 arranged facing the surface of the catalyst.

A carbon weight flux adjustment means 2130 is formed by a source gas cylinder 2090 for a carbon compound which becomes the source material of CNT and if necessary, a catalyst activator material cylinder 2100, an atmosphere gas cylinder 2110 for carrier gas of a source gas or catalyst activator material, and a reduction gas cylinder 2120 for reducing a catalyst are each connected to a gas flow device, and the amount of source was controlled by supplying the source gas to the gas supply pipe 2040 while independently controlling the amount of gas supplied by each cylinder.

A Si substrate (height 40 mm×width 40 mm) with a 500 nm thermal oxide film sputtered with 30 nm of $Al_2O_3$ and 1.8 nm of Fe which is the catalyst was used as the substrate 2010.

The substrate 2010 was transferred onto the substrate holder 2080 arranged 20 mm downflow from a horizontal position in the center of the heating region 2070 within the synthesis furnace 2030 (transfer process). The substrate was arranged in a horizontal direction. In this way, the catalyst on the substrate and the flow path of the source has intersects in a perpendicular direction and the source gas is efficiently supplied to the catalyst.

Next, the interior of the synthesis furnace 2030 set to a furnace pressure of $1.02 \times 10^5$ Pa was increased in temperature from room temperature to 810° C. over 15 minutes using the heating means 2060 while introducing a mixed gas (total flow amount: 2000 sccm) comprising 200 sccm of He and 1800 sccm of $H_2$ as a reduction gas, and the substrate attached with the analyst was further heated for 3 minutes while maintaining a temperature of 810° C. (formation process). In this way, the iron catalyst layer was reduced, conversion to micro particles suitable for growth of a single-walled CNT was encouraged and multiple nanometer sized catalyst particles were formed on an alumina layer.

Next, the temperature of the synthesis furnace 2030 with a furnace pressure of $1.02 \times 10^5$ Pa (air pressure) was set at 810° C. and a total flow amount of 2000 sccm comprising an atmosphere gas He: total flow amount ratio 84% (1680 sccm), $C_2H_4$ which is the source gas: total flow amount ratio 10% (200 sccm), and He containing $H_2O$ (absolute moisture 23%) as the catalyst activator material: total flow amount ratio 6% (120 sccm) was supplied so that the carbon weight flux became 192 g/cm$^2$/min (growth process). The furnace staying time period was 7 seconds.

In this way, a single-walled CNT was grown from each catalyst micro particle and an orientated CNT aggregate was obtained. In this way, CNTs were grown on the substrate 2010 under a high carbon environment containing the catalyst activator material.

After the growth process, only the atmosphere gas (total flow amount 4000 sccm) is supplied for 3 minutes and the remaining gas and generated carbon impurities and catalyst activator agent are removed (carbon impurities attachment control process, flush process).

Following this, after cooling the substrate to 400° C. or less, the substrate is brought out from the interior of the synthesis furnace 2030 (cooling, substrate bring out process) and the manufacturing process of a series of CNT bulk aggregates 10 is complete.

(Orientated CNT Aggregates)

A plurality of CNTs grown simultaneously from the catalyst layer 2020 on the substrate 2010 are grown and orientated in a direction intersecting the catalyst later 2020 and a CNT bulk aggregate 10 with a uniform height and high specific surface area and high purity is formed.

In the orientated CNT bulk aggregate 10 synthesized by the method described above, CNT pairs appropriately wind together and can be easily peeled from the substrate in an aggregate shape with an appropriate size without the CNTs becoming separated. Furthermore, the generation and attachment of carbon impurities to the CNT bulk aggregate 10 are controlled and because appropriate gaps exist between CNTs, it is easy for CNTs to unwind and the level of dispersion is high. Furthermore, the CNTs have a high specific surface area. This type of CNT aggregate is suitable for obtaining a stable CNT aggregate 200 including the three-dimensional shape CNT aggregate related to the present invention.

(Manufacture of CNT Aggregate 200 Including Three-Dimensional Shape CNT Aggregate 100)

The orientated CNT aggregate is sucked using a vacuum pump and peeled from the substrate and CNT aggregates attached to a filter are gathered. At this time, the orientated CNT aggregate is dispersed and a CNT aggregate 200 including a clump shape three-dimensional shape CNT aggregate 100 is obtained.

Next, the CNT aggregate 200 is placed on one net with 0.8 mm apertures and sucked via the net using a vacuum cleaner, the product which passes through is gathered, and categorized except for the clump shaped CNT aggregates 200 with a large size (categorization process).

The CNT aggregate 200 was measured using a Carl Fisher reaction method (Coulometric titration method trace moisture measurement device CA-200 manufactured by Mitsubishi Chemical Analytics). After drying the CNT aggregate 200 under certain conditions (under a vacuum for 1 hour at 200° C.), the vacuum is removed and about 30 mg of the CNTs are extracted in the glove box of a dry nitrogen gas current and the CNT aggregate 200 is moved to a glass boat of a moisture meter. The glass boat is moved to an aerification device, heated for 2 minutes at 150° C. and the aerated water component during this time is transferred by the nitrogen gas and reacts with iodine due to the Carl Fisher reaction. At this time, the amount of water component is detected by the amount of electricity required for generating the same amount of iodine that was consumed. The CNT aggregate 200 before drying has a water component of 0.8% by weight according to this method. The CNT aggregate 200 after drying has a reduced water component of 0.3% by weight.

(CNT Aggregate 200 Including Three-Dimensional Shape CNT Aggregate 100)

FIG. 10 to FIG. 14 show SEM images of the CNT aggregate 200 including the three-dimensional shape CNT aggregate 100 related to an embodiment of the present invention which is manufactured in this manner. FIG. 10A is an SEM image of the CNT aggregate 200 at a magnification of 30 times, FIGS. 10B and C at 50 times magnification and FIG. 10D at 180 times. Almost all of the CNT aggregates observed in FIG. 10A are arranged with a first surface (top surface) having at least three sides, a second surface (bottom surface) parallel to the first surface and having at least three sides, and a side surface, and further includes a bundle 110, a CNT separable part piece 130 and fissure 150, and it was confirmed that the three-dimensional shape CNT aggregate 100 related to the present embodiment was manufactured by the manufacturing method described above. In addition, an observation example of a CNT separable part piece 130 is shown in FIG. 10B, a fissure 150 in FIG. 10C and a bundle 110 in FIG. 10D respectively. In addition, in FIG. 10D, it is clear that the side surface 105 arranged on the bundle 110 of the outermost surface, is perpendicular to the top surface 101 and bottom surface 103.

Figure 11A:
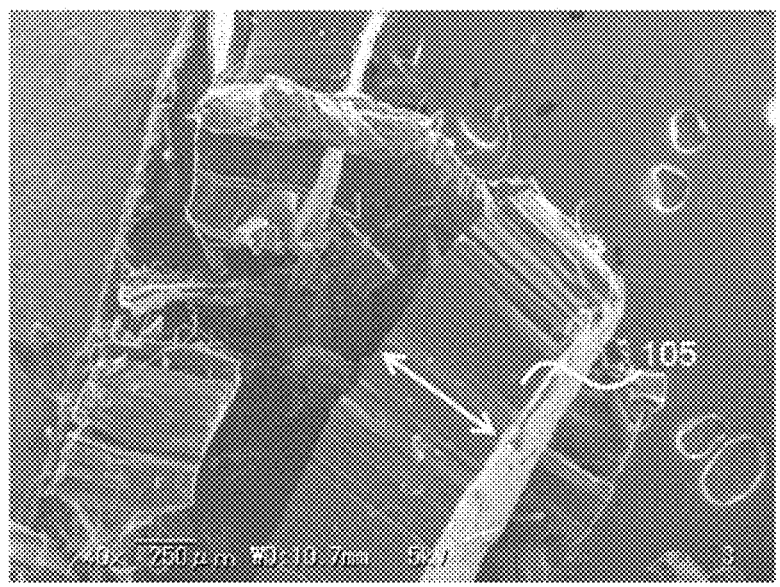
FIG. 11A is an SEM image of a CNT aggregate 200 including the CNT aggregate 100 having a three-dimensional shape according to an embodiment of the present invention.
Figure 11B:
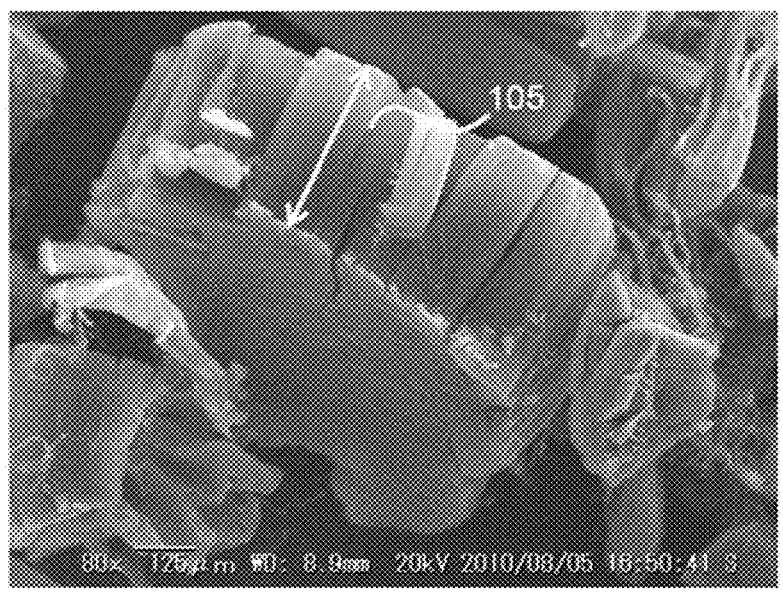
FIG. 11B is an SEM image of a CNT aggregate 200 including the CNT aggregate 100 having a three-dimensional shape according to an embodiment of the present invention.
Figure 11C:
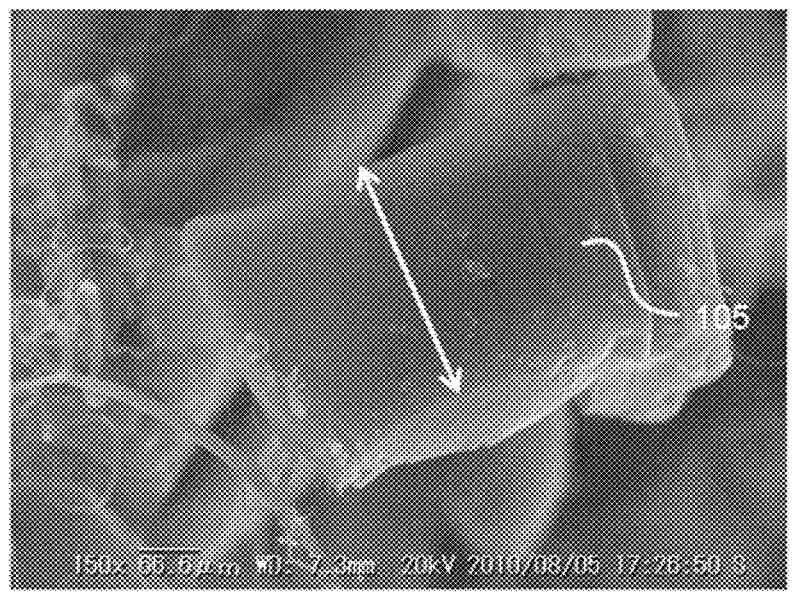
FIG. 11C is an SEM image of a CNT aggregate 200 including the CNT aggregate 100 having a three-dimensional shape according to an embodiment of the present invention.
Figure 11D:
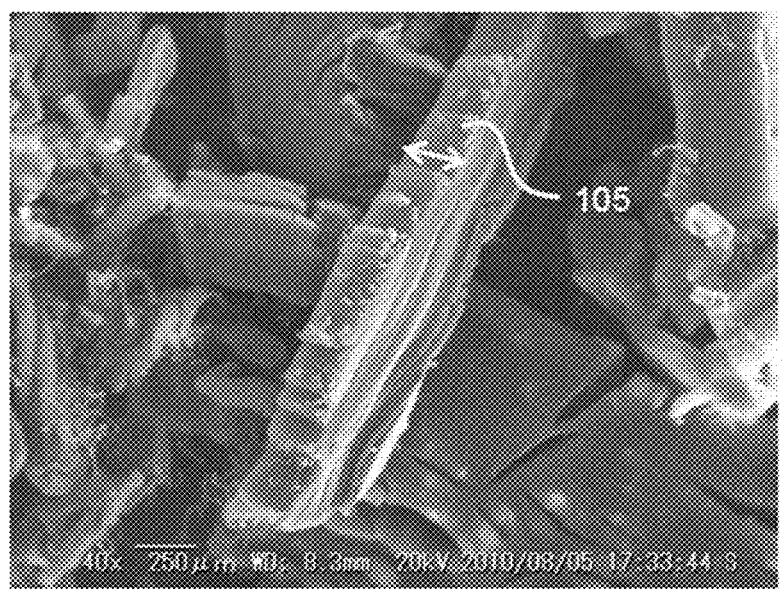
FIG. 11D is an SEM image of a CNT aggregate 200 including the CNT aggregate 100 having a three-dimensional shape according to an embodiment of the present invention.
Figure 12A:
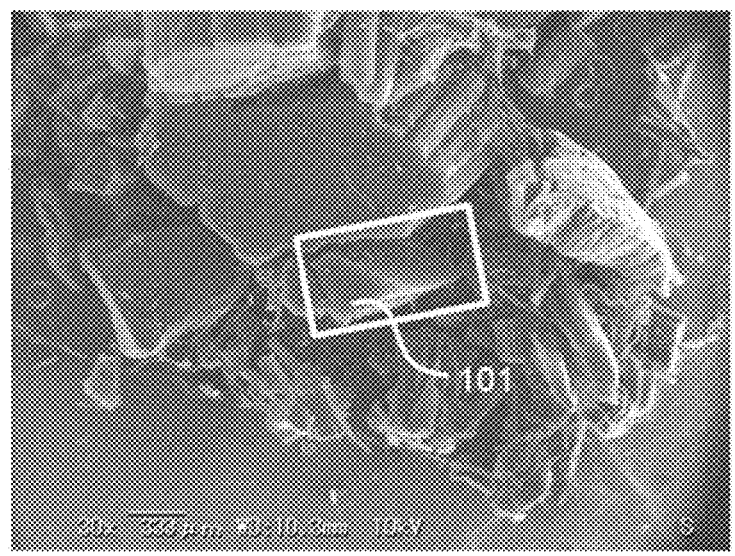
FIG. 12A is an SEM image of a CNT aggregate 200 including the CNT aggregate 100 having a three-dimensional shape according to an embodiment of the present invention.
Figure 12B:
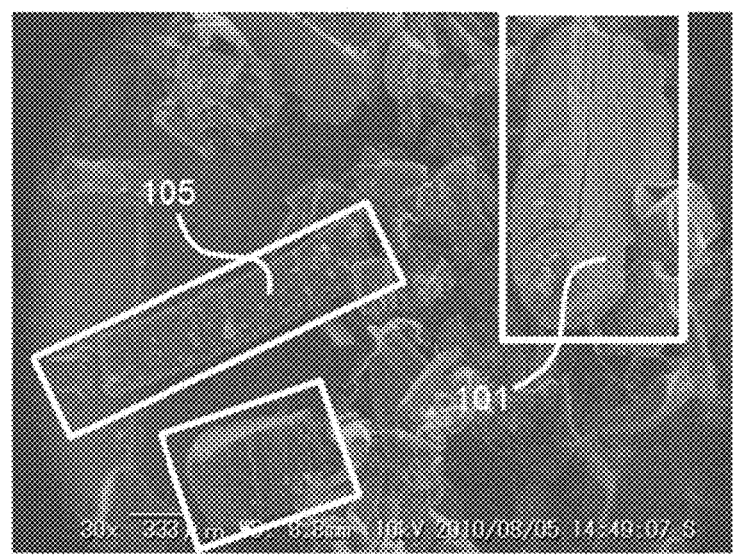
FIG. 12B is an SEM image of a CNT aggregate 200 including the CNT aggregate 100 having a three-dimensional shape according to an embodiment of the present invention.
Figure 12C:
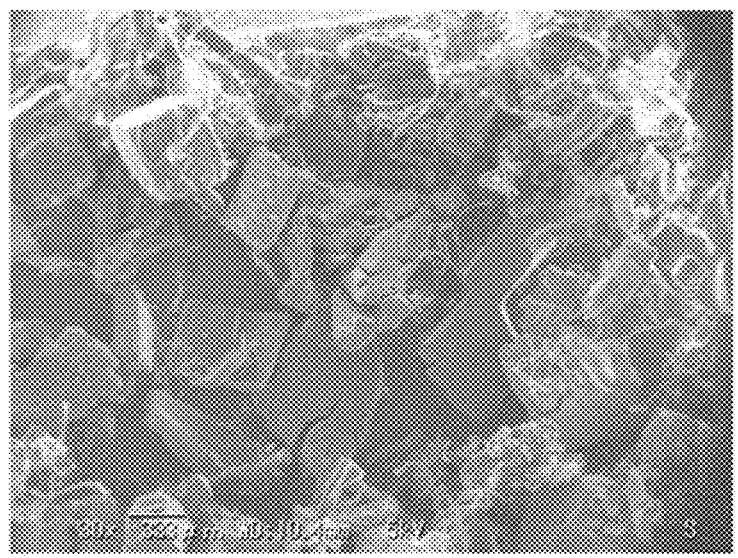
FIG. 12C is an SEM image of a CNT aggregate 200 including the CNT aggregate 100 having a three-dimensional shape according to an embodiment of the present invention.
Figure 12D:
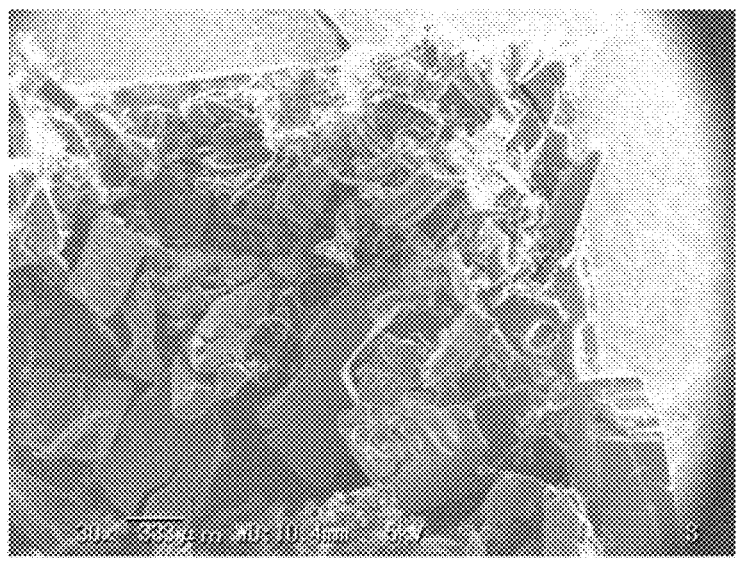
FIG. 12D is an SEM image of a CNT aggregate 200 including the CNT aggregate 100 having a three-dimensional shape according to an embodiment of the present invention.
Figure 13A:
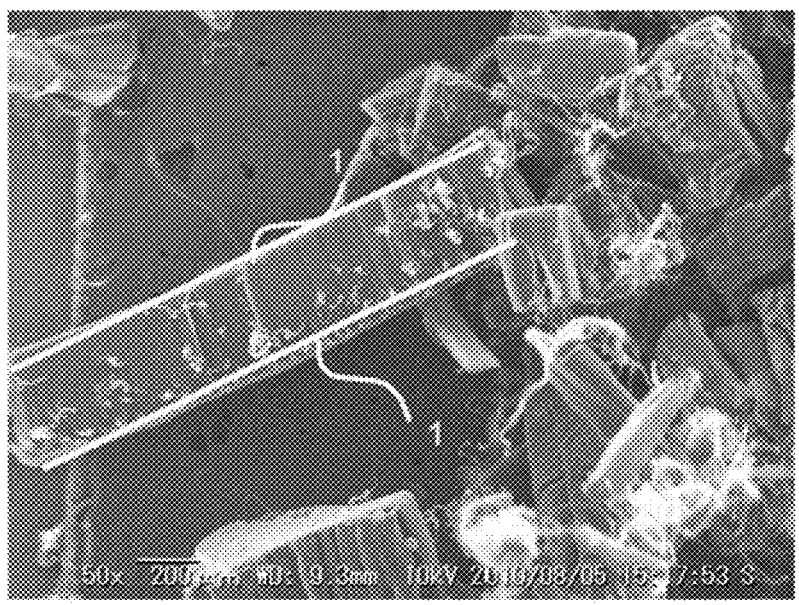
FIG. 13A is an SEM image of a CNT aggregate 200 including the CNT aggregate 100 having a three-dimensional shape according to an embodiment of the present invention.
Figure 13B:
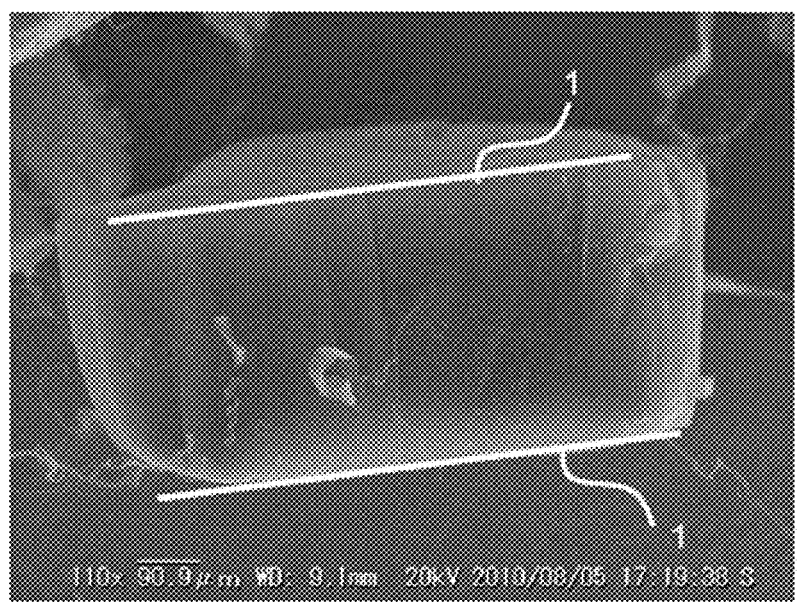
FIG. 13B is an SEM image of a CNT aggregate 200 including the CNT aggregate 100 having a three-dimensional shape according to an embodiment of the present invention.
Figure 13C:
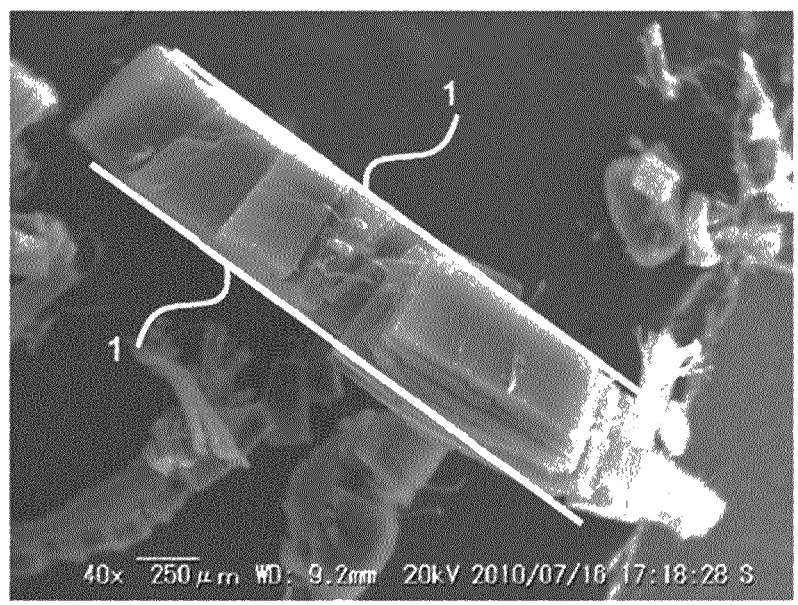
FIG. 13C is an SEM image of a CNT aggregate 200 including the CNT aggregate 100 having a three-dimensional shape according to an embodiment of the present invention.
Figure 13D:
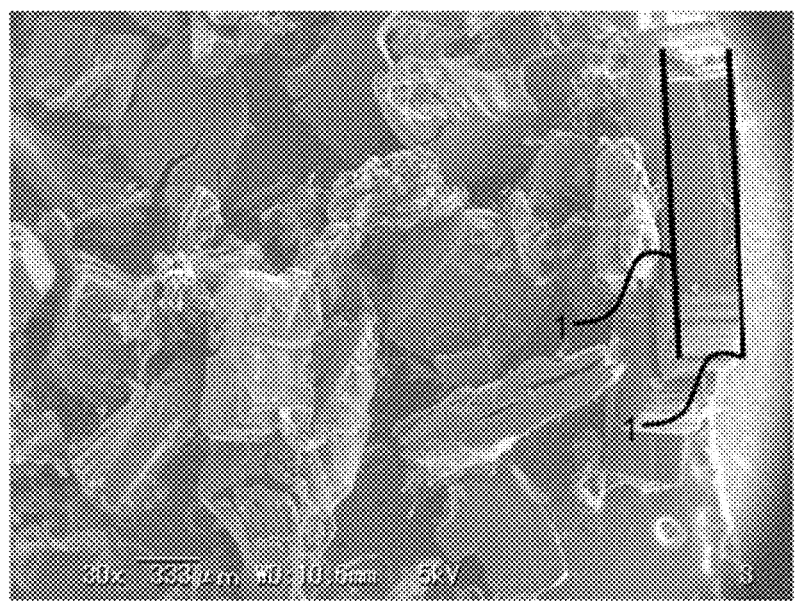
FIG. 13D is an SEM image of a CNT aggregate 200 including the CNT aggregate 100 having a three-dimensional shape according to an embodiment of the present invention.
Figure 14A:
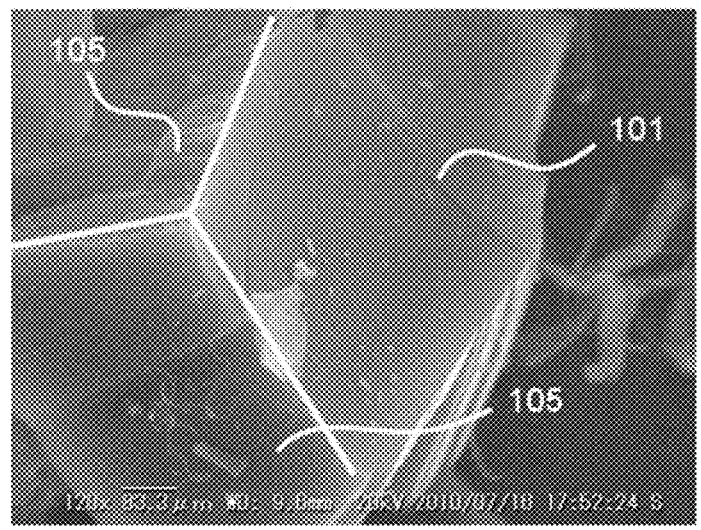
FIG. 14A is an SEM image of a CNT aggregate 200 including the CNT aggregate 100 having a three-dimensional shape according to an embodiment of the present invention.
Figure 14B:
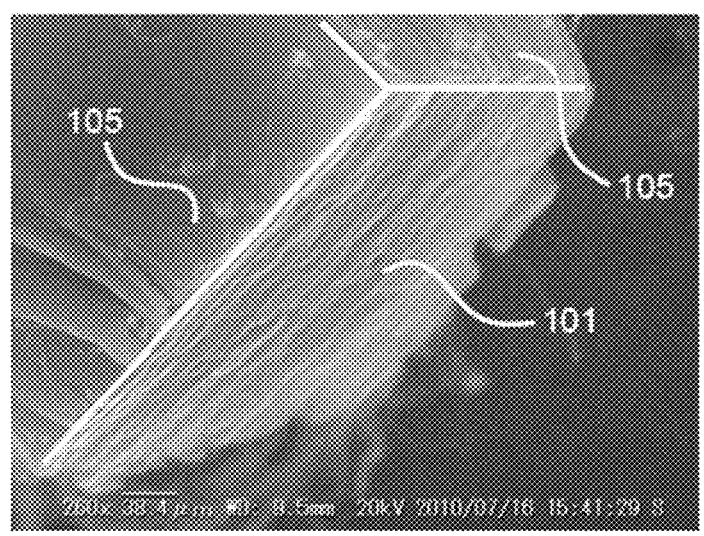
FIG. 14B is an SEM image of a CNT aggregate 200 including the CNT aggregate 100 having a three-dimensional shape according to an embodiment of the present invention.
Figure 14C:
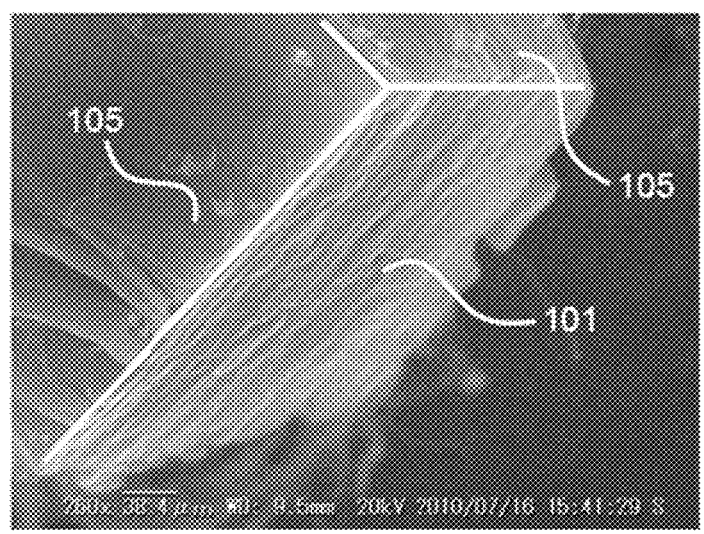
FIG. 14C is an SEM image of a CNT aggregate 200 including the CNT aggregate 100 having a three-dimensional shape according to an embodiment of the present invention.
Figure 14D:
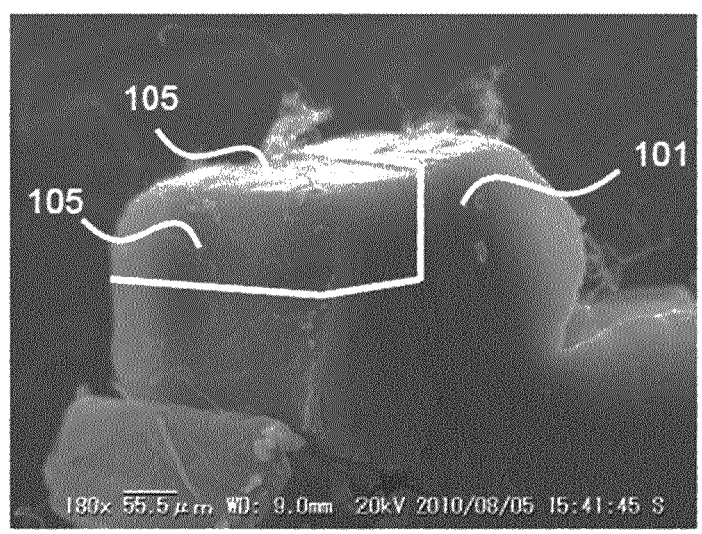
FIG. 14D is an SEM image of a CNT aggregate 200 including the CNT aggregate 100 having a three-dimensional shape according to an embodiment of the present invention.

FIG. 11A to FIG. 11D show that the three-dimensional shape CNT aggregate 100 can be manufactured with a side surface having various lengths. The length of the three-dimensional shape CNT aggregate 100 in FIG. 11A and FIG. 11B is 450 μm~550 μm and the length of three-dimensional shape CNT aggregate 100 in FIG. 11C is 250 μm. The arrows in the figure indicate the direction and orientation of the side surface 105 of the three-dimensional shape CNT aggregate. By adjusting the synthesis time, the three-dimensional shape CNT aggregate 100 according to the present embodiment can be manufactured with a side surface 105 with a length in the range of 10 μm or more and 1 cm or less.

FIG. 12A~FIG. 12D show the existence of the three-dimensional shape CNT aggregate 100 having various shapes in the CNT aggregate 200 related to the present embodiment. While the side surface 105 of the three-dimensional shape CNT aggregate 100 is a rectangle, the top surface 101 and bottom surface 103 are arranged with at least three sides and it can be seen that they have a variety of polygons (including circular).

FIG. 13A~FIG. 13D show that the top surface 101 and bottom surface 103 of the three-dimensional shape CNT aggregate 100 shape are arranged in parallel with each other. Line 1 in the diagram shows a parallel line. By using the manufacturing method described above, a plurality of CNTs grown simultaneously from the catalyst layer 2020 on a the substrate 2010 are grown and oriented in a direction perpendicular to the 2020 catalyst layer, and it is possible to form the CNT bulk aggregate 10 with a uniform height and use as a raw material for the CNT aggregate 200.

FIG. 14A~FIG. 14D show that the side surface 105 of the three-dimensional shape CNT aggregate 100 related to the present embodiment is perpendicular to the top surface 101 and bottom surface 103. Furthermore, it can be seen that the top surface 101 and bottom surface 103 are also perpendicular to the direction of orientation of the CNT aggregate. From the observation results described above, three-dimensional shape CNT aggregate 100 has a structure that is easy to peel a CNT aggregate parallel to the alignment direction, and as a result, the three-dimensional shape CNT aggregate 100 is easy to loosen.

(Characteristic of the Top Surface of the Three-Dimensional Shape CNT Aggregate 100)

Figure 15A:
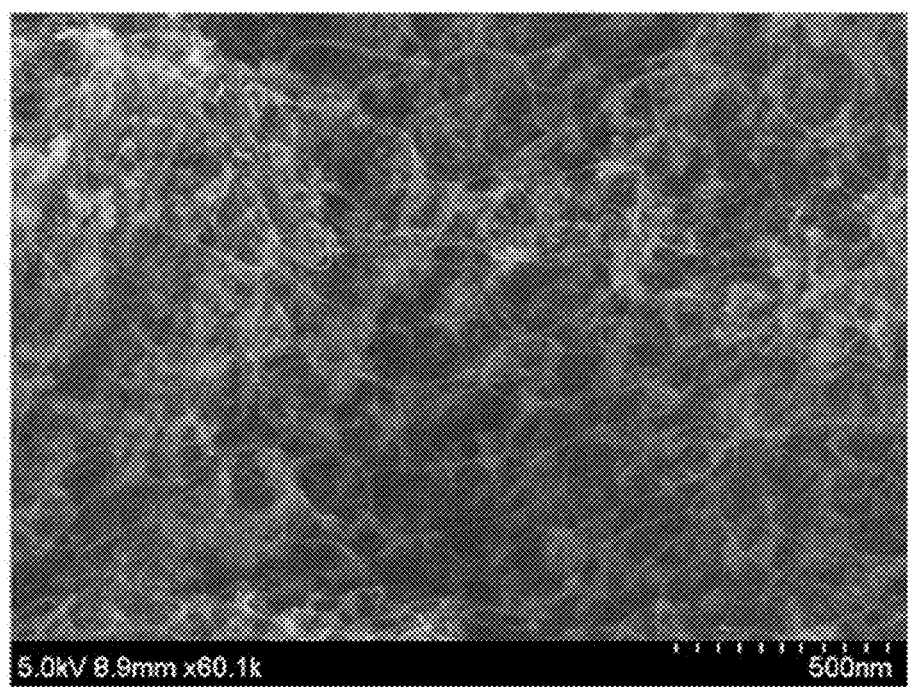
FIG. 15A is an SEM image of the top surface 101 of the CNT aggregate 100 having a three-dimensional shape according to an embodiment of the present invention.
Figure 15B:
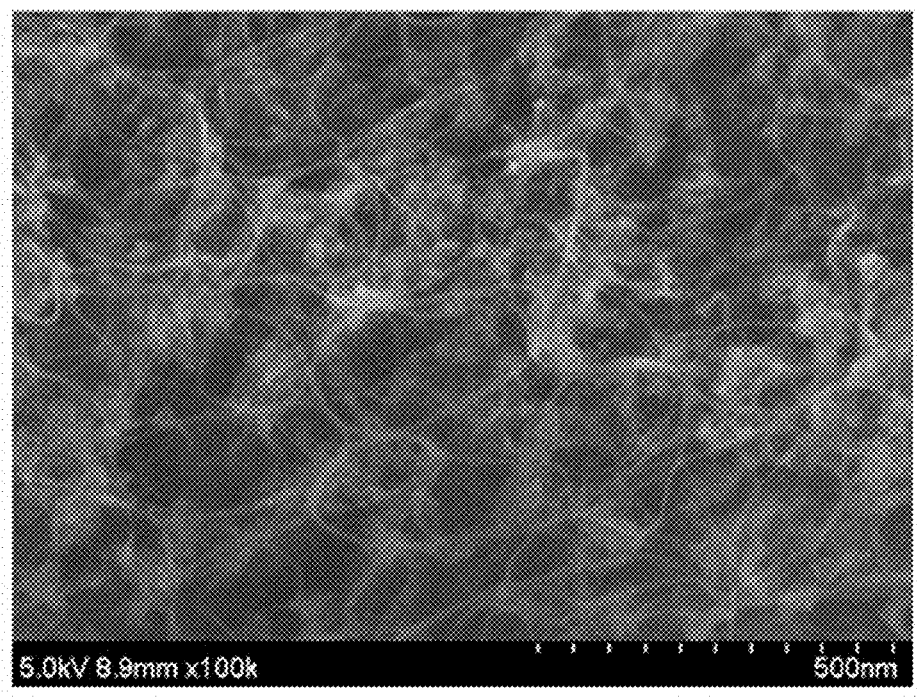
FIG. 15B is an SEM image of the top surface 101 of the CNT aggregate 100 having a three-dimensional shape according to an embodiment of the present invention.

FIG. 15A and FIG. 15D are SEM images of the top surface 101 of the three-dimensional shape CNT aggregate 100 observed from the direction perpendicular to the top surface 101. A CNT network was observed in the top surface 101 of the three-dimensional shape CNT aggregate 100 according to the present embodiment. It is clear that the end portions of the CNT in the top surface 101 are locally discrete, aggregate and a CNT network is formed.

Figure 16A:
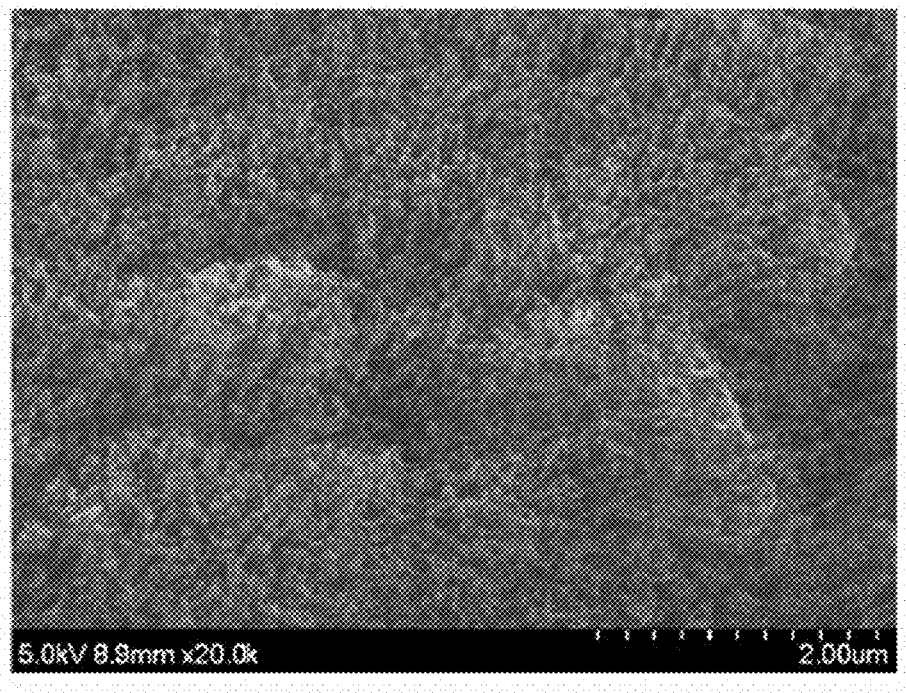
FIG. 16A is an SEM image of the top surface 101 of the CNT aggregate 100 having a three-dimensional shape according to an embodiment of the present invention.
Figure 16B:
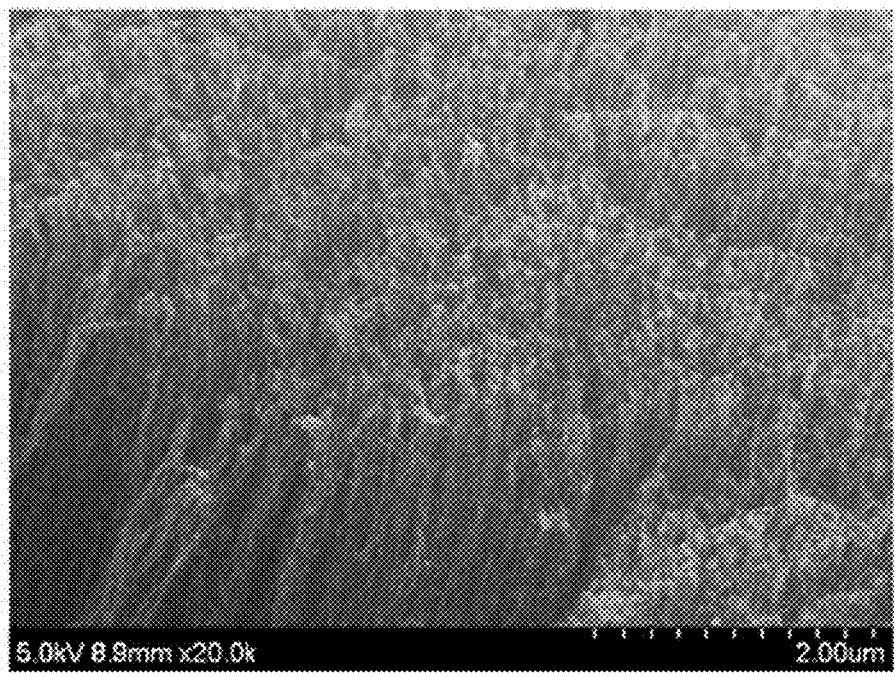
FIG. 16B is an SEM image of the top surface 101 of the CNT aggregate 100 having a three-dimensional shape according to an embodiment of the present invention.

In addition, FIG. 16A and FIG. 16B are SEM images of the top surface 101 of the three-dimensional shape CNT aggregate 100 observed obliquely from above. While the top surface 101 of the three-dimensional shape CNT aggregate 100 has a planar shape, because the CNT network is formed, it can be seen that there are microscopic irregularities. By arranging such a CNT network on the top surface 101, the three-dimensional shape CNT aggregate 100 related to the present embodiment does not come apart completely when the CNTs are loosened, and it was observed that a flak shaped CNT aggregate can be present.

(Characteristic of the Bottom Surface of the Three-Dimensional Shape CNT Aggregate 100)

FIG. 20~FIG. 23 are SEM images of the bottom surface 103 arranged in parallel to the top surface 101 of the three-dimensional shape CNT aggregate 100 related to the present embodiment. FIG. 20A and FIG. 20B are SEM images of the bottom surface 103 of the three-dimensional shape CNT aggregate 100 observed from a perpendicular direction. In addition, FIG. 21A and FIG. 21B are enlarged SEM images of the bottom surface 103 of the three-dimensional shape CNT aggregate 100 observed from a perpendicular direction. A CNT network was observed in the bottom surface 103 of the three-dimensional shape CNT aggregate 100 according to the present embodiment. It is clear that the end portions of the CNT in the bottom surface 103 are locally discrete, aggregate and a CNT network is formed. In this embodiment, between the top surface 101 and bottom surface 103, since no significant difference was observed in the CNT network, either surface could be the top surface (first surface) or bottom surface (second surface).

The Hermann orientation coefficient of the top surface 101 calculated by the method described in the specification was 0.05. In addition, the Herman orientation coefficient of the bottom surface 103 was 0.03.

(Characteristic of the Side Surface of the Three-Dimensional Shape CNT Aggregate 100)

Figure 17A:
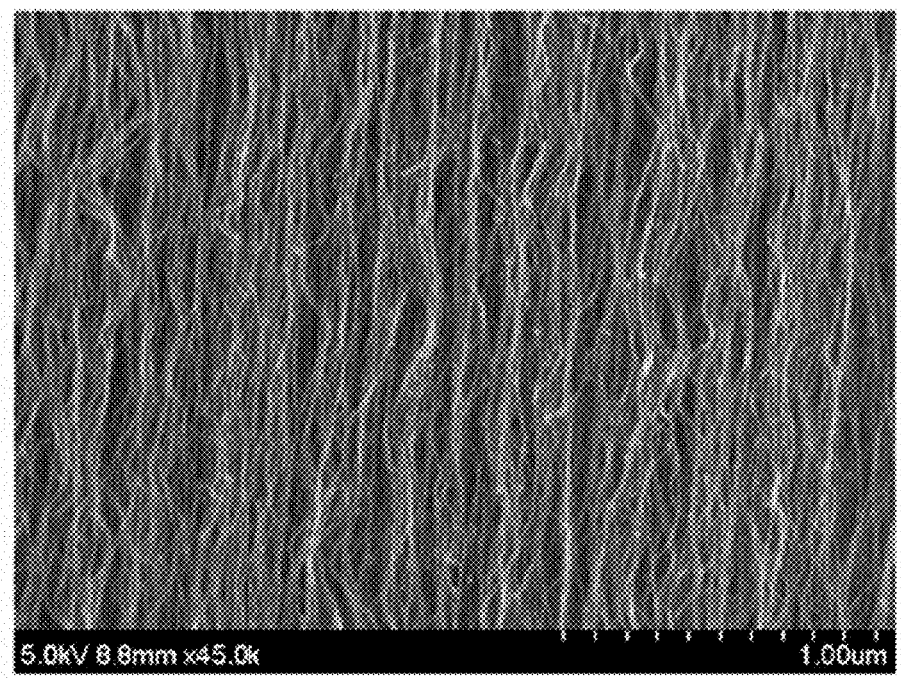
FIG. 17A is an SEM image of a side surface 105 of the CNT aggregate 100 having a three-dimensional shape according to an embodiment of the present invention.
Figure 17B:
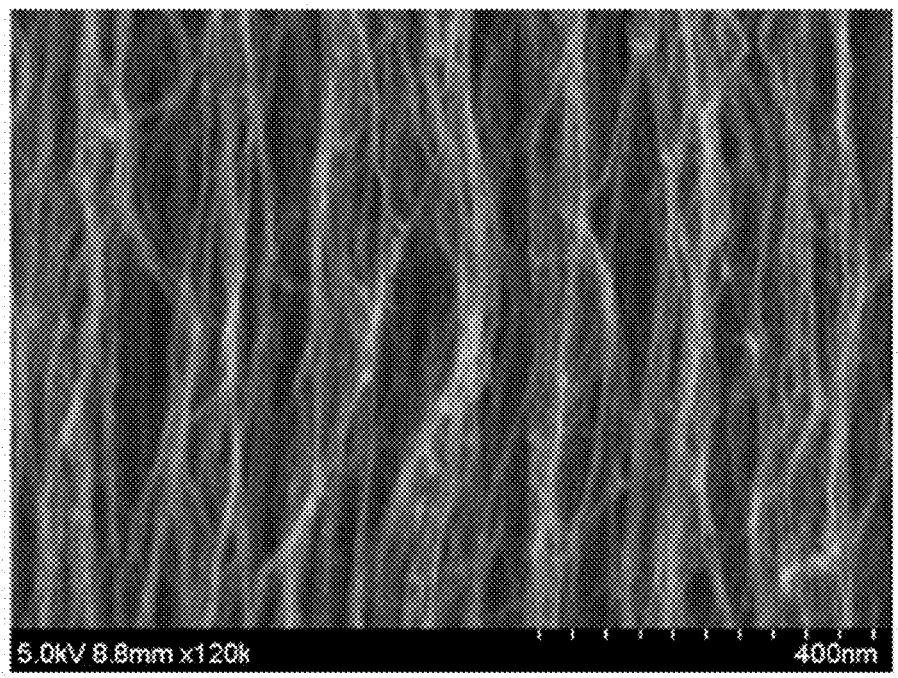
FIG. 17B is an SEM image of a side surface 105 of the CNT aggregate 100 having a three-dimensional shape according to an embodiment of the present invention.
Figure 18A:
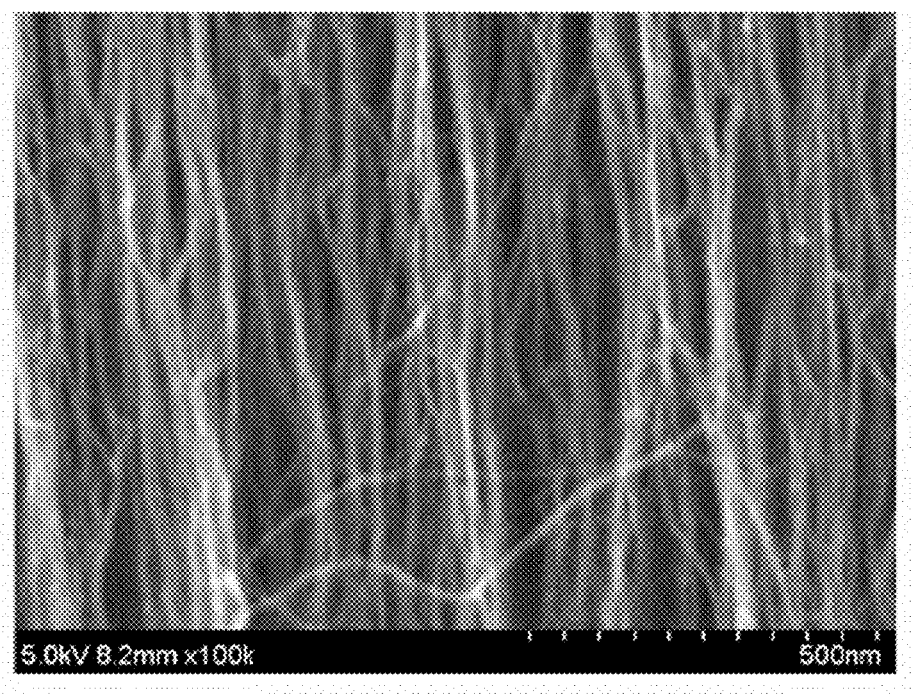
FIG. 18A is an SEM image of a side surface 105 of the CNT aggregate 100 having a three-dimensional shape according to an embodiment of the present invention.
Figure 18B:
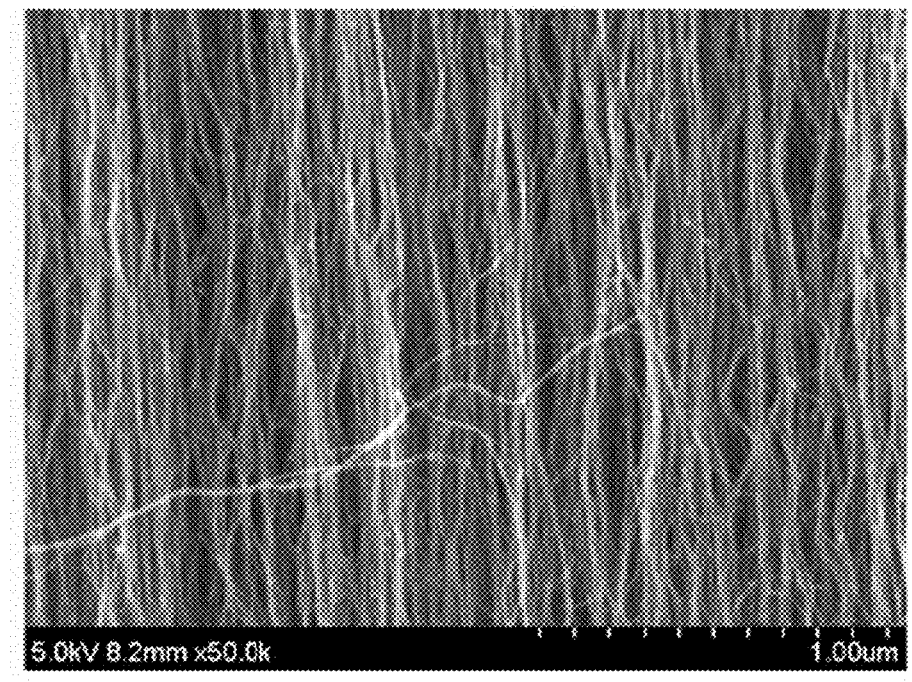
FIG. 18B is an SEM image of a side surface 105 of the CNT aggregate 100 having a three-dimensional shape according to an embodiment of the present invention.
Figure 19A:
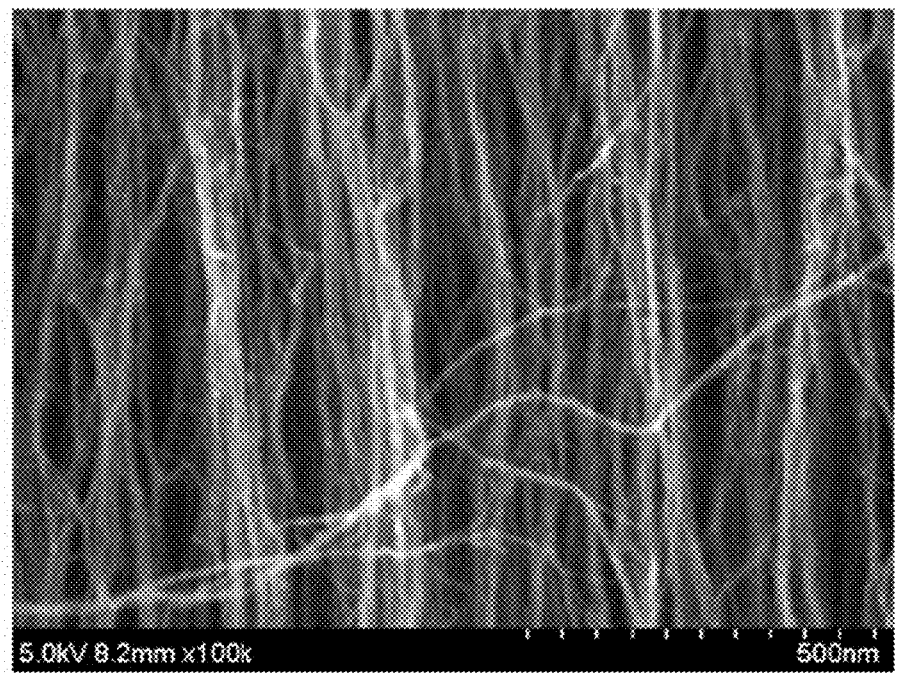
FIG. 19A is an SEM image of a side surface 105 of the CNT aggregate 100 having a three-dimensional shape according to an embodiment of the present invention.
Figure 19B:
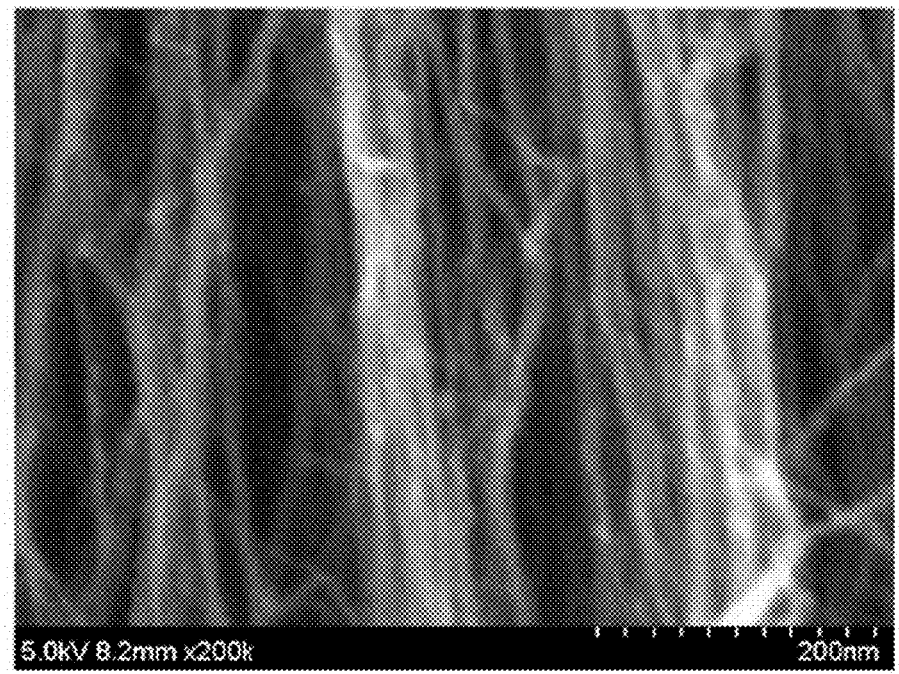
FIG. 19B is an SEM image of a side surface 105 of the CNT aggregate 100 having a three-dimensional shape according to an embodiment of the present invention.
Figure 20A:
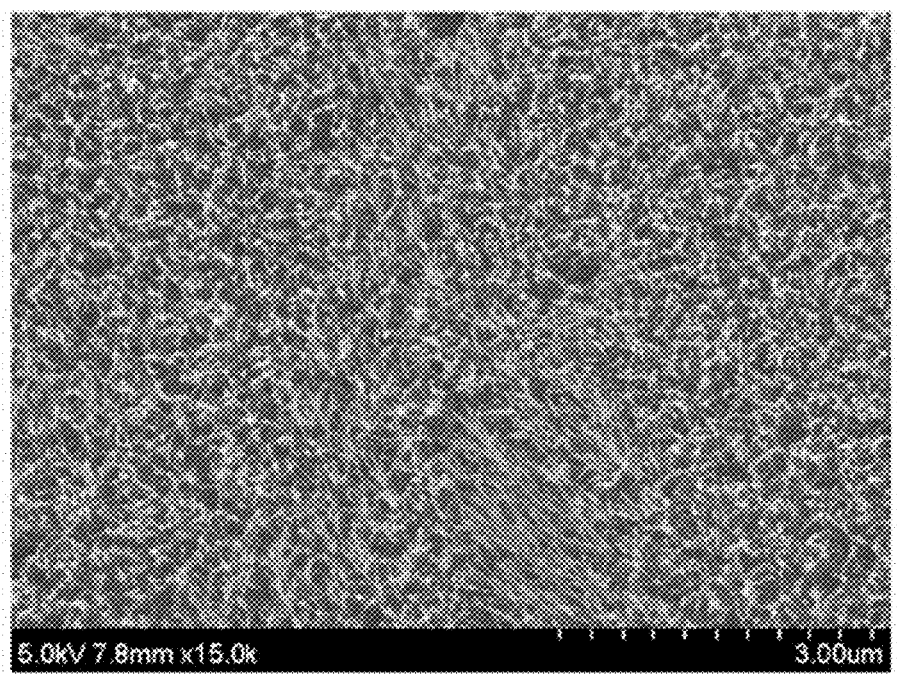
FIG. 20A is an SEM image of the bottom surface 103 of the CNT aggregate 100 having a three-dimensional shape according to an embodiment of the present invention.
Figure 20B:
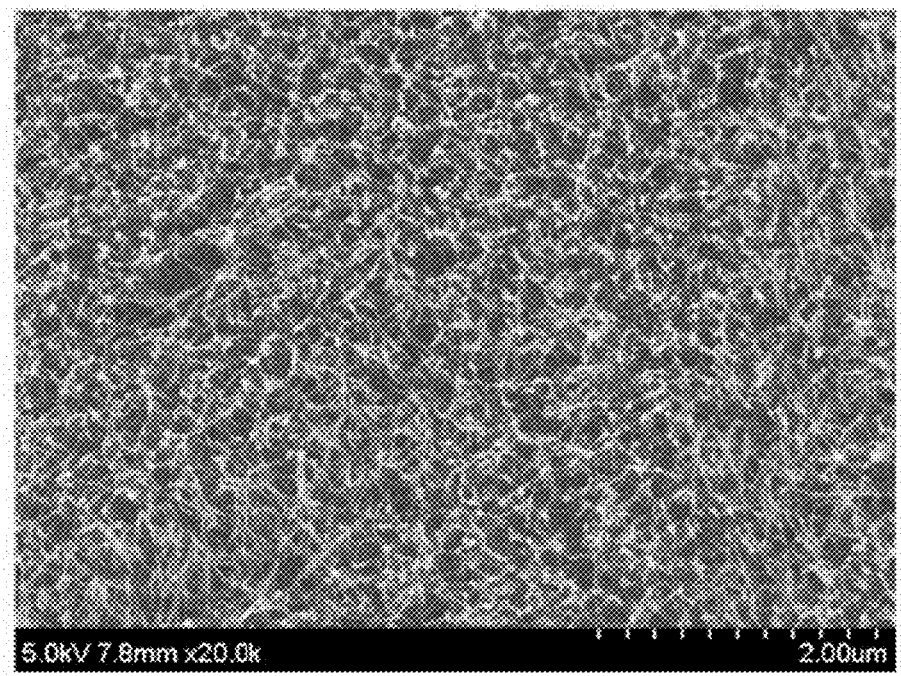
FIG. 20B is an SEM image of the bottom surface 103 of the CNT aggregate 100 having a three-dimensional shape according to an embodiment of the present invention.
Figure 21A:
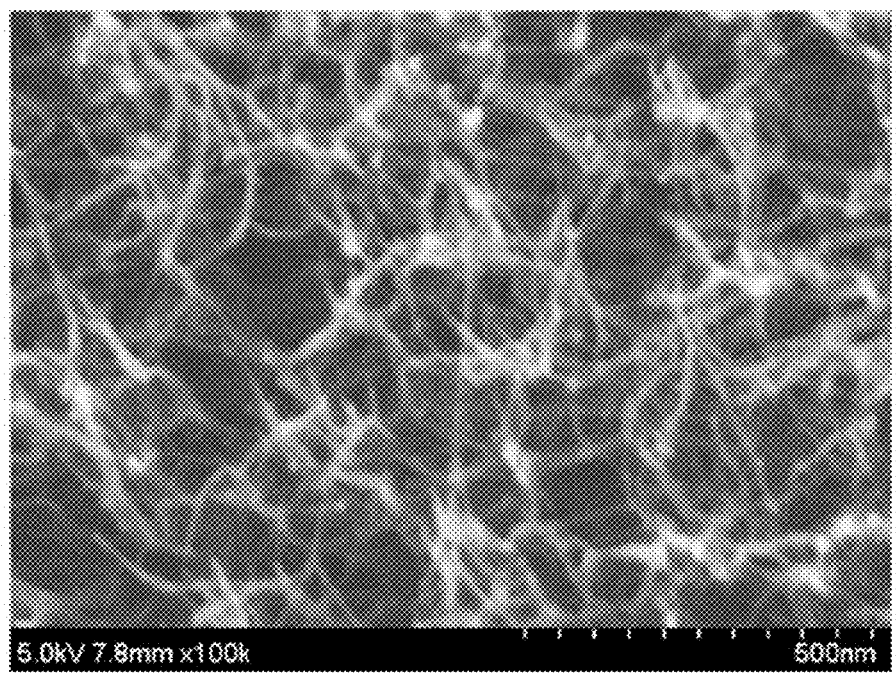
FIG. 21A is an SEM image of the bottom surface 103 of the CNT aggregate 100 having a three-dimensional shape according to an embodiment of the present invention.
Figure 21B:
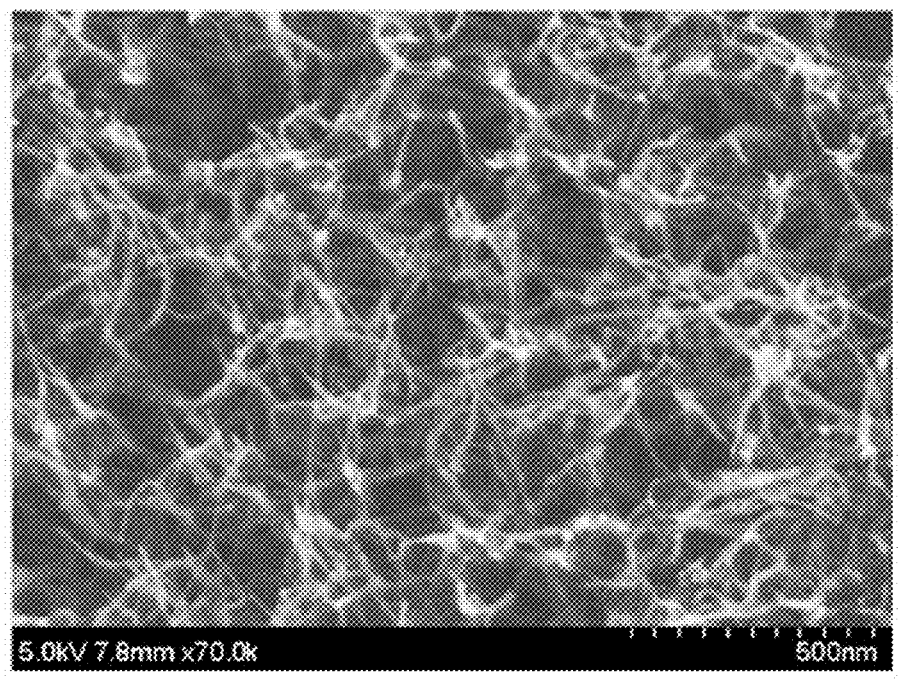
FIG. 21B is an SEM image of the bottom surface 103 of the CNT aggregate 100 having a three-dimensional shape according to an embodiment of the present invention.

FIG. 17 to FIG. 19 are SEM images of a side surface 105 of the three-dimensional shape CNT aggregate 100 related to an embodiment of the present invention. It can be seen that that the three-dimensional shape CNT aggregate 100 has orientation in the side surface 105. The Hermann orientation coefficient of the side surface 105 calculated by the method described in the specification was 0.63.

The interactions of opposing CNTs which form the three-dimensional shape CNT aggregate 100 with high level of orientation are weak, a CNT separable part piece 130 is easily peeled off from the three-dimensional shape CNT aggregate 100, the aggregate is easily to loosen and when cracks occur in the three-dimensional shape CNT aggregate 100 with a fissure 150 as a starting point, it was observed that the CNT is easily peeled and easy to loosen.

Figure 22A:
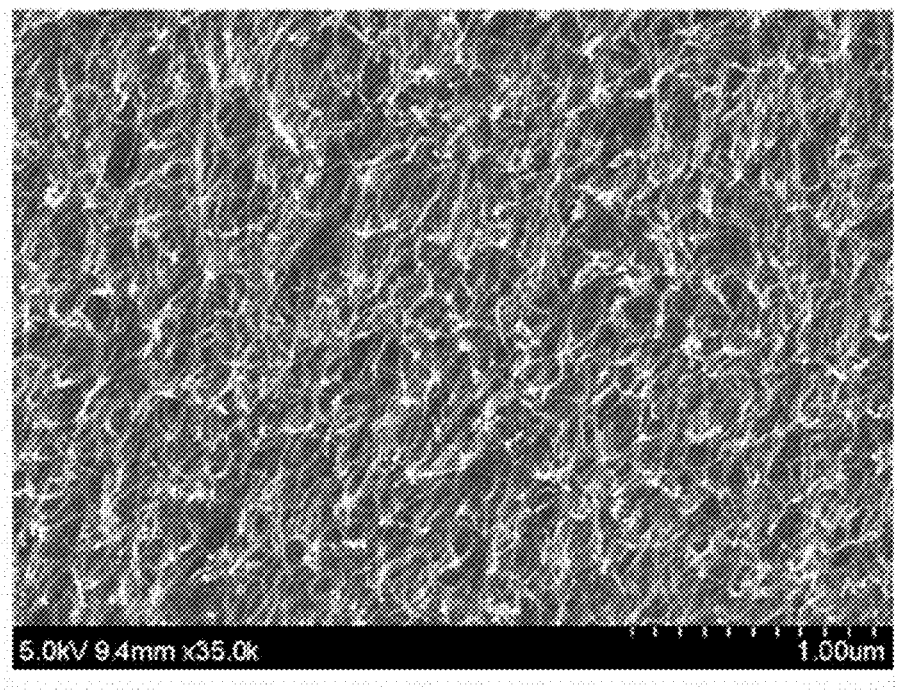
FIG. 22A is an SEM image of the bottom surface 103 of the CNT aggregate 100 having a three-dimensional shape according to an embodiment of the present invention.
Figure 22B:
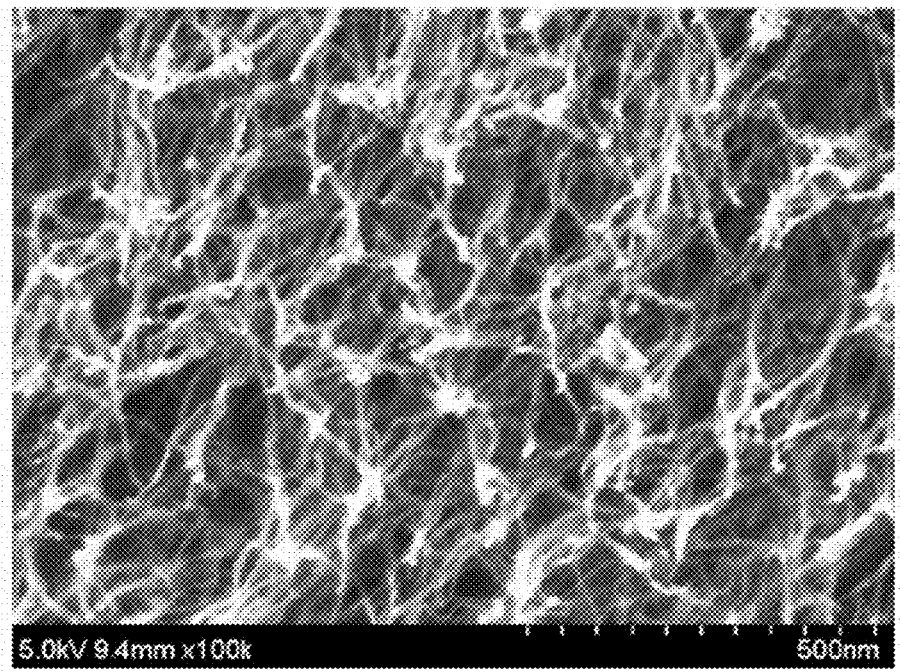
FIG. 22B is an SEM image of the bottom surface 103 of the CNT aggregate 100 having a three-dimensional shape according to an embodiment of the present invention.
Figure 23A:
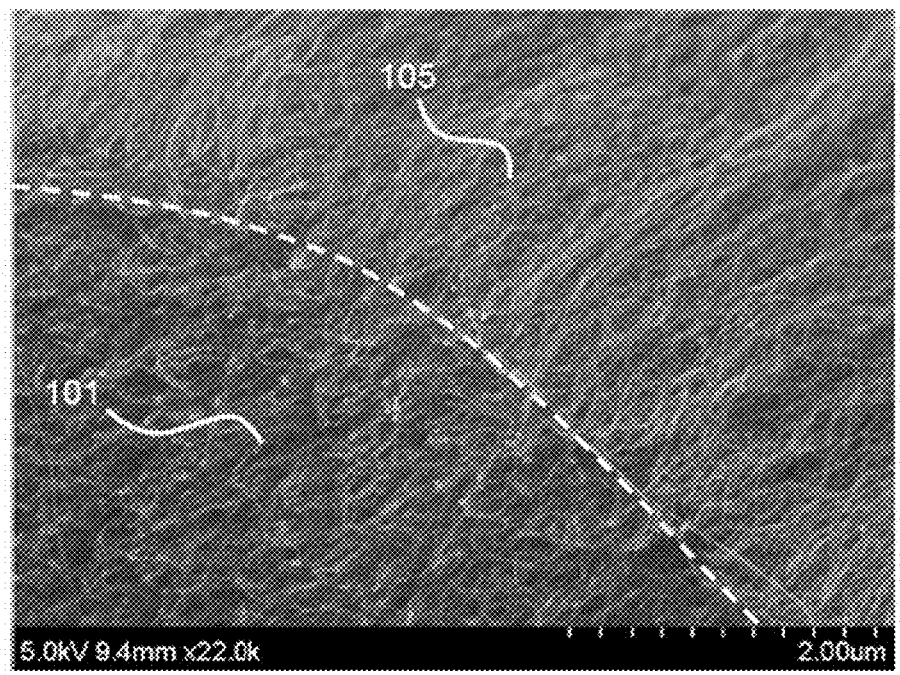
FIG. 23A is an SEM image of the bottom surface 103 of the CNT aggregate 100 having a three-dimensional shape according to an embodiment of the present invention.
Figure 23B:
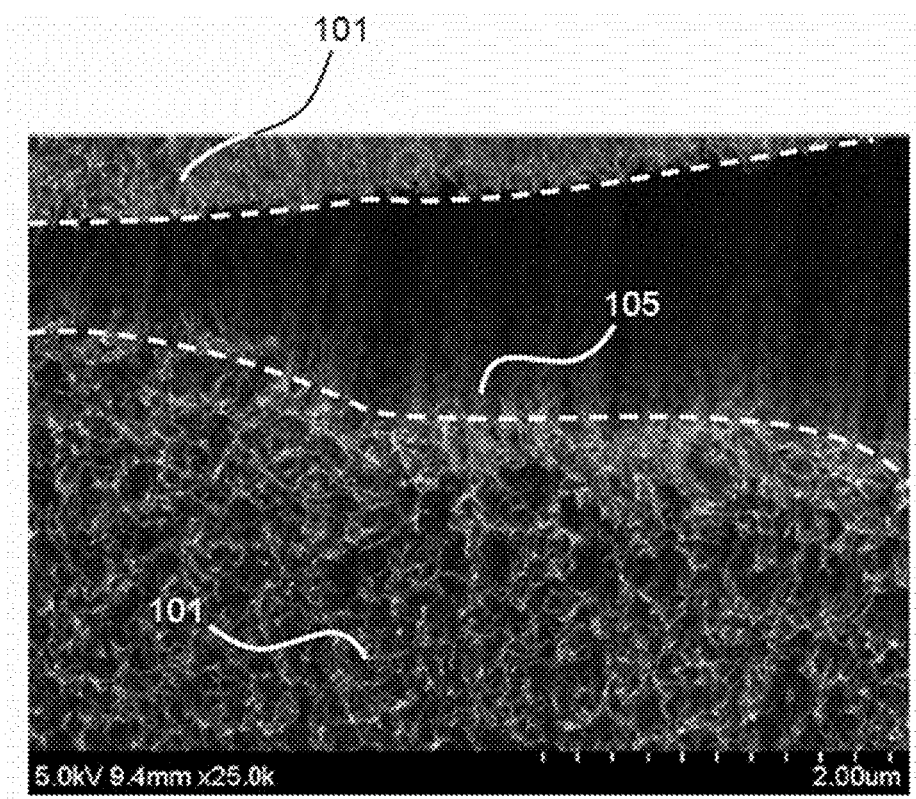
FIG. 23B is an SEM image of the bottom surface 103 of the CNT aggregate 100 having a three-dimensional shape according to an embodiment of the present invention.

In addition, FIG. 22A and FIG. 22B are SEM images of the bottom surface 103 of the three-dimensional shape CNT aggregate 100 observed obliquely from above. While the bottom surface 103 of the three-dimensional shape CNT aggregate 100 has a planar shape, because the CNT network is formed, it can be seen that there are microscopic irregularities. Furthermore, FIG. 23A is an SEM image of a side section of the bottom surface 103 of the three-dimensional shape CNT aggregate 100 and FIG. 23B is an SEM image of the fissure 150 of the bottom surface 103 viewed obliquely from above. By arranging such a CNT network on the bottom surface 103, the three-dimensional shape CNT aggregate 100 related to the present embodiment does not come apart completely when the CNTs are loosened, and it was observed that a flake shaped CNT aggregate can be present.

(Bundle)

Figure 24A:
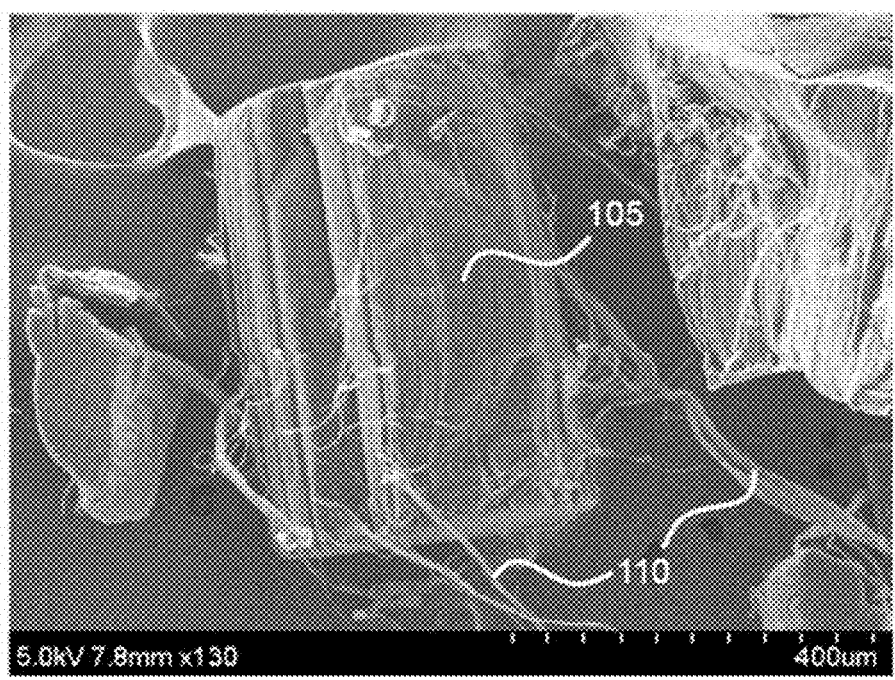
FIG. 24A is a SEM image of CNT bundles 110 extending from the outermost surface of the side surface 105 of the CNT aggregate 100 having a three-dimensional shape according to an embodiment of the present invention.
Figure 24B:
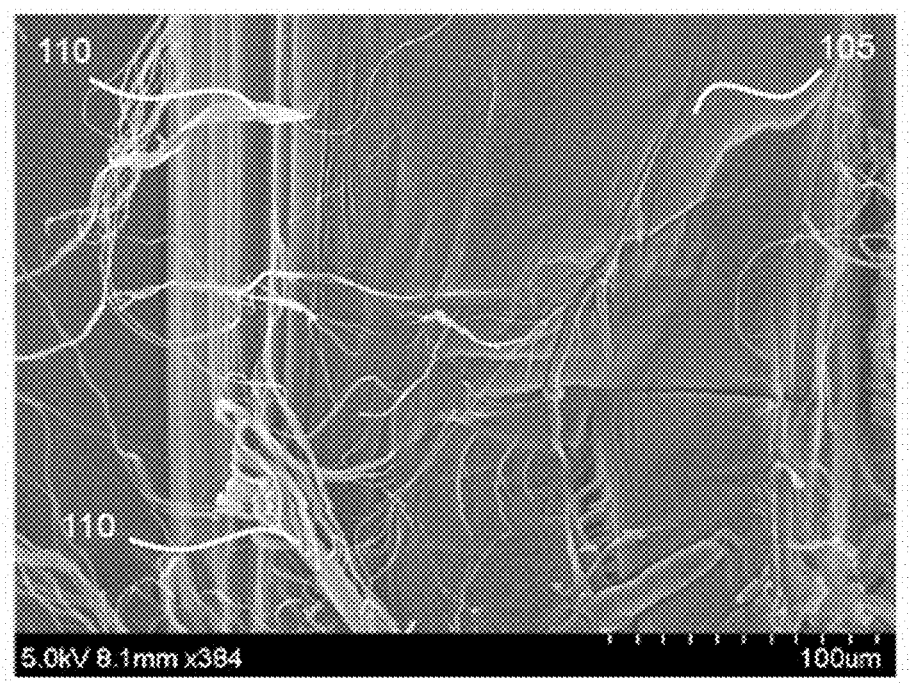
FIG. 24B is a SEM image of CNT bundles 110 extending from the outermost surface of the side surface 105 of the CNT aggregate 100 having a three-dimensional shape according to an embodiment of the present invention.
Figure 25A:
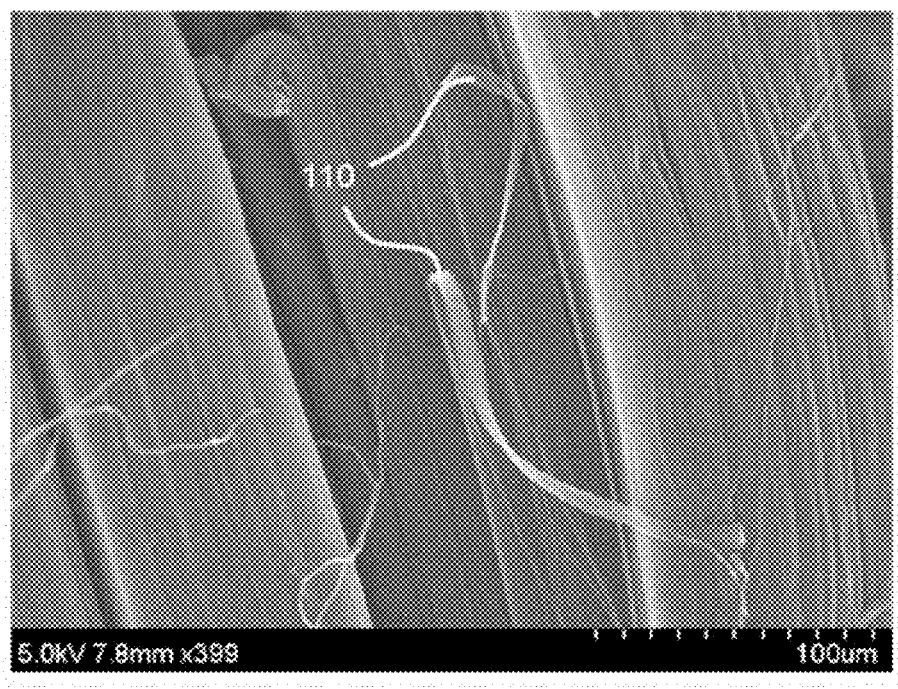
FIG. 25A is a SEM image of CNT bundles 110 extending from the outermost surface of the side surface 105 of the CNT aggregate 100 having a three-dimensional shape according to an embodiment of the present invention.
Figure 25B:
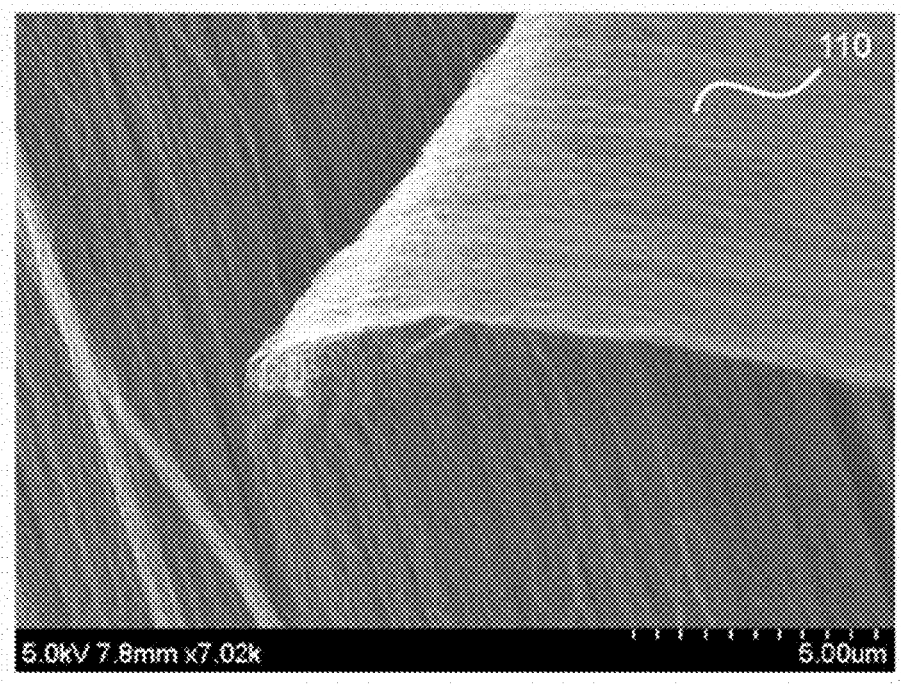
FIG. 25B is a SEM image of CNT bundles 110 extending from the outermost surface of the side surface 105 of the CNT aggregate 100 having a three-dimensional shape according to an embodiment of the present invention.
Figure 26A:
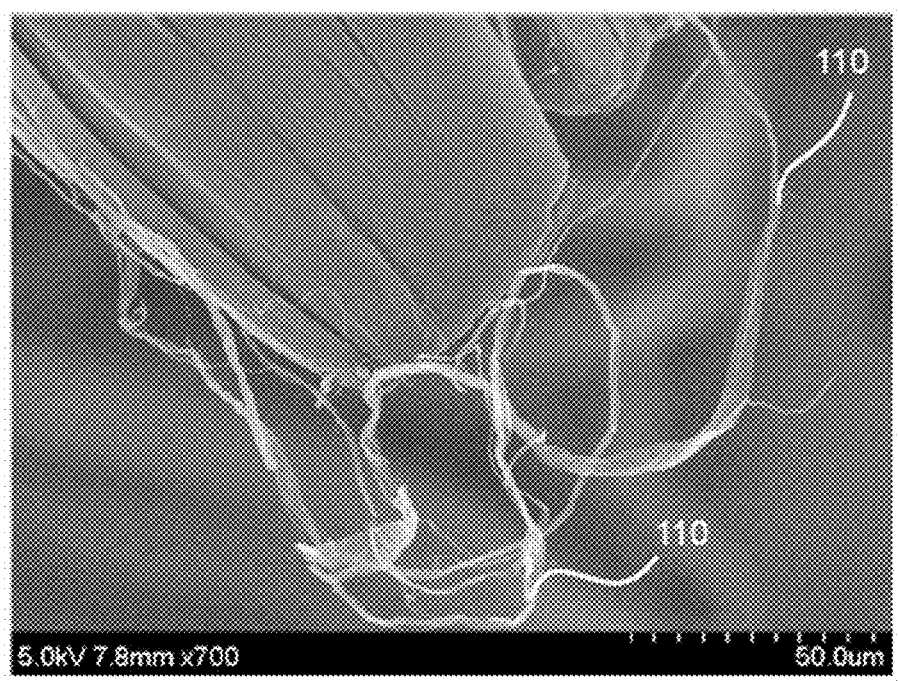
FIG. 26A is a SEM image of CNT bundles 110 extending from the outermost surface of the side surface 105 of the CNT aggregate 100 having a three-dimensional shape according to an embodiment of the present invention.
Figure 26B:
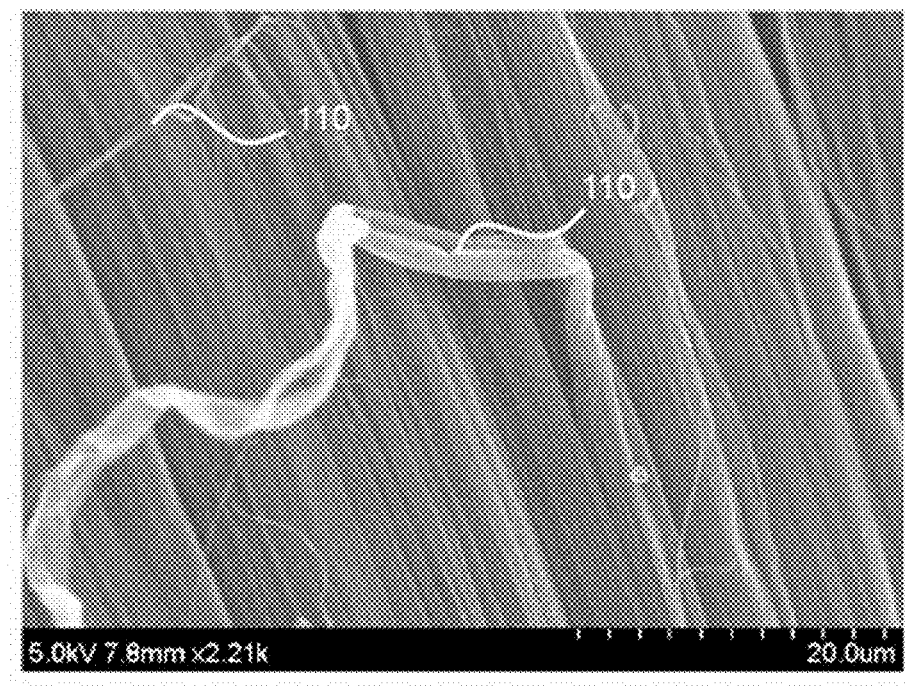
FIG. 26B is a SEM image of CNT bundles 110 extending from the outermost surface of the side surface 105 of the CNT aggregate 100 having a three-dimensional shape according to an embodiment of the present invention.

FIG. 24 is an SEM image of CNT bundles 110 extending from the outermost surface of the side surface 105 of the three-dimensional shape CNT aggregate 100 related to the present embodiment. FIG. 25 is an enlarged image of CNT bundles 110 extending from the side surface 105. It is observed that bundle 110 exists only on the side surface 105 and is peeled only from the side surface 105. In addition, as is apparent from FIG. 26, one end of the bundle 110 is present on the outermost surface of the side surface 105 and it can be seen that the bundle 110 extends from the side surface 105.

Figure 27A:
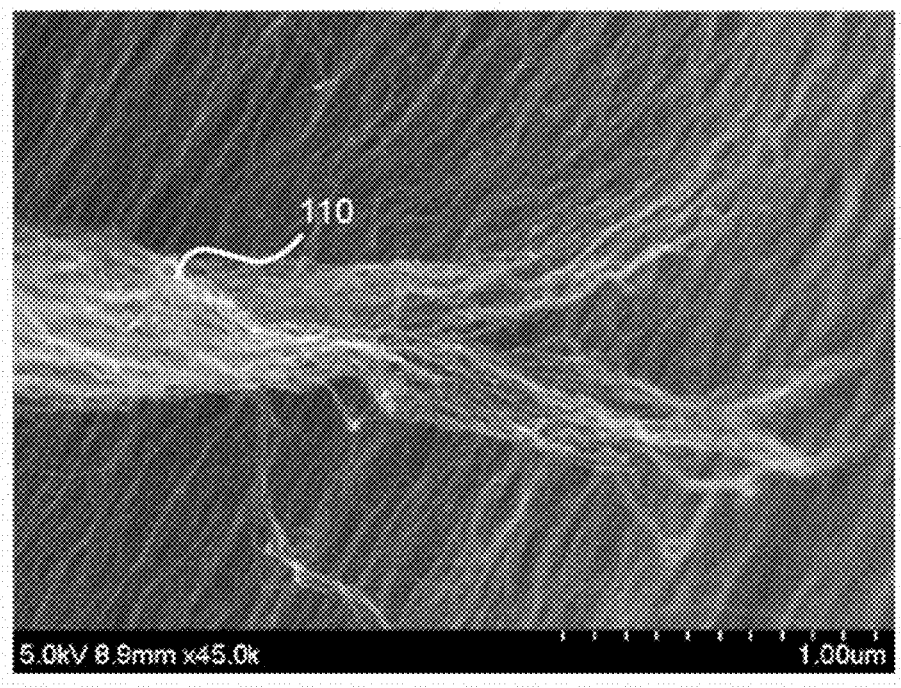
FIG. 27A is a SEM image of CNT bundles 110 extending from the outermost surface of the side surface 105 of the CNT aggregate 100 having a three-dimensional shape according to an embodiment of the present invention.
Figure 27B:
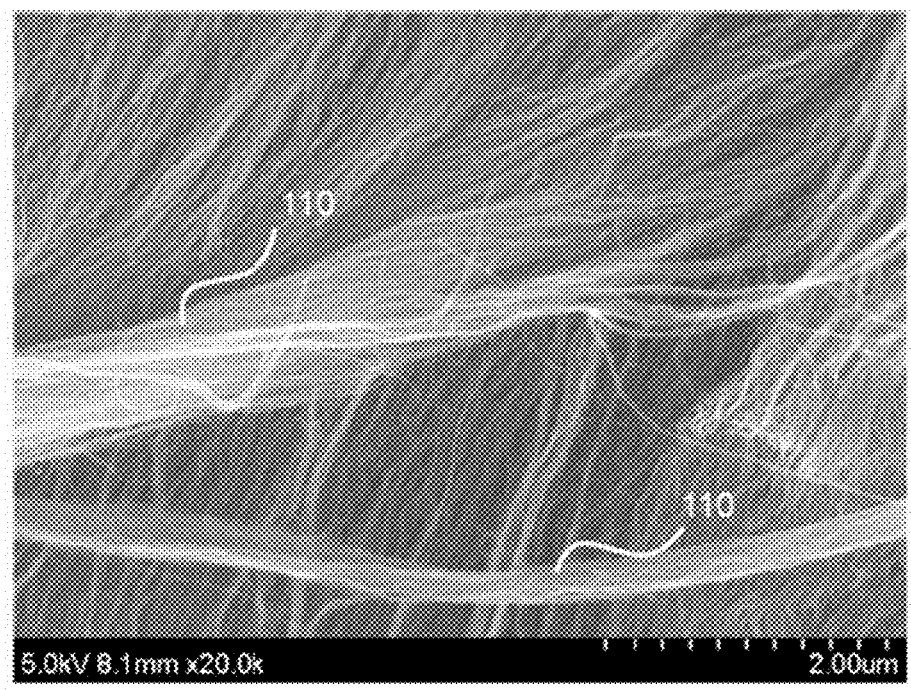
FIG. 27B is a SEM image of CNT bundles 110 extending from the outermost surface of the side surface 105 of the CNT aggregate 100 having a three-dimensional shape according to an embodiment of the present invention.
Figure 28A:
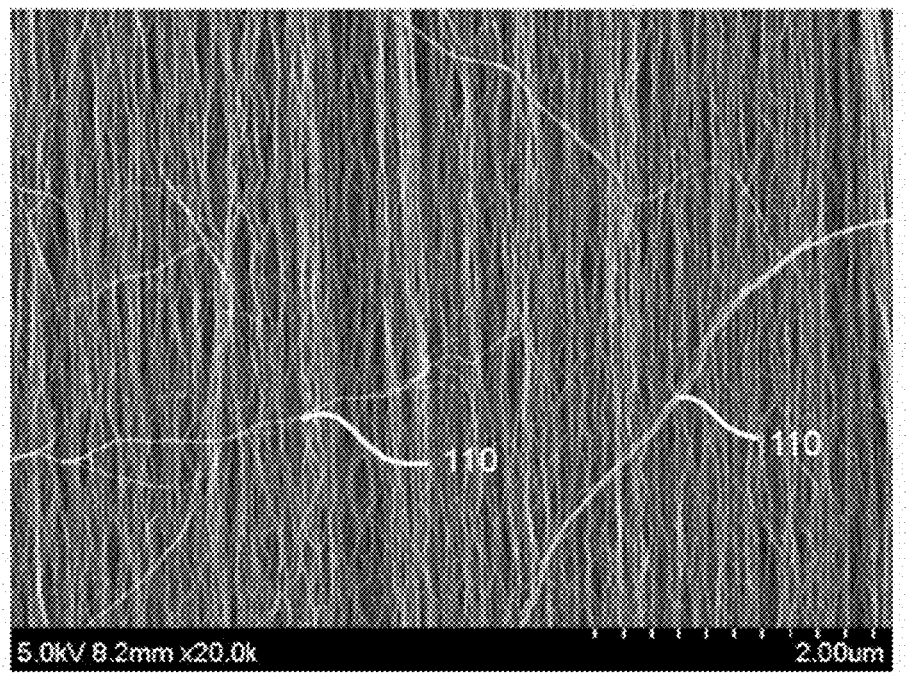
FIG. 28A is a SEM image of CNT bundles 110 extending from the outermost surface of the side surface 105 of the CNT aggregate 100 having a three-dimensional shape according to an embodiment of the present invention.
Figure 28B:
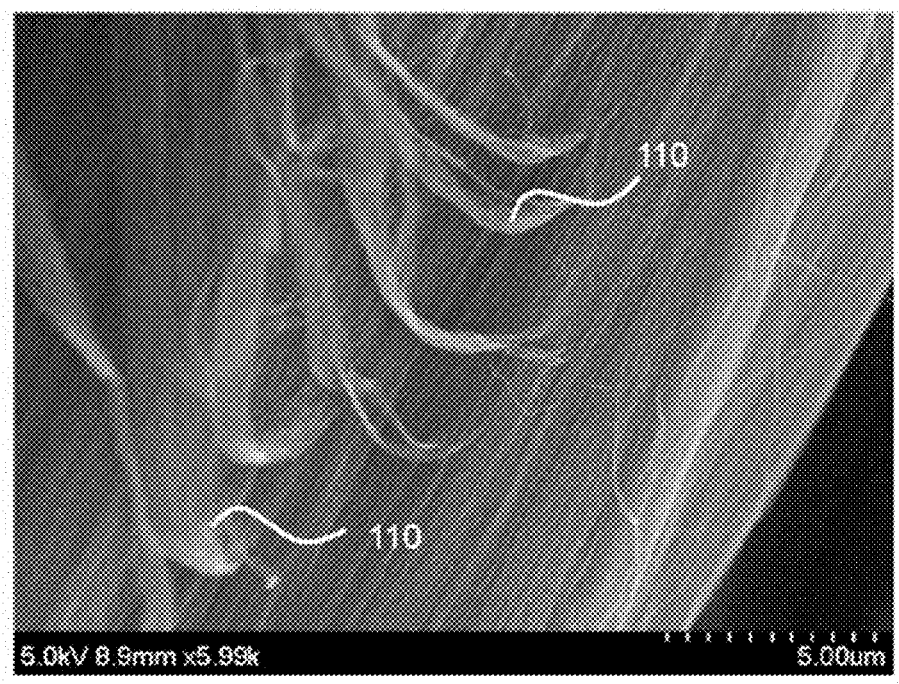
FIG. 28B is a SEM image of CNT bundles 110 extending from the outermost surface of the side surface 105 of the CNT aggregate 100 having a three-dimensional shape according to an embodiment of the present invention.
Figure 29A:
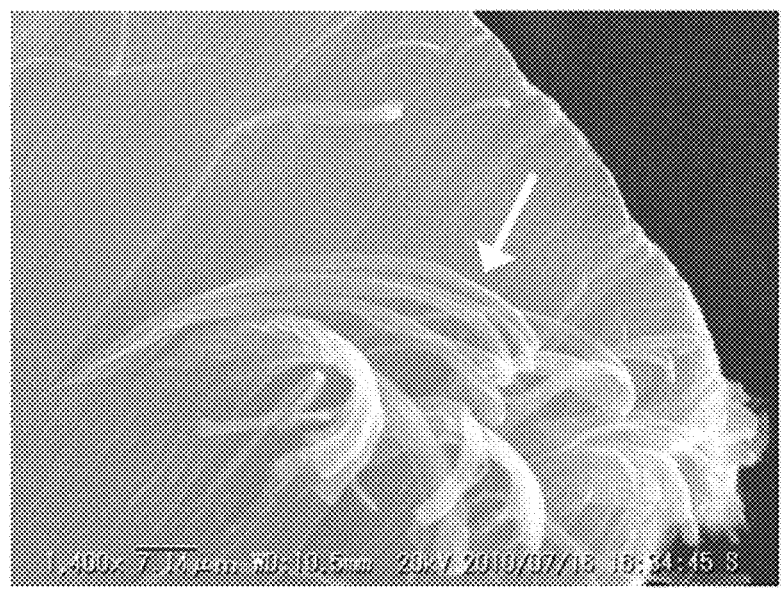
FIG. 29A is a SEM image of CNT bundles 110 extending from the outermost surface of the side surface 105 of the CNT aggregate 100 having a three-dimensional shape according to an embodiment of the present invention.
Figure 29B:
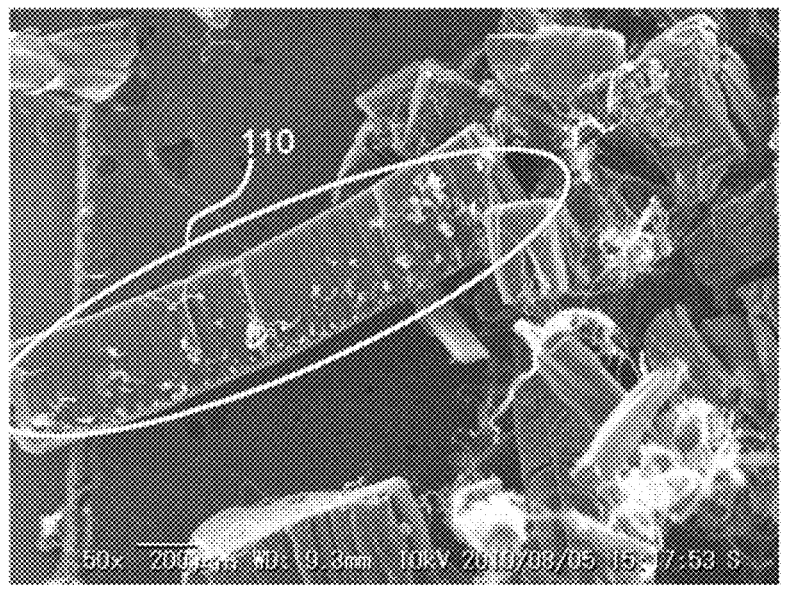
FIG. 29B is a SEM image of CNT bundles 110 extending from the outermost surface of the side surface 105 of the CNT aggregate 100 having a three-dimensional shape according to an embodiment of the present invention.
Figure 29C:
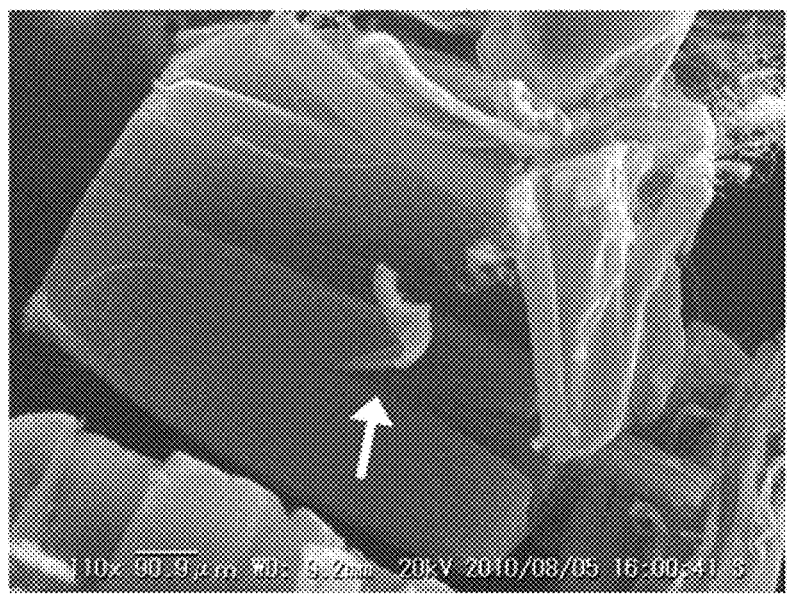
FIG. 29C is a SEM image of CNT bundles 110 extending from the outermost surface of the side surface 105 of the CNT aggregate 100 having a three-dimensional shape according to an embodiment of the present invention.
Figure 29D:
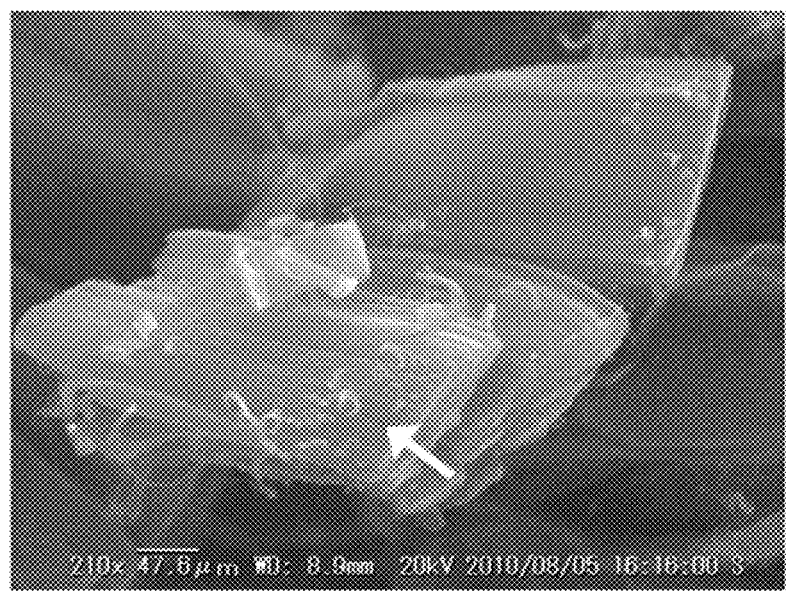
FIG. 29D is a SEM image of CNT bundles 110 extending from the outermost surface of the side surface 105 of the CNT aggregate 100 having a three-dimensional shape according to an embodiment of the present invention.

In FIG. 27, it can be seen that the bundle 110 is formed by a plurality of CNTs. In addition, as is apparent from FIG. 28, the size and number of CNTs which form the bundle 110 are varied. The bundle 110 extends with a diameter (thickness) of several tens of nm to several µm.

Figure 30A:
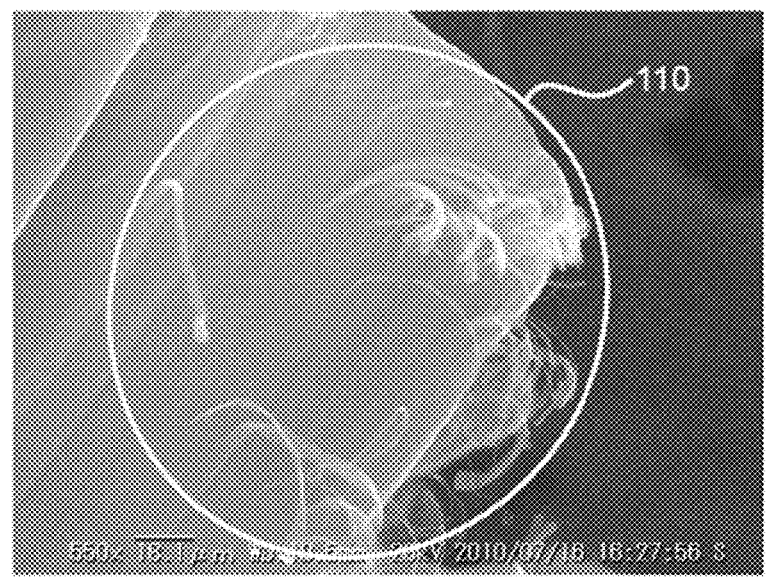
FIG. 30A is a SEM image of CNT bundles 110 extending from the outermost surface of the side surface 105 of the CNT aggregate 100 having a three-dimensional shape according to an embodiment of the present invention.
Figure 30B:
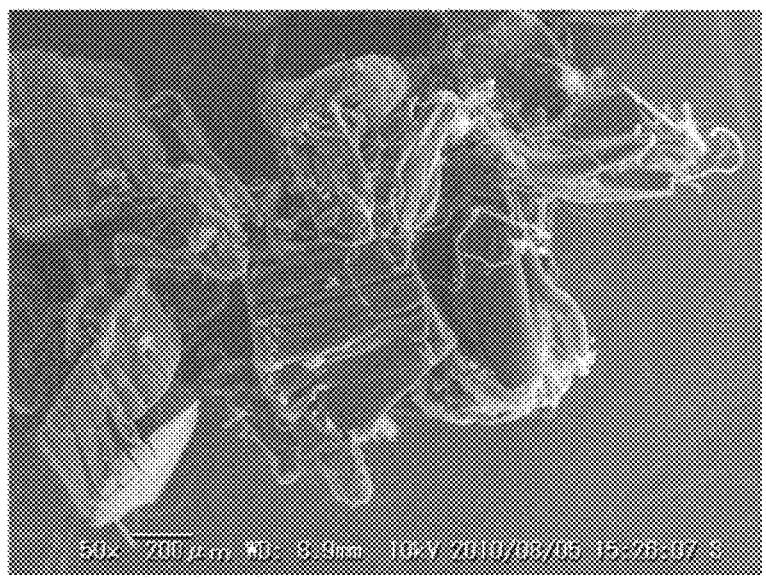
FIG. 30B is a SEM image of CNT bundles 110 extending from the outermost surface of the side surface 105 of the CNT aggregate 100 having a three-dimensional shape according to an embodiment of the present invention.
Figure 30C:
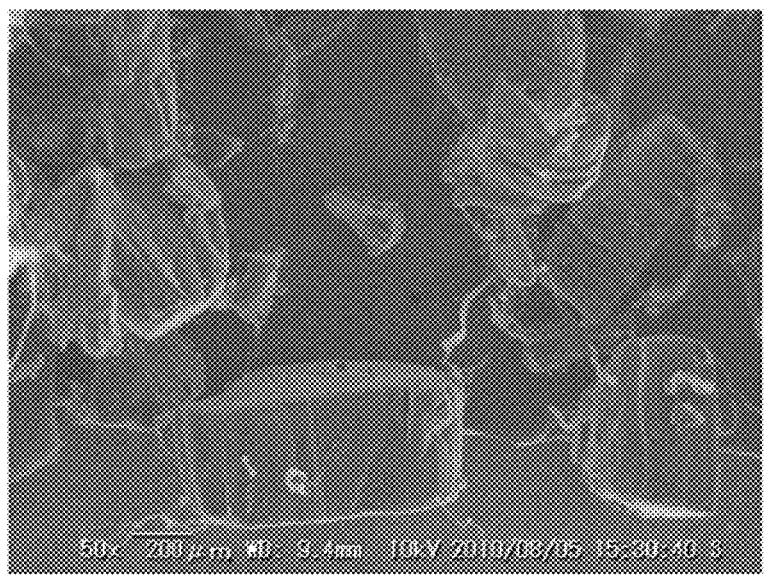
FIG. 30C is a SEM image of CNT bundles 110 extending from the outermost surface of the side surface 105 of the CNT aggregate 100 having a three-dimensional shape according to an embodiment of the present invention.
Figure 30D:
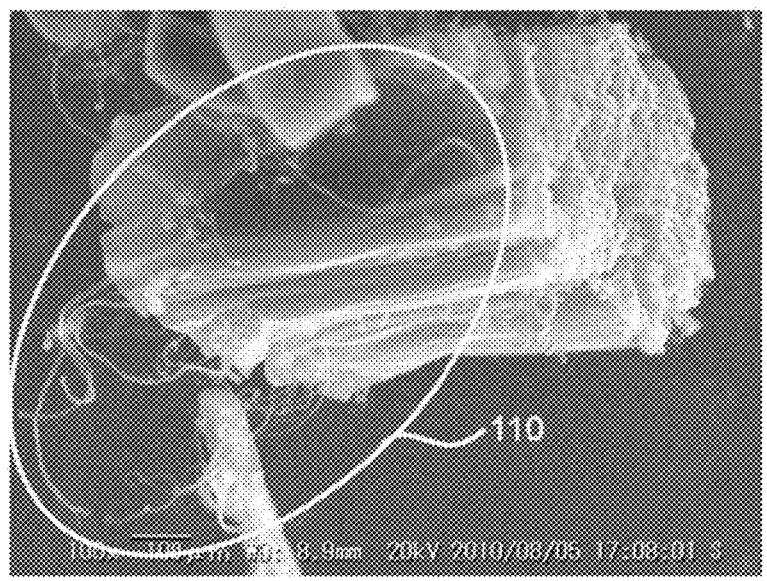
FIG. 30D is a SEM image of CNT bundles 110 extending from the outermost surface of the side surface 105 of the CNT aggregate 100 having a three-dimensional shape according to an embodiment of the present invention.
Figure 31A:
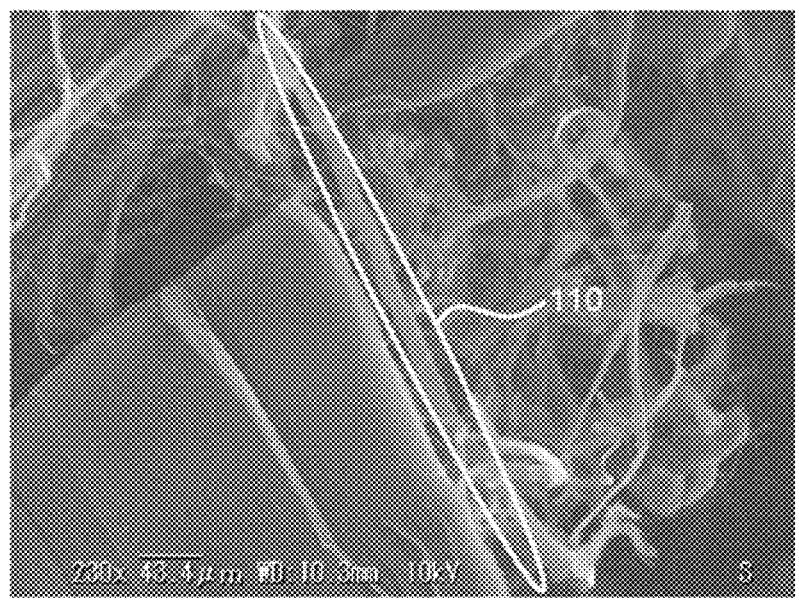
FIG. 31A is a SEM image of CNT bundles 110 extending from the outermost surface of the side surface 105 of the CNT aggregate 100 having a three-dimensional shape according to an embodiment of the present invention.
Figure 31B:
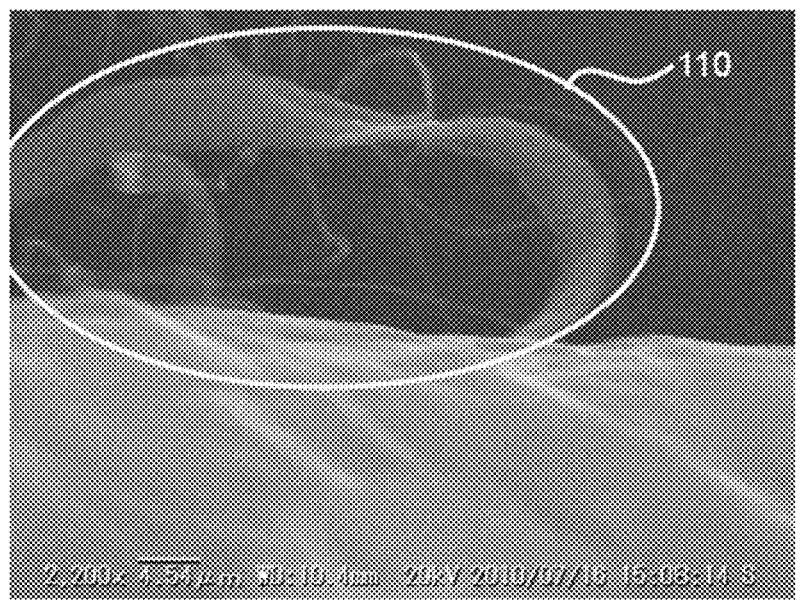
FIG. 31B is a SEM image of CNT bundles 110 extending from the outermost surface of the side surface 105 of the CNT aggregate 100 having a three-dimensional shape according to an embodiment of the present invention.
Figure 31C:
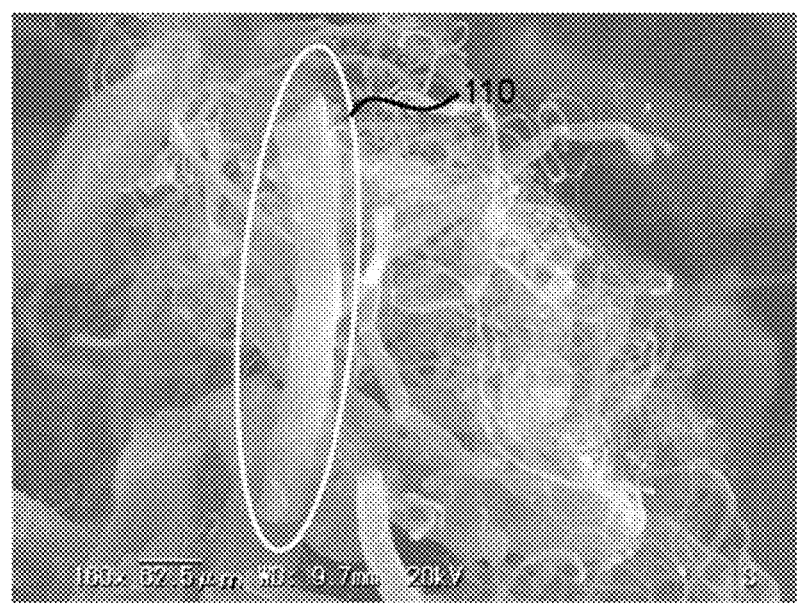
FIG. 31C is a SEM image of CNT bundles 110 extending from the outermost surface of the side surface 105 of the CNT aggregate 100 having a three-dimensional shape according to an embodiment of the present invention.
Figure 31D:
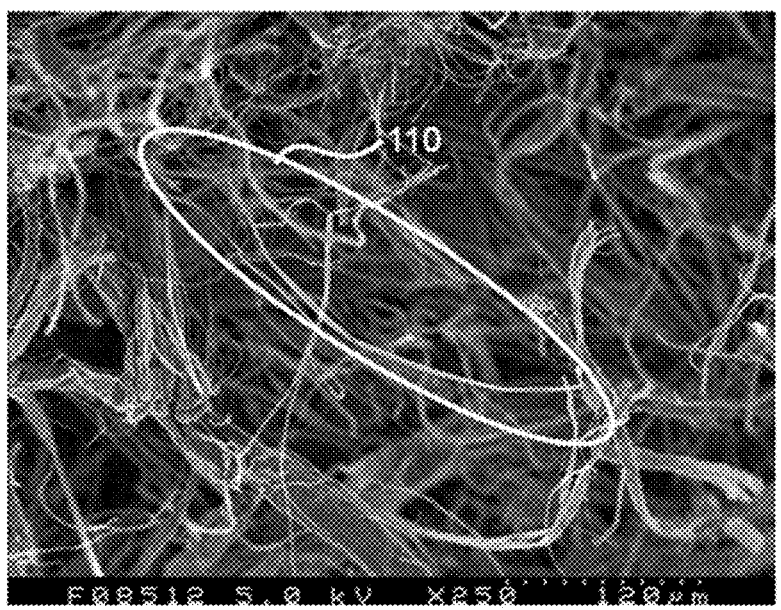
FIG. 31D is a SEM image of CNT bundles 110 extending from the outermost surface of the side surface 105 of the CNT aggregate 100 having a three-dimensional shape according to an embodiment of the present invention.
Figure 32A:
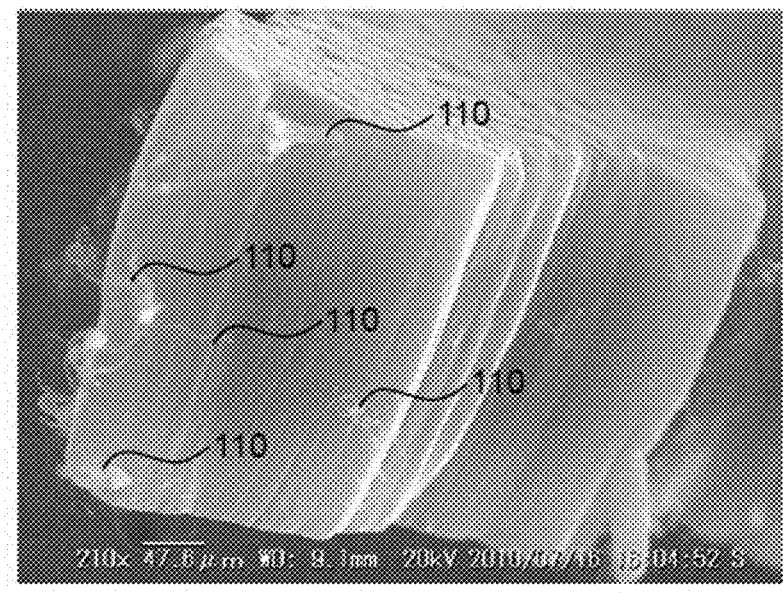
FIG. 32A is a SEM image of CNT bundles 110 extending from the outermost surface of the side surface 105 of the CNT aggregate 100 having a three-dimensional shape according to an embodiment of the present invention.
Figure 32B:
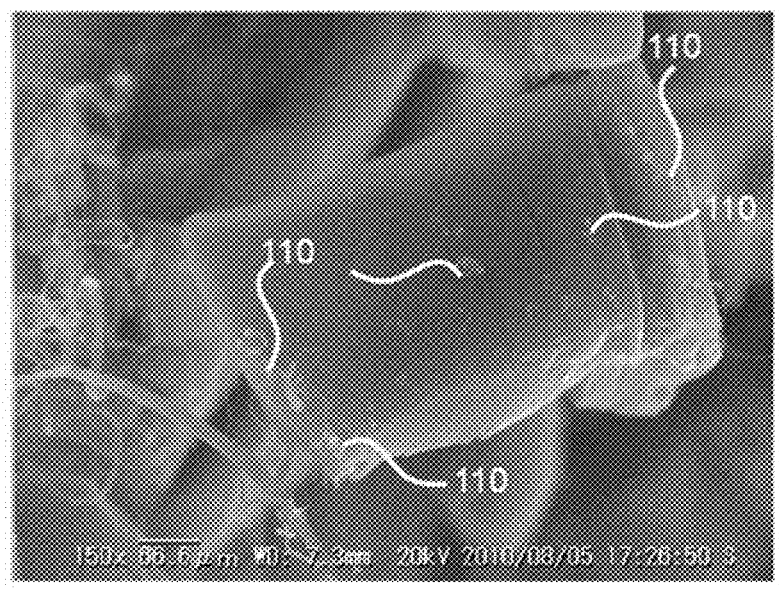
FIG. 32B is a SEM image of CNT bundles 110 extending from the outermost surface of the side surface 105 of the CNT aggregate 100 having a three-dimensional shape according to an embodiment of the present invention.
Figure 32C:
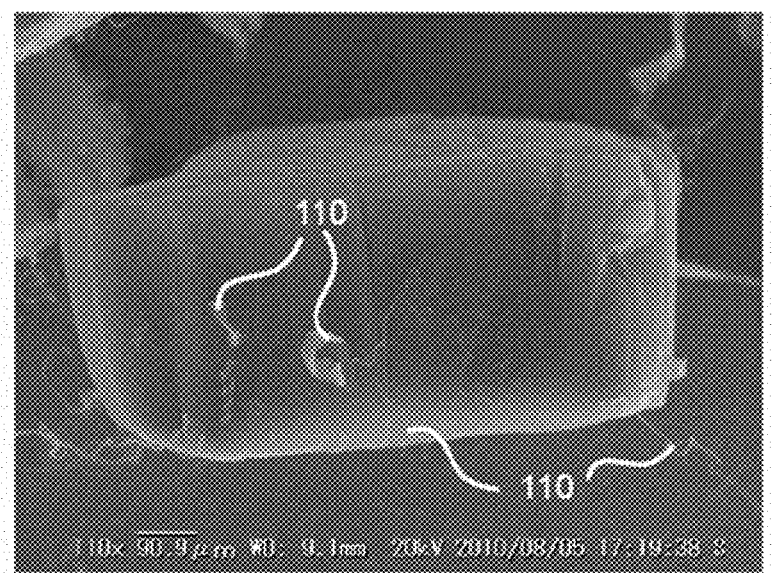
FIG. 32C is a SEM image of CNT bundles 110 extending from the outermost surface of the side surface 105 of the CNT aggregate 100 having a three-dimensional shape according to an embodiment of the present invention.
Figure 32D:
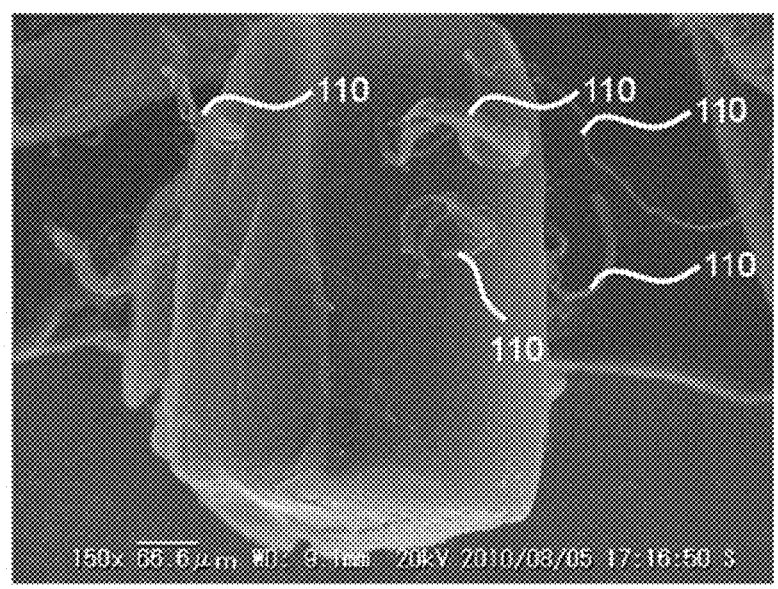
FIG. 32D is a SEM image of CNT bundles 110 extending from the outermost surface of the side surface 105 of the CNT aggregate 100 having a three-dimensional shape according to an embodiment of the present invention.

In FIG. 29, the arrow indicates the bundle 110. Bundle 110 extends from only the side surface 105, in particular multiple bundles 110 extend from the CNT separable part piece 130. In addition, the bundle 110 has various lengths ranging from several µm, as shown in FIG. 30A to a length corresponding to the length of the orientation direction of the three-dimensional shape CNT aggregate 100 as shown in FIG. 30D. Furthermore, as shown in FIG. 31, the length of the bundle 110 ranges from 1 µm to 500 µm.

On the other hand, as shown in FIG. 32, the number of bundles 110 extending from one side surface 105 of one three-dimensional shape CNT aggregate 100 is also varied. In FIG. 32A, there are about 30 bundles 110 extending from one side surface 105 of one three-dimensional shape CNT aggregate 100 and there are about 120 bundles 110 extending from side surface 105 of all the side surfaces 105 of the three-dimensional shape CNT aggregate 100. In FIG. 32B, there are 26 bundles 110 extending from one side surface 105 of the three-dimensional shape CNT aggregate 100, and 104 bundles 110 extending from all the side surfaces 105 of the three-dimensional shape CNT aggregate 100. In FIG. 32C there are 21 bundles 110 extending from one side surface 105 of the three-dimensional shape CNT aggregate 100, and 84 bundles 110 extending from all the side surfaces 105 of the three-dimensional shape CNT aggregate 100. In FIG. 32D, there are 21 bundles 110 extending from one side surface 105 of the three-dimensional shape CNT aggregate 100, and 84 bundles 110 extending from all the side surfaces 105 of the three-dimensional shape CNT aggregate 100.

As explained above, there are varied bundles 110 extending from the side surface 105 of the three-dimensional shape CNT aggregate 100 related to the present embodiment and it can be seen that the bundle 110 has the characteristic of easily being peeled from the three-dimensional shape CNT aggregate 100. In addition, as explained in the embodiments, by having a plurality of bundles 110, the three-dimensional shape CNT aggregate 100 is observed to have the characteristic of three-dimensional shape CNT aggregates being less likely to aggregate.

(CNT Aggregate Pore Diameter, Pore Volume Measurement by a Mercury Intrusion Porosimeter)

Figure 33:
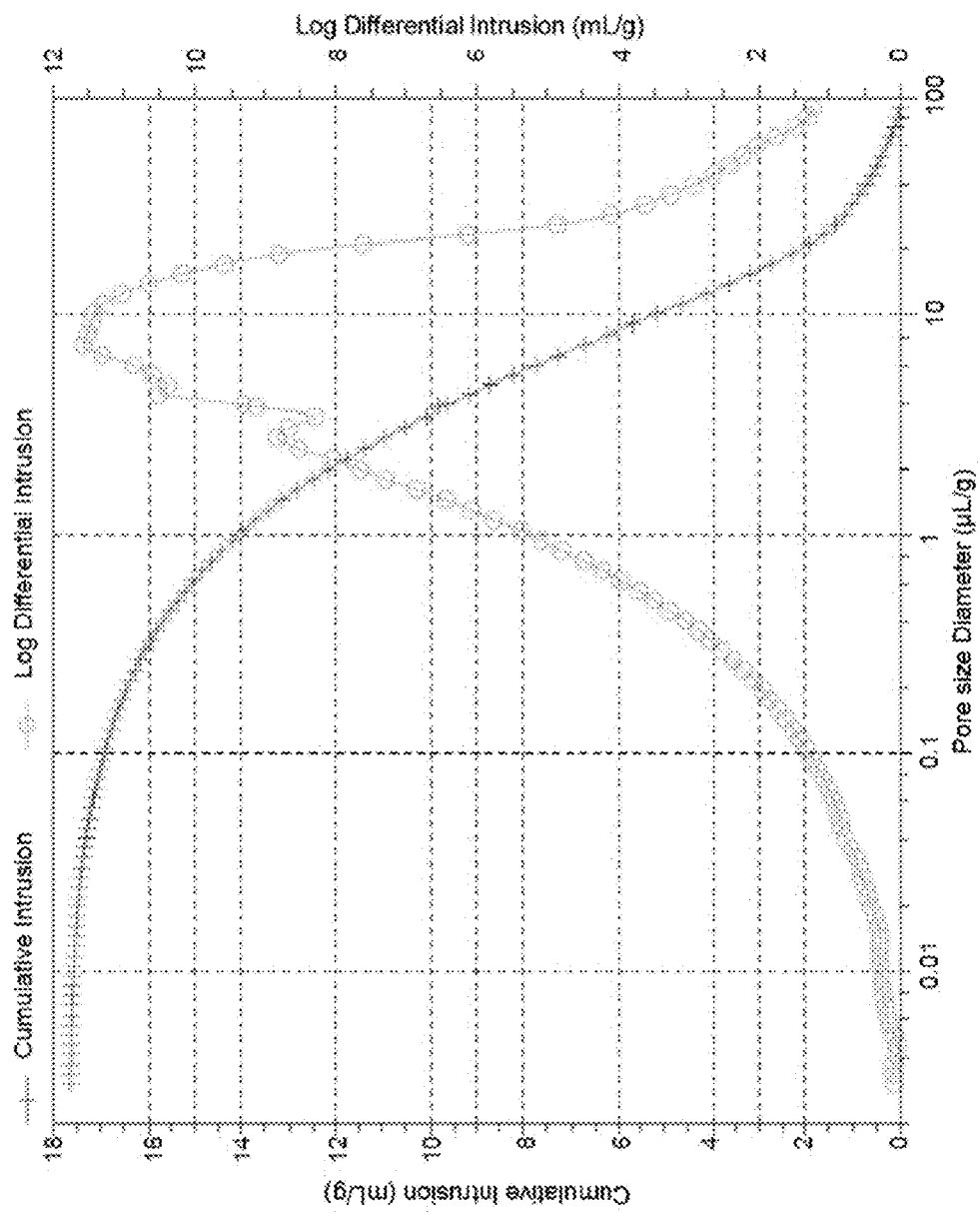
FIG. 33 is a diagram showing measurement results of a pore diameter and pore volume of the CNT aggregate 200 including the CNT aggregate having a three-dimensional shape according to an embodiment of the present invention measured by a mercury intrusion porosimeter.

The CNT aggregate 200 including the three-dimensional shape CNT aggregate related to the present embodiment was evaluated using a mercury intrusion porosimeter. FIG. 33 shows the pore diameter and pore volume measurement results. In the CNT aggregate 200 including the three-dimensional shape CNT aggregate, it can be seen that a pore diameter where a differential pore volume is maximum in the range of 0.1 µm or more and 100 µm is 8 µm. In addition, the pore volume at a pore size when a differential pore volume is maximum is 17.5 mL/g. This measurement result is much larger in proportion to the pore diameter of the CNT bulk aggregate 100 which is a raw material. Therefore, it was observed that the numerical range described above is for evaluating gaps that exist between CNT aggregates. Gaps between the CNT aggregates are observed to occur when bundles 110 prevent agglomeration of CNT aggregate pairs.

(Bulk Density)

The CNT aggregate 200 related to the present embodiment was measured for bulk density. In this embodiment, loose bulk density and tapped bulk density were measured. A single-walled CNT (known commonly as HiPco (high-pressure carbon monoxide process)) manufactured by Unidyme was used as a comparative example. In the measurement of loose density, a known weight of the CNT aggregate was placed into a flat bottom container which was shaken vigorously and allowed to stand, the CNT aggregate settled and volume was calculated by measuring the height. In the tapped density measurement, the container which measured loose density was dropped repeatedly 20 times on a hard surface from a height of 25 mm and the volume was calculated by measuring the height. FIG. 34 shows the measurement results of bulk density. Loose bulk density was 0.019 g/cm$^2$ and tapped bulk density was 0.024 g/cm$^2$.

It can be seen that the bulk density in the CNT aggregate 200 related to the present embodiment is significantly smaller compared to the comparative example. As mentioned above, it is inferred that because the CNT aggregate 200 is arranged with the bundle 110, gaps exists between the CNT aggregates and CNT aggregates are prevented from agglomerating with each other.

(Angle of Repose)

Figure 35:
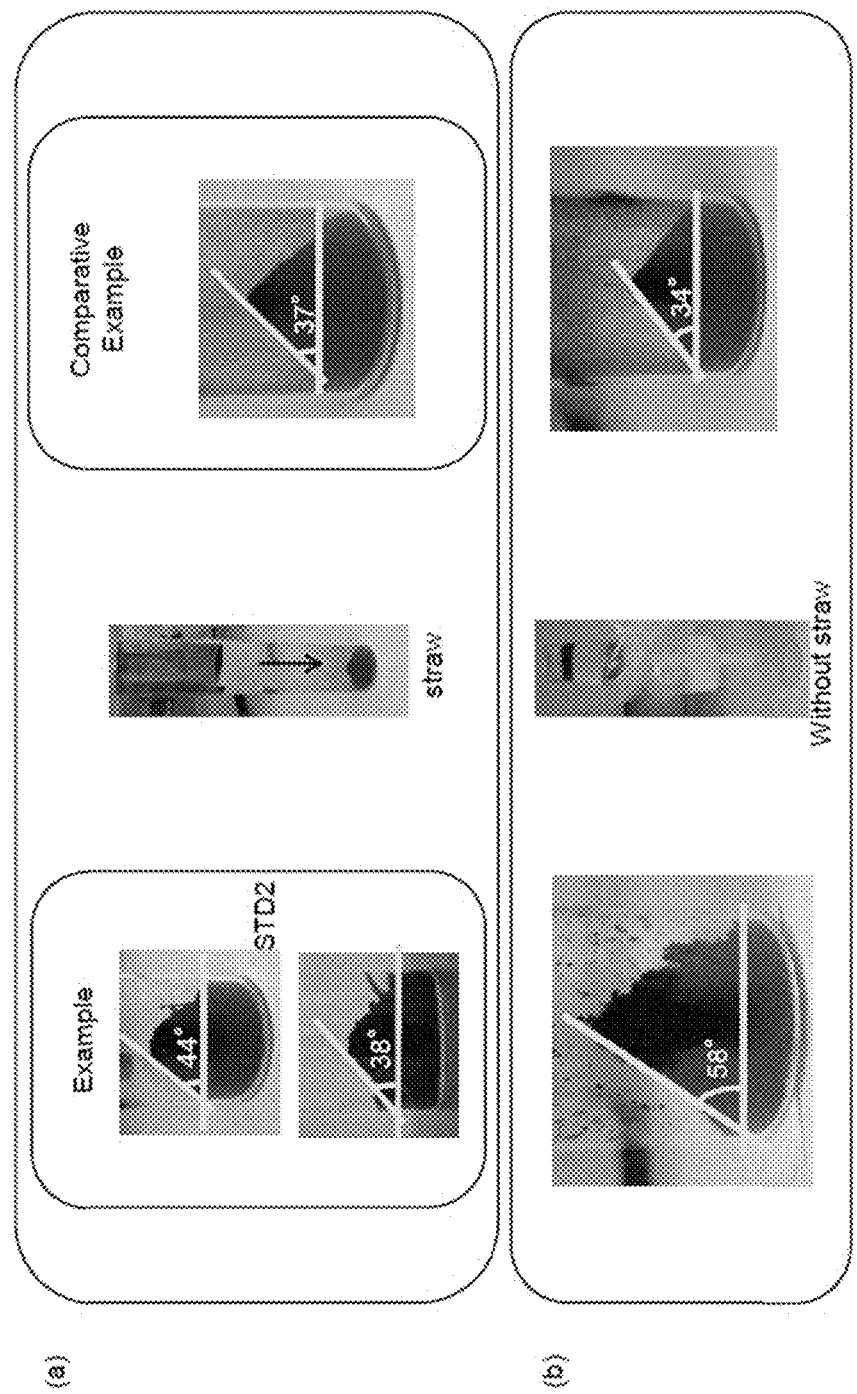
FIG. 35 is a diagram showing a measurement result of the angle of repose of the CNT aggregate 200 including a CNT aggregate having a three-dimensional shape according to an embodiment of the present invention.

The angle of repose in the CNT aggregate 200 related to the present embodiment was measured. In the present embodiment, the angle of repose was measured by an injection method. In addition, the angle of repose was measured for both the presence and non-presence of a straw. HiPco was used in the comparative example. FIG. 35 shows the measurement result of the angle of repose.

FIG. 36 is a table showing the measurement results of angle of repose and bulk density of the CNT aggregate. The angle of repose of the CNT aggregate 200 was 65±10° and it was clear that the CNT aggregate 200 related to the present embodiment has a large angle of repose compared to the comparative example. Because moderate friction exists between the CNT aggregates, when the CNT aggregate 200 is subjected to a dispersion process, it is inferred that CNT aggregates are less likely to aggregate.

(Single-Walled CNT)

The CNT aggregate 200 was observed using a TEM (JEM-2100 manufactured by Nihon Denshi). The measurement magnification was from 50,000 to 500,000. The acceleration voltage was 120 kV. A single-walled CNT was observed with no carbon impurities attached. In addition, 98% or more (98 pieces) among the 100 CNTs were taken up by single-walled CNTs and 2% by double-walled CNTs. By setting the thickness of a an iron catalyst to 2.5 nm, it is possible to manufacture a CNT aggregate with 60% of double-walled CNTs, 25% of single-walled CNTs, 20% of triple-walled CNTs and 5% of three walls or more and the effect of the present invention was similar.

(Pore Diameter and Pore Volume of the CNT Aggregate)

About 1 mg of the CNT aggregate 200 was placed in a differential thermal analyzer ((model number Q5000IR) manufactured by TA Instruments) and the temperature was increased from room temperature to 900° C. at a speed of 1° C. per minute in air. The weight reduction from 200° C. to 400° C. was 0.7%. In addition, the largest peak of the DTA curve at this time was 669° C.

An adsorption isotherm of 50 mg of the CNT aggregate 200 was measured using a BELSORP-MINI (manufactured by Nihon Bell) with liquid nitrogen at 77K (the adsorption average time was 600 seconds). The specific surface measured using the Brunauer, Emmett, Teller method from this adsorption isotherm was 1000 $m^2/g$. In addition, 50 mg of the CNT aggregate 200 was placed evenly on an aluminum tray and inserted into a muffle furnace. The temperature was increase to 550° C. at a speed of 1° C. per minute, and the weight of the sample became 45 mg when a heating process was performed for 1 minute under an oxygen atmosphere (20% concentration) with 5 mg being burned. The specific surface area of the sample after the heating process was measured at around 1900 $m^2/g$ using the process described above.

Carbon in the CNT aggregate 200 was element analyzed using X-ray fluorescence and was 99.6%. Maximum pore size distribution by the BJH method was determined at 19 nm.

(Manufacture of CNT Dispersion Liquid)

100 mg of the classified CNT aggregate 200 was precisely weighed, introduced to a 100 ml flask (three holes: vacuum type, temperature adjustment type), held for 1 hour when the temperature reached 200° C. under a vacuum and dried. After drying was completed, the flask was heated and while in a vacuum process state, 20 ml of a dispersion medium MIBK (manufactured by Sigma-Aldrich Japan) was introduced to the flask and the CNT aggregate 200 was prevented from contact with air (drying process).

Furthermore, the MIBK (manufactured by Sigma-Aldrich Japan) was increased to 300 ml. An octangular rotor was put in the beaker, the beaker was sealed with aluminum foil and a pre-dispersion process was performed by stirring the liquid for 24 hours using a stirrer at 800 RPM ensuring that the MIBK did not vaporize.

In the dispersion process, the CNT aggregate 200 was passed through a 200 μm flow path using a wet type jet mill (Nano-Jet Mill (Registered Trademark) JN10 manufactured by JOKOH) under a pressure of 60 MPa, the aggregate 200 was dispersed in MIBK and a CNT dispersion liquid 400 was obtained with a weight concentration of 0.033 wt %.

The dispersion liquid was again stirred using the stirrer at a normal temperature for 24 hours. At this time, a lid was not put on the beaker and the MIBK was vaporized using a solvent leaving around 150 ml. The weight concentration of CNTs at this time was around 0.075% wt (dispersion process). The CNT dispersion liquid 400 related to the present invention was obtained in this way.

(CNT Aggregate Including a Mesh Body)

The CNT dispersion liquid 400 with a weight concentration of 0.075% by weight processed under 60 MPa was coated very thinly on a silicon or glass substrate by spin coating (MIKASA SPINCOATER 1H-D7).

First, about 1 ml of the CNT dispersion liquid 400 to be coated was prepared. The substrate (silicon in the case of a SEM observation, slide glass in the case of an optical microscope) to be coated with the sample was prepared. The substrate was fixed by a vacuum. The rotation conditions were 3000 RPM×30 seconds and about 0.1 ml of a solvent was dripped onto the center of the substrate and spin coated. In the case of a problem with the CNT aggregate 200 etc on the substrate, the number of rotations could be changed and finely adjusted.

Next, the manufactured sample was observed in a scanning electron microscope, laser microscope and the optical microscope. As shown in FIGS. 8 and 9, it can be shown that the CNT aggregates 200 includes the network structure of CNT (bundles of CNT) and CNT (bundles of CNT) having fine pores (gap), i.e. mesh body 113.

(Dispersion Stability of the CNT Dispersion Liquid)

The CNT dispersion liquid 400 visually maintained dispersion without separating the CNT aggregate 200 and the solvent even after being left for 10 days or more. It is clear that the CNT dispersion liquid of 400 the present example has a very high level of stability.

(Evaluation of the CNT Aggregate and CNT Molded Product)

A thin film CNT molded product 250 was manufactured in order to extract the CNT aggregate 200 from the CNT dispersion liquid 400 described above and evaluate its properties. A Millipore filter (Filter Membrane: DURAPORE (Registered Trademark) (0.22 μm GV, diameter 45 mm) manufactured by MILLIPORE) was set into a container which can be vacuumed, and 150 ml of 0.075% by weight of the CNT dispersion liquid 400 was filtered using the Millipore filter. The CNT aggregate 200 was deposited on the Millipore filter and a thin film CNT molded product 250 was formed with a thickness of around 70 μm. The CNTs deposited on the Millipore filter were sandwiched between two pieces of filter paper and vacuum dried at 70° C. for 12 hours. After drying, the thin film CNT molded product 250 was easily peeled from the Millipore filter and a desired CNT molded product was obtained.

(Conductivity of the CNT Molded Product)

The surface resistance value of the CNT molded product 250 was measured in a Loresta EP MCP-T360 (manufactured by Daia Instruments Co. Ltd) using a JISK7419 standard 4 terminal 4 point probe method. After the obtained surface resistance value was measured using the 4 terminal method, the volume resistance value was calculated by applying the film thickness of the molded product and the surface resistance value. The conductivity of the molded product was calculated at 83 S/cm from the volume resistance value.

(CNT Rubber Composition)

A matrix solution with fluorine rubber (Daiel-G912 manufactured by Daikin Industries) dissolved in MIBK was prepared then added to the CNT dispersion liquid with a process pressure of 60 MPa using a wet type jet mill, sufficiently stirred and the CNTs were dispersed into the matrix. 150 ml of the CNT dispersion liquid was added to 50 ml of the fluorine rubber solution so that the contained amount of CNTs became 1% in the case where the mass of the entire CNT compound material is set at 100% mass, stirred for 16 hours at room temperature under a condition of 300 rpm using a stirrer and condensed until the total amount became about 50 ml. By pouring the sufficiently mixed solution into a petri dish and drying at room temperature for 12 hours, the CNT compound material hardened. The hardened CNT compound material was inserted into a vacuum drying furnace at 80° C., dried and the solution was removed. In this way, a 1% by weight CNT rubber was obtained. The conductivity of the obtained CNT rubber was 0.4 S/cm which is very high regardless of the small amount of CNTs added.

Comparative Example 100 mg of a single-walled CNT (known commonly as HiPco (high-pressure carbon monoxide process) was introduced to a 100 ml flask, maintained for 1 hour after reaching 200° C. under a vacuum and then dried. When the HiPco single-walled CNT was observed using SEM, it had a sphere shaped CNT non-orientated aggregate and a first surface and a second surface comprised of opposing parallel non-orientated carbon nanotubes, and a side surface comprised from orientated carbon nanotubes perpendicular to the first surface and/or second surface were not observed. An orientated CNT was not observed in any of these parts. Similarly, a bundle extending from the outermost side surface was not observed. After drying, the flask was heated and while in a vacuum process state, 20 ml of a dispersion medium MIBK (manufactured by Sigma-Aldrich Japan) was introduced to the flask and the CNT aggregate was prevented from contact with air (drying process). Furthermore, the MIBK (manufactured by Sigma-Aldrich Japan) was increased to 300 ml. An octangular rotor was put in the beaker, the beaker was sealed with aluminum foil and the liquid was stirred for 24 hours using a stirrer at 800 RPM ensuring that the MIBK did not vaporize. In the dispersion process, the CNT aggregate was passed through a 200 μm flow path using a wet type jet mill (Nano-Jet Mill (Registered Trademark) JN10 manufactured by JOKOH) under a pressure of 60 MPa, the aggregate was dispersed in MIBK and a CNT dispersion liquid 1000 was obtained with a weight concentration of 0.33 wt %. The dispersion liquid 1000 was again stirred using the stirrer at a normal temperature for 24 hours. At this time, a lid was not put on the beaker and the MIBK was vaporized using a solvent leaving around 150 ml. The weight concentration of CNTs at this time was around 0.075% wt (dispersion process).

When the CNT aggregates were left to stand for 10 days, the CNT aggregate and solvent separated and the dispersion stability was low compared to the CNT dispersion liquid 400.

A thin film CNT molded product 1050 was manufactured in order to evaluate the properties of the CNT aggregate using the CNT dispersion liquid 1000 in the Comparative Example described above using the method of the example.

Using the method of the examples, the CNT molded product 1050 was placed in a differential thermal analyzer ((model number Q5000IR) manufactured by TA Instruments) and the temperature was increased from room temperature to 900° C. at a speed of 1° C. per minute in air. The weight reduction from 200° C. to 400° C. was 14%. In addition, the largest peak of the DTA curve at this time was 484° C.

The specific surface area was measured at 600 m²/g using the method of the example.

(Conductivity of the CNT Molded Product)

The conductivity of the CNT composite 1050 was measured at 25 S/cm using the method of the example which was less compared to the conductivity measured in the example. A CNT rubber was manufactured using the method in the example and its conductivity was measured at $10^{-3}$ S/cm which was significantly less compared to the conductivity measured in the example.

As explained above, the CNT dispersion liquid related to the present invention has high dispersibility and stability while maintaining excellent electrical properties and mechanical properties. In addition, a CNT molded product having excellent electrical properties is provided by using the stable CNT dispersion liquid related to the present invention.

According to the method of the present invention, a CNT aggregate is provided formed from a CNT which is easily loosened. In addition, by providing the CNT aggregate arranged with a mesh body comprised from a plurality of CNTs, a stable CNT dispersion liquid and CNT molded product is provided while maintaining excellent thermal conductivity, electrical properties and mechanical properties of the CNT and high dispersibility.

The invention claimed is:
1. A carbon nanotube aggregate having a three-dimensional shape comprising:
   a first surface, a second surface and a side surface;
   wherein
      a carbon nanotube of the first surface has a Herman orientation coefficient greater than −0.1 and smaller than 0.2,
      a carbon nanotube of the second surface has a Herman orientation coefficient greater than −0.1 and smaller than 0.2,
      a carbon nanotube of the side surface has a degree of orientation in which a Herman orientation coefficient is 0.2 or more and 0.99 or less,
      the first surface and the second surface are mutually arranged in parallel and the side surface is perpendicular with respect to the first surface and the second surface,
      at least one of the first surface or the second surface comprises a network of carbon nanotubes, and
      a pore volume is 5 mL/g or more at a pore size where the differential pore volume of the carbon nanotube aggregate having a three-dimensional shape is a maximum.
2. The carbon nanotube aggregate having a three-dimensional shape according to claim 1 wherein when a carbon nanotube aggregate comprising the carbon nanotube aggregate having a three-dimensional shape is measured by a mercury intrusion porisometer and differential pore volumes are logarithmically plotted with respect to each pore diameter, and the carbon nanotube aggregate has a differential pore volume maximum in a range of 1 μm or more and 50 μm or less of the pore diameter plotted.
3. The carbon nanotube aggregate having a three-dimensional shape according to claim 1 wherein the length of the side surface is 10 μm or more and 1 cm or less.
4. The carbon nanotube aggregate having a three-dimensional shape according to claim 1 wherein the first surface and said second surface of the carbon nanotube aggregate having a three-dimensional shape are each arranged with at least three sides respectively.

5. The carbon nanotube aggregate having a three-dimensional shape according to claim 1 wherein an angle of repose of a carbon nanotube aggregate including the carbon nanotube aggregate having a three-dimensional shape is 40 degrees or more and 85 degrees or less.

6. The carbon nanotube aggregate having a three-dimensional shape according to claim 1 wherein a bulk density of a carbon nanotube aggregate including the carbon nanotube aggregate having a three-dimensional shape is 0.001 g/cm3 or more and 0.19 g/cm3 or less.

7. The carbon nanotube aggregate having a three-dimensional shape according to claim 1 wherein a maximum pore size distribution of a carbon nanotube aggregate including the carbon nanotube aggregate having a three-dimensional shape calculated using a BJH method from an adsorption isotherm using liquid nitrogen is 100 nm or less.

8. The carbon nanotube aggregate having a three-dimensional shape according to claim 1 wherein the carbon nanotube aggregate having a three-dimensional shape includes a fissure.

9. The carbon nanotube aggregate having a three-dimensional shape according to claim 1 wherein the outermost surface is arranged with carbon nanotube separable part pieces consisting of a carbon nanotube aggregate, the carbon nanotube separable part pieces are carbon nanotube aggregates before being broken from the carbon nanotube aggregate having a three-dimensional shape.

10. The carbon nanotube aggregate having a three-dimensional shape according to claim 1 wherein the outermost surface is formed by arranging a plurality of carbon nanotube separable part pieces arranged with a bundle of carbon nanotubes.

11. The carbon nanotube aggregate having a three-dimensional shape according to claim 10 wherein the bundle is peeled and extends from the carbon nanotube piece forming the side surface.

12. The carbon nanotube aggregate having a three-dimensional shape according to claim 1 wherein a carbon nanotube aggregate including the carbon nanotube aggregate having a three-dimensional shape possesses a carbon purity of 98% or more measured by a fluorescent X-ray.

13. The carbon nanotube aggregate having a three-dimensional shape according to claim 1 wherein a carbon nanotube aggregate including the carbon nanotube aggregate having a three-dimensional shape includes carbon nanotubes with a specific surface area of or 800 m2/g or more and 2500 m2/g or less.

14. The carbon nanotube aggregate having a three-dimensional shape according to claim 1 wherein weight loss in thermogravimetry when the carbon nanotube aggregate including the carbon nanotube aggregate having a three-dimensional shape is increased in temperature from 200° C. to 400° C. in increments of 1° C. per minute is 10% or less.

15. The carbon nanotube aggregate having a three-dimensional shape according to claim 1 wherein carbon nanotubes forming the carbon nanotube aggregate having a three-dimensional shape is a single-walled carbon nanotube.

16. The carbon nanotube aggregate having a three-dimensional shape according to claim 1 wherein the carbon nanotube bundles extend to an adjacent carbon nanotube aggregate having a three-dimensional shape.

17. The carbon nanotube aggregate having a three-dimensional shape according to claim 1 wherein the length of the bundles of carbon nanotubes is 1 μm or more and 1 mm or less.

18. The carbon nanotube aggregate having a three-dimensional shape according to claim 1 wherein a shape of the carbon nanotube aggregate is selected from a flake shape, powder shape, granule shape, thin leaf shape and block shape.

* * * * *